(12) United States Patent
Moore et al.

(10) Patent No.: US 6,721,682 B1
(45) Date of Patent: Apr. 13, 2004

(54) AERODYNAMIC PREDICTION USING SEMIEMPIRICAL PREDICTION TECHNIQUES AND METHODS THEREFOR

(75) Inventors: Frankie G. Moore, King George, VA (US); Thomas C. Hymer, Dahlgren, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 9 days.

(21) Appl. No.: 10/036,482

(22) Filed: Jan. 7, 2002

(51) Int. Cl.[7] ................................................ G06F 11/30
(52) U.S. Cl. ........................................ 702/182; 244/194
(58) Field of Search ........................ 702/182; 244/194, 244/219, 53 B, 55, 3, 21, 12.5, 2, 13, 17.13; 60/204; 102/501; 441/60; 114/144 R

(56) References Cited

U.S. PATENT DOCUMENTS

| | | | |
|---|---|---|---|
| 3,976,266 A | 8/1976 | Fieuzal et al. | 244/3.21 |
| 4,735,085 A | 4/1988 | Meyer | 73/147 |
| 5,582,364 A * | 12/1996 | Trulin et al. | 244/3.29 |
| 6,378,801 B1 * | 4/2002 | Pell et al. | 244/3.24 |
| 6,520,104 B1 * | 2/2003 | Svensson | 114/144 R |
| 2003/0080256 A1 * | 5/2003 | Urnes et al. | 244/194 |

OTHER PUBLICATIONS

NSWCDD/TR–00/009, "Improvements in Pitch Damping for the Aeroprediction Code with Particular Emphasis on Flare Configurations", Frank G. Moore and Tom C. Hymer, Apr. 2000.

* cited by examiner

Primary Examiner—John Barlow
Assistant Examiner—Xiuqin Sun
(74) Attorney, Agent, or Firm—Matthew J. Bussan, Esq.; Daniel W. Juffernbruch; Raymond H. J. Powell, Jr., Esq.

(57) ABSTRACT

An improved aeroprediction code (APC) allows aerodynamics to be predicted for Mach numbers up to 20 for configurations with flares. Moreover, the improved APC advantageously extends the static aerodynamic predictions for Mach numbers less than 1.2, improves the body alone pitch damping for Mach numbers above 2.0, and develops a new capability for pitch damping of flared configurations at Mach numbers up to 20. The improved APC also permits determination of aerodynamic effects associated with power-on events and trailing edge flaps. Corresponding methods are also described.

3 Claims, 31 Drawing Sheets

FIG.3A
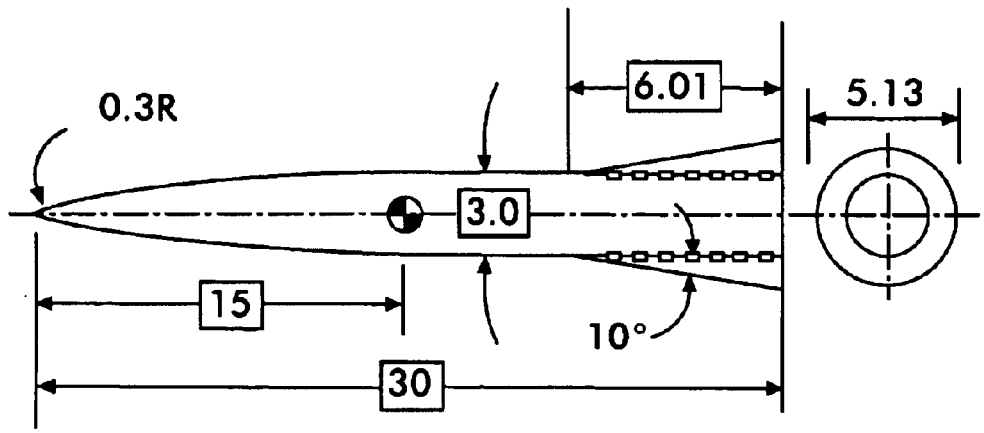
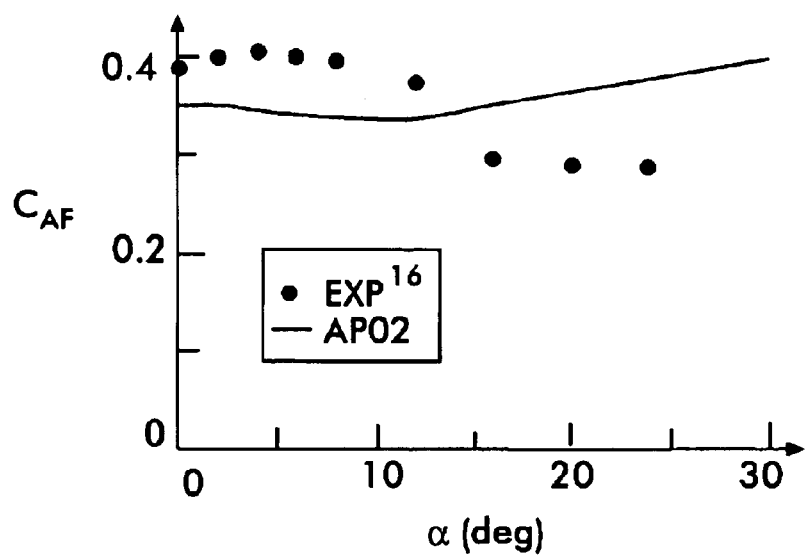
FIG.3B

*FIG.6A*
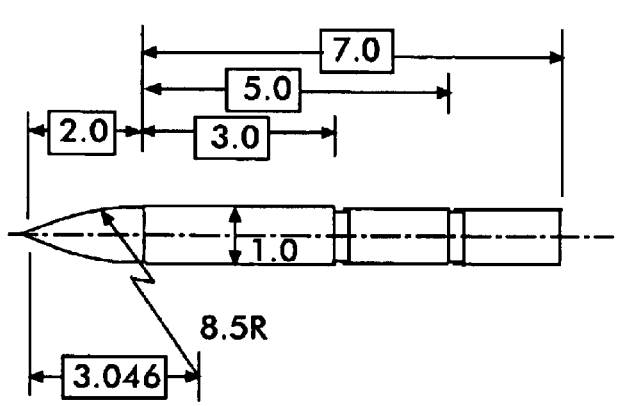
*FIG.6B*
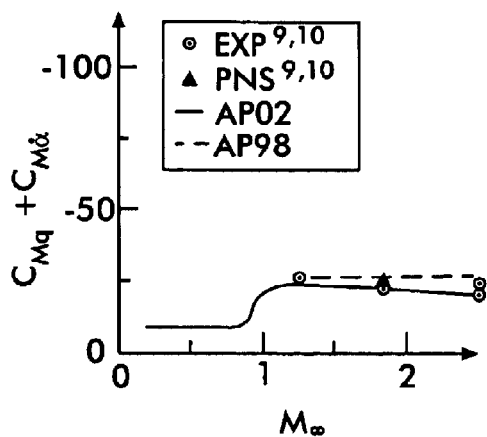
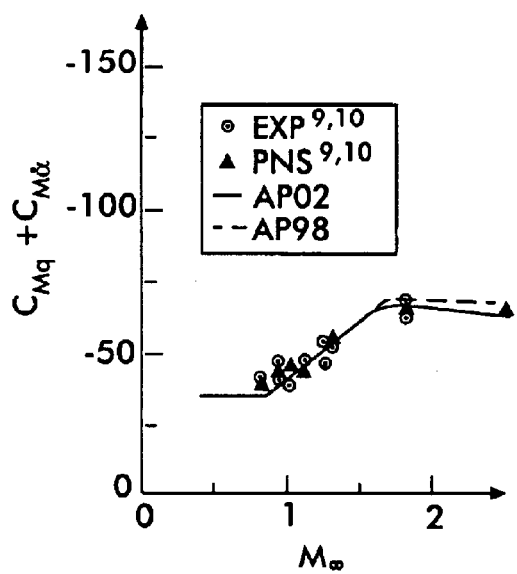
*FIG.6C*
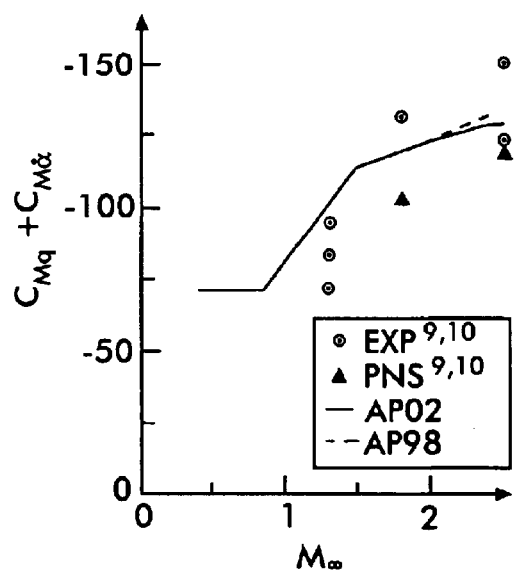
*FIG.6D*

FIG.IIA
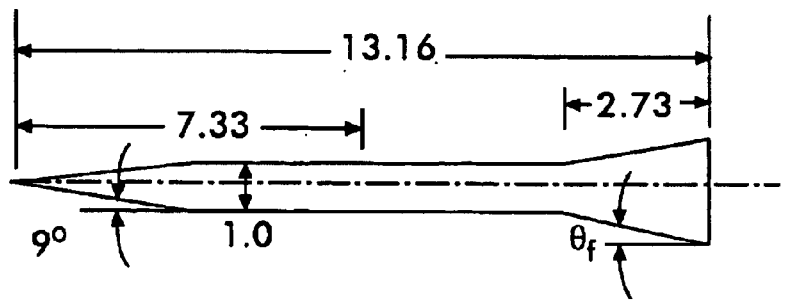
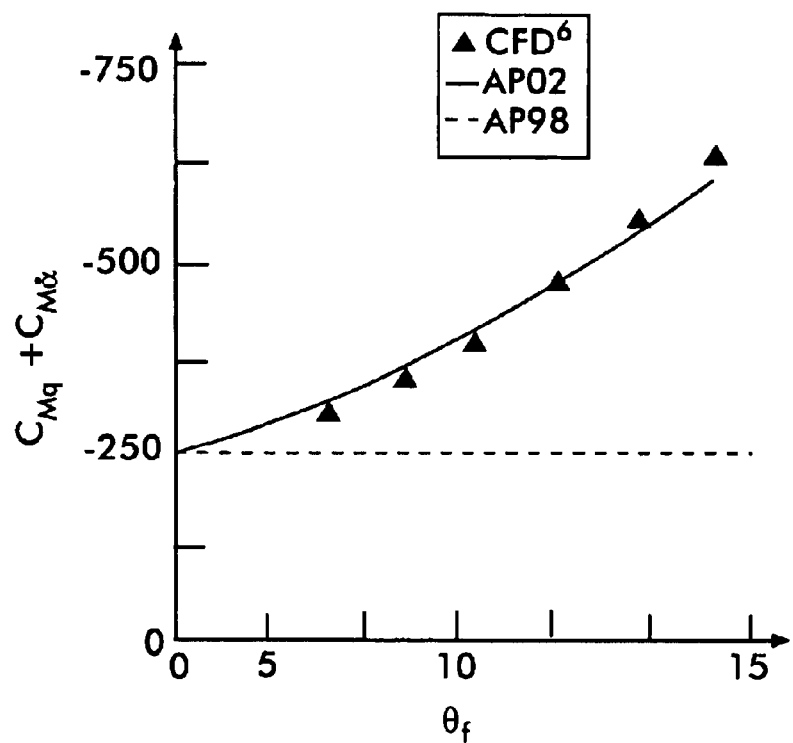
FIG.IIB

FIG.16
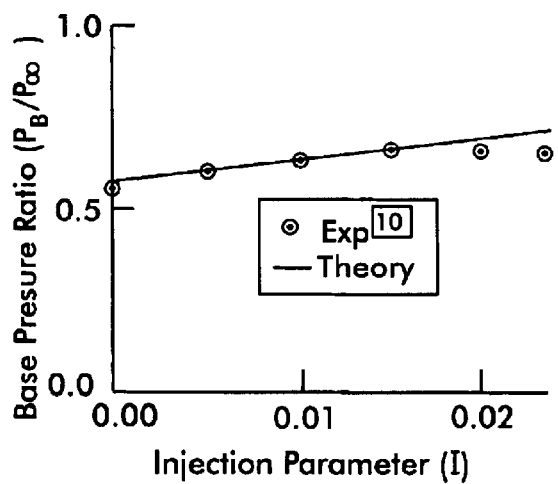
FIG.17
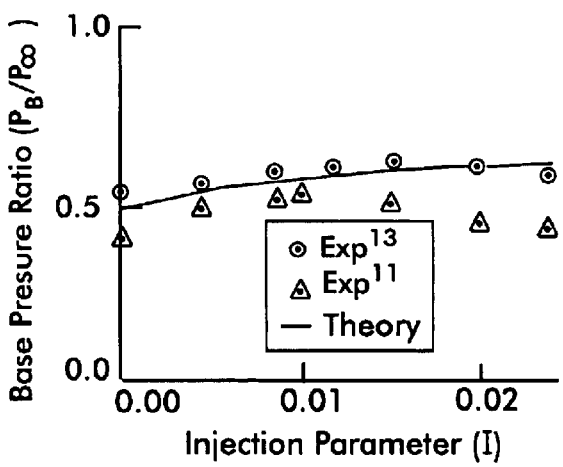
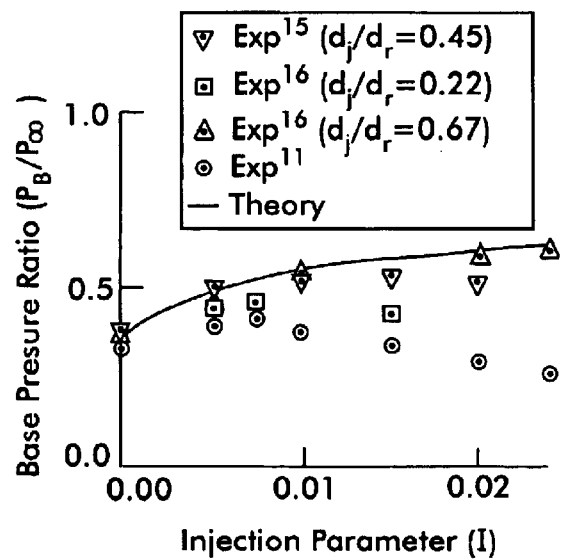
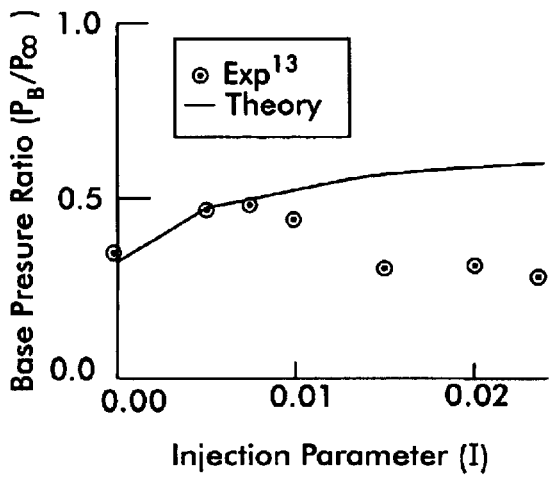
FIG.18A
FIG.18B

FIG.23
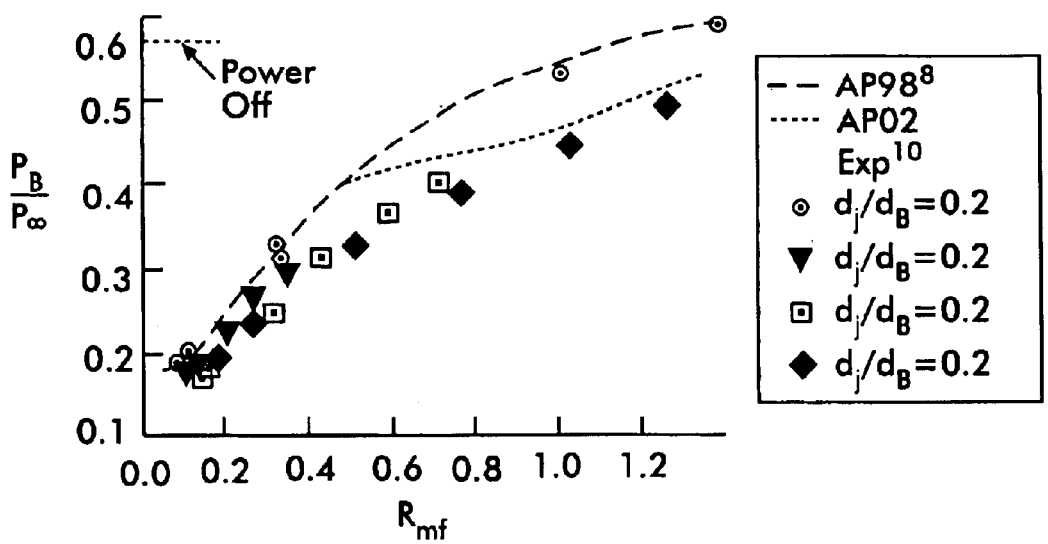
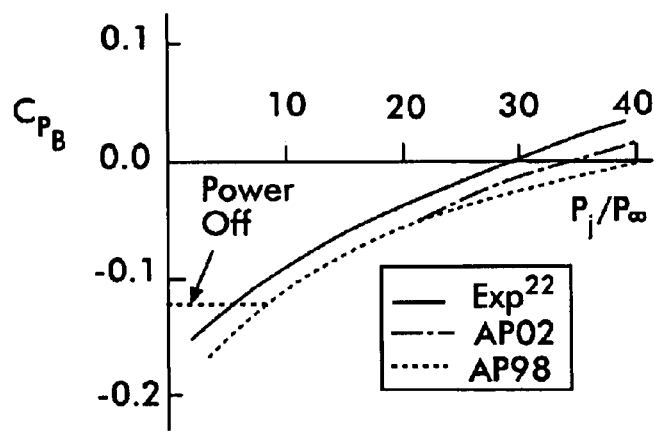
FIG.24

FIG.25
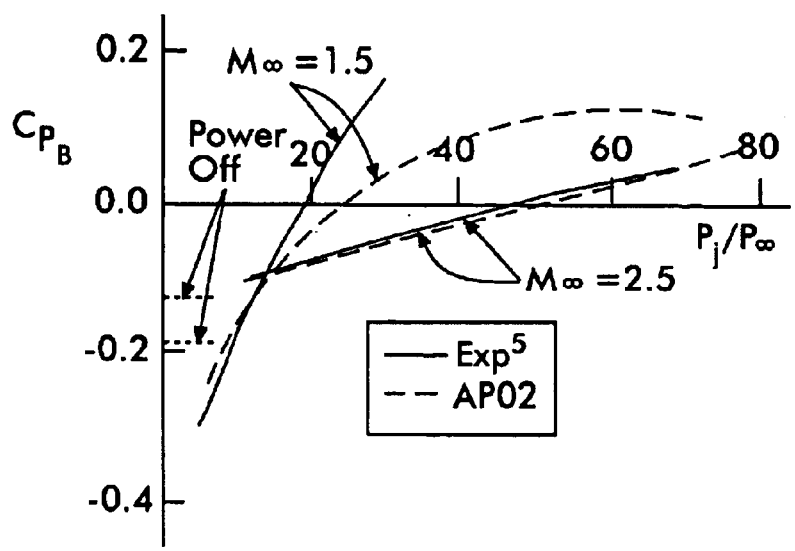
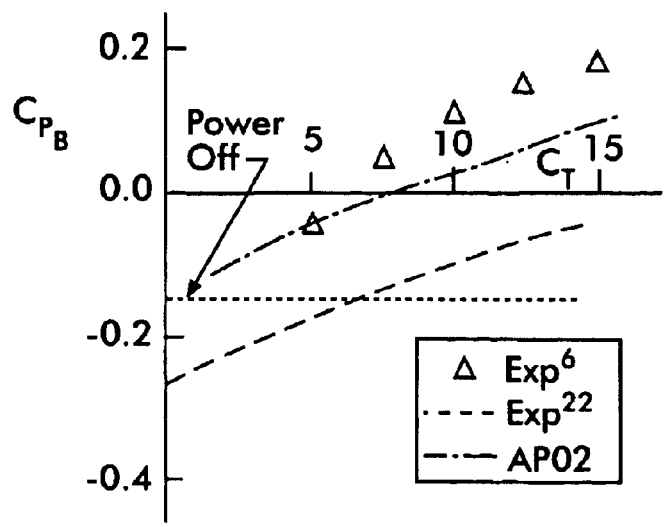
FIG.26

FIG.27A
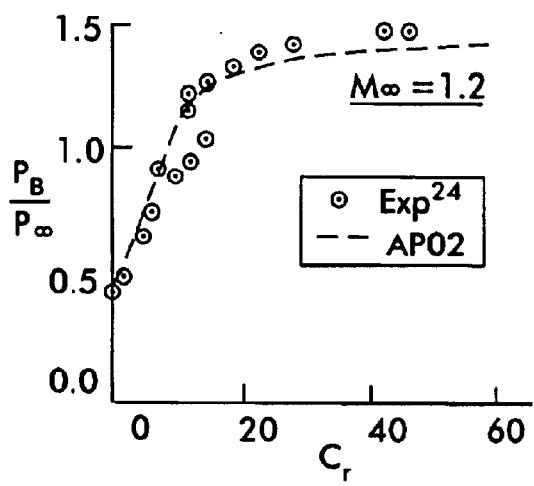
FIG.27B
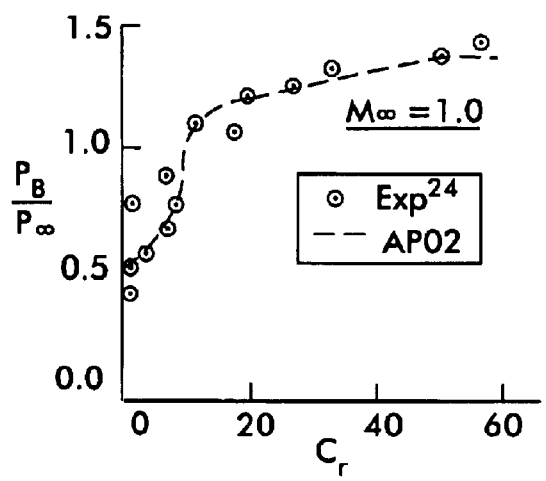
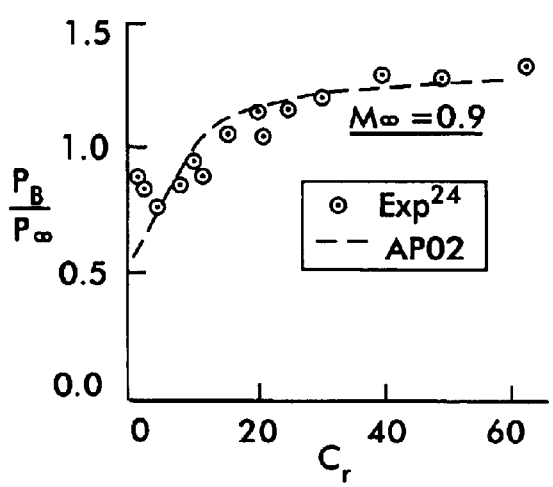
FIG.27C

FIG.29A
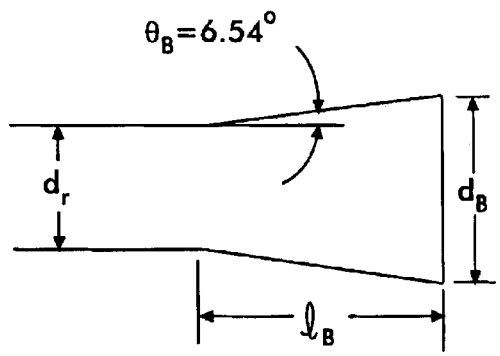
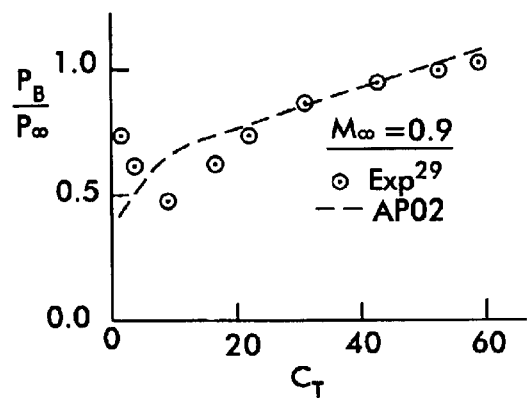
FIG.29B
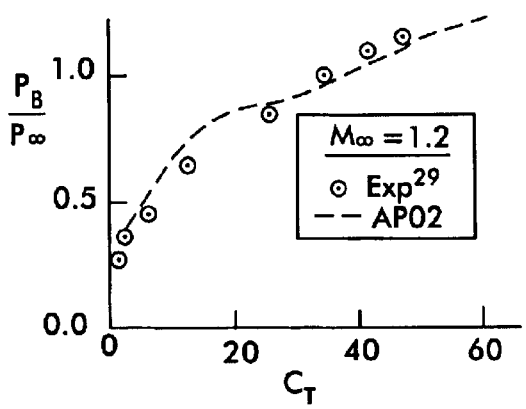
FIG.29C
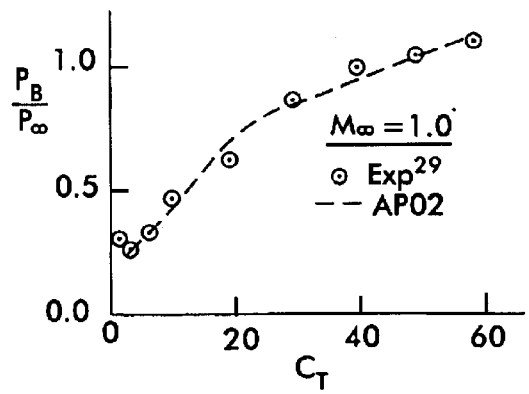
FIG.29D

FIG.30A
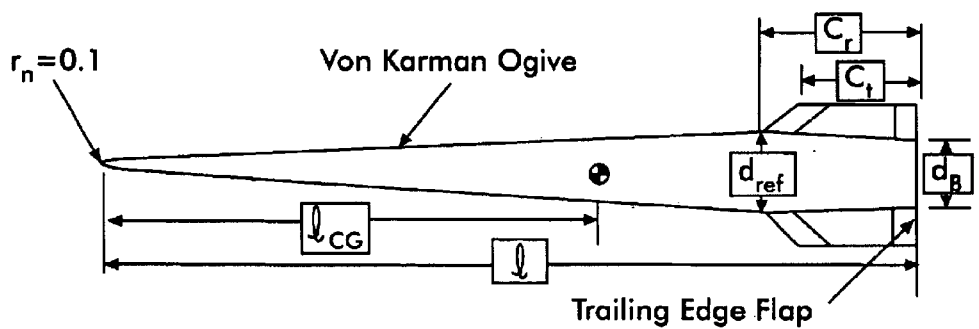
FIG.30B
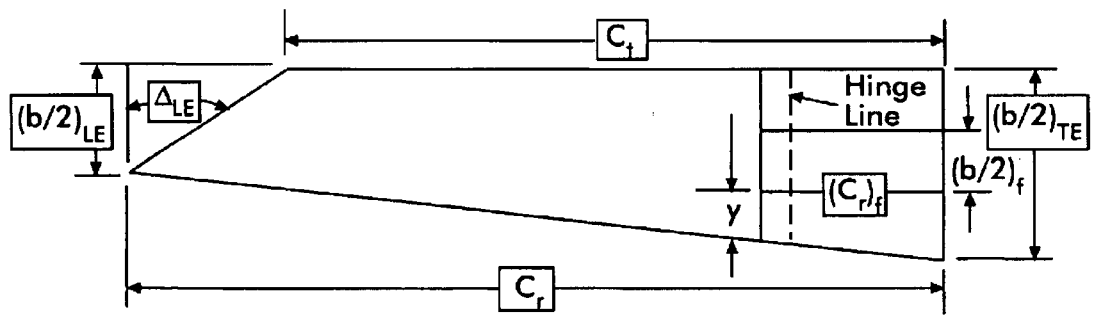
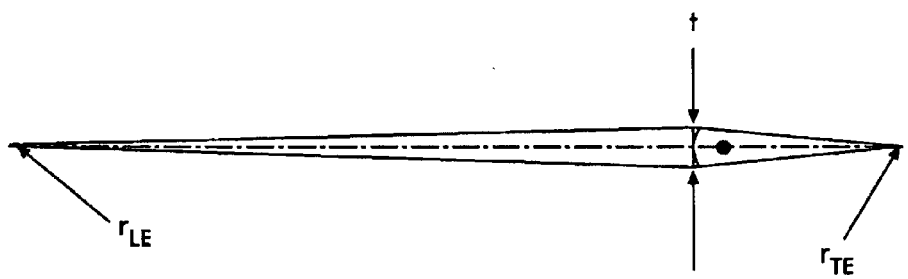
FIG.30C

FIG.36C
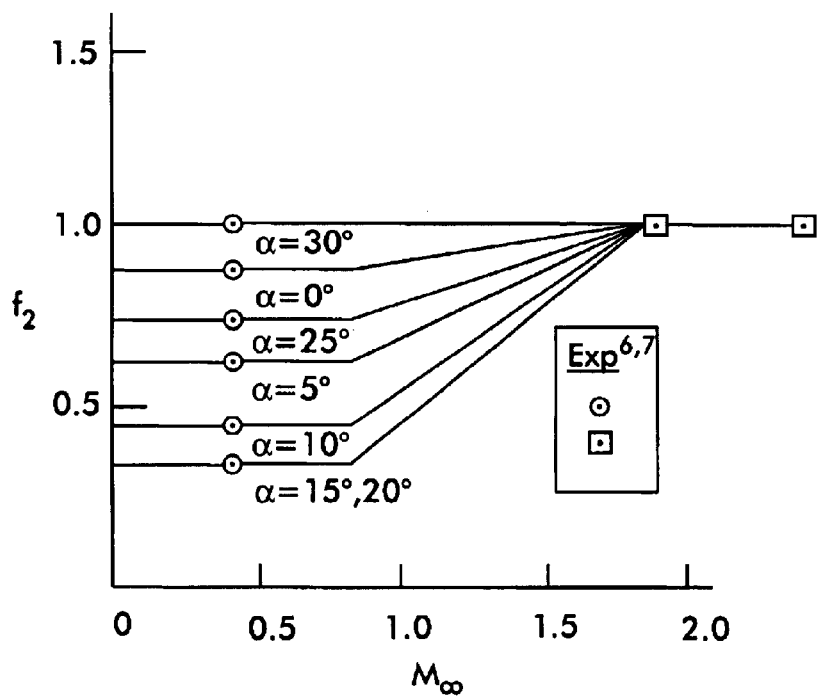
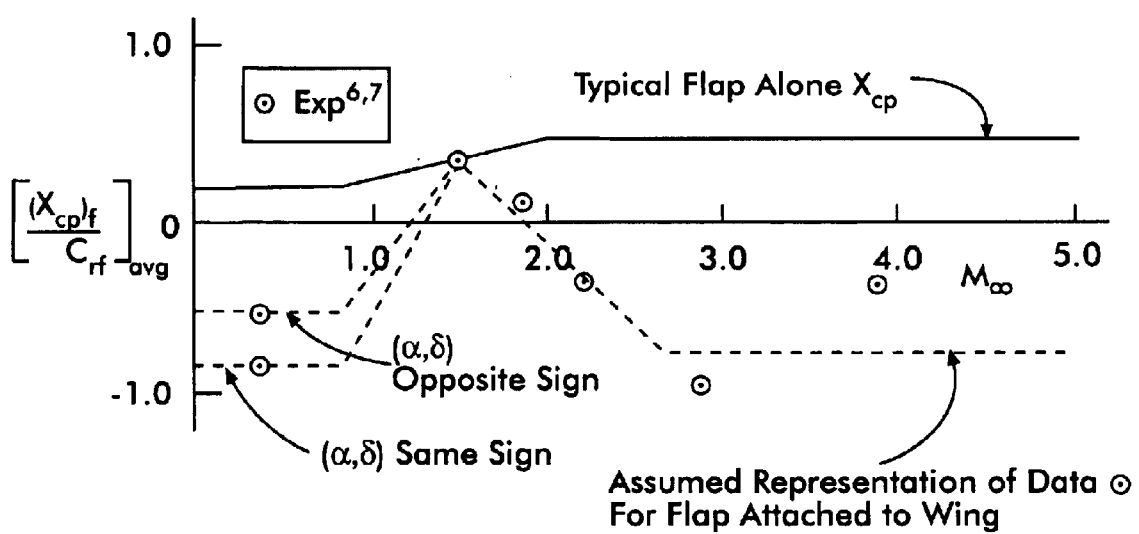
FIG.37

AERODYNAMIC PREDICTION USING SEMIEMPIRICAL PREDICTION TECHNIQUES AND METHODS THEREFOR

STATEMENT OF GOVERNMENT INTEREST

The invention described herein was made in the performance of official duties by employees of the Department of the Navy and, thus, may be manufactured, used, licensed by or for the Government of the United States of America for governmental purposes without the payment of any royalty thereon or therefor.

BACKGROUND OF THE INVENTION

The present invention relates generally to aerodynamic prediction methods. More specifically, the present invention relates to improved aerodynamic prediction techniques and corresponding methods employing semiemperical code.

The instant application is based on Provisional Patent Application No. 60/259,689, which was filed on Jan. 5, 2001. That Provisional Patent Application is incorporated by reference in its entirety.

The 1998 version of the NSWCDD Aeroprediction Code (AP98) described in the report by Moore, F. G., McInville, R. M., and Hymer, T. entitled "The 1998 Version of the NSWC Aeroprediction Code: Part I—Summary of New Theoretical Methodology" (NSWCDD/TR-98/1, April 1998) (Ref. 1) is the most complete and comprehensive semiempirical code produced to date. It includes the capability to predict planar aerodynamics in the roll positions of Φ=0 deg (fins in "+" or plus orientation as viewed from the rear of the missile) and Φ=45 deg (fins in "×" or cross roll orientation as viewed from the rear of the missile) over a broad range of flight conditions and configuration geometries with good average accuracy, computational times and ease of use. Flight conditions include angles of attack (AOA) up to 90 deg, control deflections of up to ±30 deg, and Mach numbers up to 20. Configuration geometries include axisymmetric and nonaxisymmetric body shapes with sharp, blunt, or truncated nose tips, with or without a boattail or flare. Up to two sets of planar or cruciform fins are allowed.

New technology has recently been developed to allow both six- and eight-fin options in the fin considerations as well. See Ref. 2, i.e., a report by Moore, F. G., McInville, R. M., and Robinson, D. I. entitled "A Simplified Method for Predicting Aerodynamics of Multi-Fin Weapons," (NSWCDD/TR-99/19, March 1999). Moreover, many of the constants used in the aeroprediction code have been refined, as reported by Moore, F. G. and McInville, R. M. in Ref. 3, which is a document entitled "Refinements in the Aeroprediction Code Based on Recent Wind Tunnel Data" (NSWCDD/TR-99/116, December 1999), based on a more recent wind tunnel data base (See also Ref. 4, e.g., Allen, J. M., Hemsch, M. J., Burns, K. A., and Oeters, K. J., "Parametric Fin-Body and Fin-Alone Database on a Series of 12 Missile Fins," NASA LRC TM in publication, May 1996.), allowing more accurate aerodynamic estimates at all AOAs. Average accuracies are ±10 percent for normal and axial force and ±4 percent of body length for center of pressure. Average accuracy signifies that enough AOAs or Mach numbers are considered to get a good statistical sample. It will be noted that, on occasion, a single data point can exceed these average accuracy values.

Ease of use has been significantly enhanced over older versions of the Aeroprediction Code (APC) through a personal-computer-based pre- and post-processor package. See Ref. 5, which is a report by Hymer, T. C., Downs, C., and Moore, F. G. entitled "Users Guide for an Interactive Personal Computer Interface for the 1998 Aeroprediction Code (AP98)" (NSWCDD/TR-98/7, June 1998). This package has allowed inputs for configuration geometries to be simplified significantly by many automated nose shape options.

While the AP98 is a very powerful tool, several limitations and areas of improvement still remain. Most of these needs are driven by the desire of future weapon designers to perform tradeoff studies on new and innovative concepts that may fall outside of the current capability of the AP98. An example of this type of requirement is the multi-fin requirement that has just been completed.

What is needed is an improved APC that includes the capability to model the deflection of the rear segment of a fin (sometimes referred to as flaperon or aileron) for control, as opposed to the entire fin. It would be desirable if the improved APC included the capability of predicting the drag accurately for all power on conditions. It would also be advantageous if the improved APC included the capability to predict the aerodynamics of projectiles that use a flare for stability (as opposed to fins).

SUMMARY OF THE INVENTION

Based on the above and foregoing, it can be appreciated that there presently exists a need in the art for improved semiemperical methods for predicting aerodynamic performance which overcome the above-described deficiencies. The present invention was motivated by a desire to overcome the drawbacks and shortcomings of the presently available technology, and thereby fulfill this need in the art.

According to one aspect, the present invention provides an improved aeroprediction code (APC) that allows aerodynamics to be predicted for Mach numbers up to 20 for configurations with flares. Moreover, the improved APC advantageously extends the static aerodynamic predictions for Mach numbers less than 1.2, improves the body alone pitch damping for Mach numbers above 2.0, and develops a new capability for pitch damping of flared configurations at Mach numbers up to 20.

It will be noted that this additional capability for treating flared configurations has been validated for several different configurations in the Mach number range of 2 to 8.8. In general, pitch damping predictions of the improved capability was within 20 percent of either experimental data or computational fluid dynamics calculations. It will be appreciated that this accuracy level is quite adequate for dynamic derivatives generated during the preliminary design stage. It will also be appreciated that these new additions to the aeroprediction code will be transitioned to users as part of the 2002 version of the code (AP02).

According to another aspect, the present invention provides improved methods for base pressure prediction under base bleed and rocket motor-on conditions. More specifically, the base bleed method makes several refinements to the method developed by Danberg at the Army Research Laboratory in Aberdeen, Md. The improved rocket motor-on, base pressure prediction improves upon the method developed at the Army Missile Command in Huntsville, Ala. by Brazzel and some of his colleagues. The major refinement to the base bleed method of Danburg was to estimate the power-off value of base pressure empirically based on an extensive data base, as opposed to using computational fluid dynamics codes to predict this term. The major modifications to the power-on base pressure prediction method of Brazzel was to extend its range of applicability to high values of thrust coefficient, to Mach numbers less than 1.5, and to different afterbody shapes. In comparing the improved methods for power-on base drag prediction to experiment, it was seen that both methods gave reasonable agreement to most experimental data bases. However, more validation is needed, particularly for the combined effects of angle of attack, fins, and power-on conditions.

According to a further aspect, the present invention provides an Improved Semiempirical Method for estimating the static aerodynamics of configurations that use a trailing edge flap for control. The method is based on deflecting the full aft-located lifting surface an amount that allows the normal force coefficient to be equal to that generated by the deflected flap. A transfer in pitching moments and a modified axial force coefficient is derived to complete the set of static aerodynamics. The method is derived using theoretical methods that are a part of the 1998 version of the Naval Surface Warfare Center aeroprediction code and two sets of experimental data. Comparison of the improved method to available data shows the method to give satisfactory results over the practical range that trailing edge flaps are contemplated for use. Additional wind tunnel data advantageously can be employed to further refine and expand the applicability of the disclosed method. This is particularly true for transonic Mach numbers and for supersonic Mach numbers where the angle of attack and control deflection are of the same sign.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 3A, 3B, 3C, and 3D collectively provide a comparison between theory and experiment for static aerodynamics of a body-flare configuration ($M_\infty=2.01$, $R_N/ft=2\times 10^6$), where FIG. 3A illustrates a body with a 10 degree flare, FIG. 3B is a graph illustrating both experimental and calculated forebody axial force coefficient, FIG. 3C is a graph illustrating both experimental and calculated normal force coefficient.

FIGS. 4A, 4B, 4C, and 4D collectively illustrate static aerodynamic parameters of a standard flared body, i.e., a F829 configuration ($M_\infty=5.9$, $\alpha \approx 0$ deg), where FIG. 4A illustrates Schematic of F829 Cone-Cylinder Flare Configuration[17] (all dimensions in calibers) (one caliber=27.05 mm), FIG. 4B is a graph of the forebody axial force coefficient, FIG. 4C is a graph illustrating the normal force coefficient slope, and FIG. 4D is a graph illustrating the pitching moment coefficient slope;

FIG. 1 is a schematic diagram of the of SOC Configuration (all dimensions in calibers; one caliber= 57.2 mm), while FIGS. 5B, 5C, and 5D compare results obtained by Parabolized Navier-Stokes (PNS), AP98 and AP02 techniques for body lengths of 5, 6, and 7 calibers, respectively;

FIGS. 6A, 6B, 6C and 6D collectively illustrate pitch damping moment coefficient predictions compared to experimental of an ANSR test body, where FIG. 6A is a schematic diagram of the ANSR test body (all dimensions in calibers; one caliber=20 mm.), while FIGS. 5B, 5C, and 5D compare results obtained by PNS, AP98 and AP02 techniques for body lengths of 5, 6, and 7 calibers, respectively, to experimental results;

FIG. 7A is a schematic diagram illustrating CS-V4-1 flare stabilized projectile geometry (all dimensions in calibers; 1 caliber=8.28 mm.) while

FIG. 8A is a schematic diagram illustrating CS-V4-2 flare stabilized projectile geometry (all dimensions in calibers; 1 caliber=8.28 mm.) while

FIG. 9A is a schematic diagram illustrating CAN4 flare stabilized projectile geometry (all dimensions in calibers) while

FIG. 10A is a schematic diagram illustrating a projectile having a flared projectile configuration (all dimensions in calibers) while

FIG. 11A is a schematic diagram illustrating a projectile having a control projectile configuration (all dimensions in calibers) while FIG. 11B depicts graphs comparing theoretical and experimental results for a pitch damping moment coefficient of the control projectile configuration for various flare angles ($M_\infty=4.4$);

FIG. 16 is a plot comparing t for base pressure ratio at base bleed conditions ($M_\infty=2.0$; dj/dr=0.4; Tj=520° R);

FIG. 17 graph that provides a comparison between theoretical and experimental results for base pressure ratio at base bleed conditions ($M_\infty=2.5$; dj/dr=0.4; Tj=520° R);

FIG. 18A is graph that provides a comparison of theoretical and experimental results for base pressure ratio at base bleed conditions ($M_\infty=3.0$; dj/dr=0.4; Tj=520° R) while FIG. 18B illustrates the upper limit of I versus dj/dr for accurate values of $P_B/P_\infty$;

FIG. 23 is graph that provides a comparison of power-on-base pressure prediction with experiment (Mj=2.0, M∞=2.0);

FIG. 24 is graph that provides a comparison of power-on-base pressure coefficient prediction with experiment (Mj=1.0, M∞=2.41, dj/d$_B$=0.5);

FIG. 25 is graph that provides a comparison of power-on-base pressure coefficient prediction with experiment (Mj=1.0, dj/d$_B$=0.45);

FIG. 26 is graph that provides a comparison of power-on-base pressure coefficient prediction with experiment (Mj=2.5, M∞=1.94, dj/d$_B$=0.75);

FIGS. 27A, 27B, and 27C are graphs that collectively provide a comparison of power-on-base pressure coefficient prediction with experiment (Mj=2.7, dj/d$_B$=0.8, 0.45; θj=20 deg);

FIGS. 28A is a schematic diagram if a boattail afterbody, while

FIG. 29A is a schematic diagram of a flare afterbody, while FIGS. 29B, 29C, and 29D are graphs that collectively provide a comparison of power-on-base pressure coefficient prediction with experiment for flare afterbody (dj/dr=0.8; θj=20 deg; θ$_B$=6.54 deg; l$_B$=1.34 cal; Mj=2.7);

FIGS. 30A, 30B, and 30C illustrate a projectile concept where tail trailing edge flap is deflected for control, where FIG. 30A illustrates the overall projectile while FIGS. 30B and 30C are expanded top and edge views of one of the tail fins, respectively;

FIG. 36A is a graph of a factor which corrects for use of secant versus tangent in normal force curve slope (α and δ of opposite signs) while FIG. 36C is a graph of a factor which corrects for use of secant versus tangent in normal force curve slope (δ$_f$=30 deg);

FIG. 37 is a ploy comparing flap alone and trailing edge flap attached to wing average center of pressure over angle of attack range of 0 to 30 deg for various Mach numbers;

DETAILED DESCRIPTION OF THE PREFERRED EMBODIMENTS

Before discussing any of the preferred embodiments according to the present invention, it should be noted that this discussion includes rigorous mathematical treatment of various static and dynamic situations. Appendix A provides a concise listing of the nomenclature employed throughout the specification. Moreover, various reports and papers are referenced in the discussion that follows; Appendix B provides a complete listing of these references. Finally, it should be mentioned that of the documents listed in Appendix B is incorporated herein by reference.

Figure 1A:
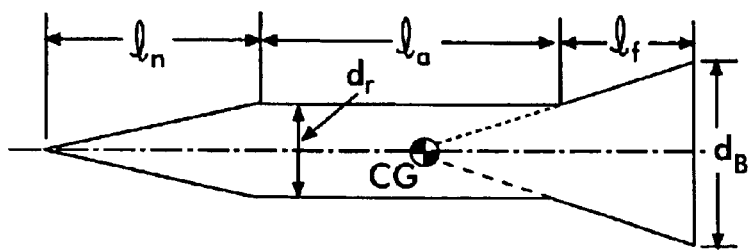
FIGS. 1A and 1B illustrate overall and detailed views, respectively, of a typical flare configuration while providing a summary of the significant geometrical parameters.
Figure 1B:
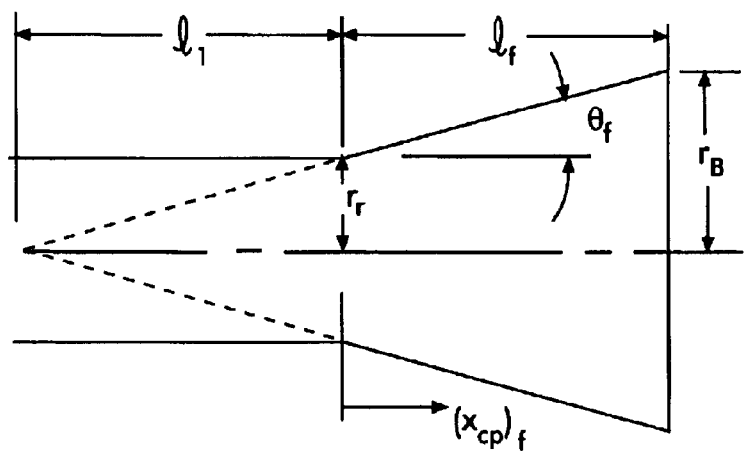

FIG. 1 illustrates the typical geometrical parameters associated with a flare. The two most important parameters are the flare length and angle, which can also be expressed in terms of the flare base to forward or reference diameter.

The problem of inaccurate aerodynamic predictions for flared configurations from the APC first came to the inventor's attention a couple of years ago in the form of the pitch damping moment coefficient predictions for a flared projectile concept at a AIAA meeting. The increased interest in the use of flares for stability in recent years, particularly for higher Mach numbers (see Refs. 6–8 for example), has also led the inventor to feel that improvements in the aerodynamic predictions of flared projectiles were needed.

As a result of the increased interest in flared projectiles for higher Mach number applications, the inventor decided to take a relook at the APC to determine its weak areas with respect to flared shaped projectiles. Several problem areas were identified. First of all, for the static aerodynamics, no particular attention was given for flared projectiles for M∞<1.2. For M∞≧1.2, low AOA aerodynamics are computed by theoretical methods such as Second-Order-Van-Dyke (SOVD) or Second-Order-Shock-Expansion-Theory (SOSET) and reasonable estimates of static aerodynamics (C$_A$, C$_N$, X$_{CP}$) can be obtained from the APC. For M∞<1.2, the capability to compute static aerodynamics needs to be incorporated into the code.

The second problem uncovered in the APC prediction of aerodynamics was for the dynamic derivative, $C_{M_q}+C_{M_{\dot\alpha}}$, or pitch damping moment coefficient. No capability exists at any Mach number in the APC for pitch damping moment of flared projectile shapes. In fact, based on recent computational fluid dynamic (CFD) calculations of projectiles without a flare See Refs. 9 and 10), it was found that the pitch damping moment of configurations without flares needed improvement as well. AP98 routine encounters problems in predicting aerodynamics of flared projectile shapes, i.e., the weak areas in predicting aerodynamics of flared configurations found in AP98, with respect to the following areas:
  a) $C_A$, $C_N$, $x_{CP}$ not available for $M_\infty<1.2$ for flare;
  b) Body alone $C_{M_q}+C_{M_{\dot\alpha}}$ needs improvement for $M_\infty \geq 1.2$ (no flare); and
  c) No pitch damping contribution for flare at any $M_\infty$ Each of the three weak areas mentioned above will be discussed individually in this section of the discussion regarding a first preferred embodiment according to the present invention. The discussion will be in terms of modifications that will be made to the AP98 to allow more accurate computations of aerodynamics of flared projectiles. These modifications will then be a part of the next release of the APC, which will be the AP02 code, which will be released later in 2002. More details of the work described with respect to this exemplary embodiment of the invention can be found in Ref. 11, which is specifically incorporated herein by reference.

The wave component of axial force for configurations with small flare angles ($\theta_f<15$ deg) can be calculated approximately with the perturbation theory of Wu and Aoyoma (Ref. 12) that was designed for boattails, except the angle is reversed in sign. There was a sign error in the AP98, but when this error was corrected, approximate estimates of wave drag for $M_\infty<1.2$ could be computed from the Ref. 12 method. For $M_\infty<0.9$, the wave drag component is assumed to be zero. Base drag and skin-friction drag were already being computed within the accuracy desired using the AP98 so no changes in the methodology for these aerodynamic terms were made.

The normal force and pitching moment coefficients and center of pressure for the flares are not predicted at all for $M_\infty<1.2$. Furthermore, numerical methods do not exist in the AP98 to allow calculations of $C_N$, $C_M$ and $x_{CP}$ for $M_\infty<1.2$. Also, as will be discussed later in the pitch damping computations for flares, $C_N$, $C_M$ and $x_{CP}$ for a flare will be needed at all Mach numbers.

To compute $(C_{N_\alpha})_f$ and $(x_{CP})_f$, one of several options are available. The first is to utilize the available values in the APC. Unfortunately, these values are only available for $M_\infty \geq 1.2$ where pressures are computed and integrated over the body surface. Also, the logic of the APC is such that this would require considerable changes to allow these calculations to be performed and brought forward into another subroutine. The second option would be to exercise the APC twice, once with a flare and once without and subtract the $C_{N_\alpha}$'s and $C_{M_\alpha}$'s to obtain the flare normal force coefficient derivative and its center of pressure. Again, this is not a very desirable alternative since the APC must be exercised twice to get a single number. A third option, which appears more attractive, is to exercise the APC code offline, compute values of $(C_{N_\alpha})_f$ and $(x_{CP})_f$ for $M_\infty \geq 1.2$ and store these in a table lookup as a function of geometric and freestream parameters. For $M_\infty<1.2$, slender body theory (SBT) can be used to approximate values of $(C_{N_\alpha})_f$ and $(x_{CP})_f$. The fourth and most attractive option is to use available cone tables[13] or approximate conical formulas to compute $(C_{N_\alpha})_f$, use SBT to approximate the center of pressure of the flare and $(C_{N_\alpha})_f$ for $M_\infty<1.2$, and to include these parameters in a table lookup as a function of geometry and Mach number.

This last option can be used since we are assuming the flare is a conical frustrum or can be approximated by a conical frustrum. The last option is the one that will be used in this analysis as it has the advantage of being at least as accurate as current computations in the APC due to use of an exact cone solution from Ref. 13. Also, this approach offers the opportunity to obtain results in a straightforward and direct way from the APC as opposed to more costly approaches of logic change in the APC or cycling through the APC twice to obtain results for the flare alone.

The $C_{N_\alpha}$ results for the total cone of Ref. 13 must be corrected to include only the frustrum portion of the cone and also put in the appropriate reference area format. Referring to FIG. 1, the percent of conical shape that is a flare is:

$$\frac{A_f}{A_C} = \frac{\pi[r_B^2 - r_r^2]}{\pi r_B^2} = 1 - \left(\frac{r_r}{r_B}\right)^2 \qquad (1)$$

Now the value of $C_{N_\alpha}$ obtained from Ref. 13 is based on the cone base area. Hence, Eq. (1) must be multiplied by $A_B/A_r$ to place it in the same reference area as other $C_{N_\alpha}$ components for the total configuration of FIG. 1. Thus, to relate the value of the $C_{N_\alpha}$ from Ref. 13 for a cone of given angle at a given Mach number to that of a flare we have $$(C_{N_\alpha})_f = (C_{N_\alpha})_C\left[1 - \left(\frac{r_r}{r_B}\right)^2\right]\left(\frac{r_B}{r_r}\right)^2 \text{ or} \qquad (2)$$

$$(C_{N_\alpha})_f = (C_{N_\alpha})_C\left[\left(\frac{r_B}{r_r}\right)^2 - 1\right]$$

Equation (2) is valid at all Mach numbers and for all geometries. However, $(C_{N_\alpha})_C$ is available from Ref. 13 for conditions where the flow is supersonic and the shock wave is attached to the conical tip. For conditions where these two assumptions are not met, SBT will be assumed in conjunction with interpolation. SBT gives $$(C_{N_\alpha})_C = 2.0 \qquad (3)$$

This value of $(C_{N_\alpha})_C$ will be assumed for $M_\infty \leq 0.8$. The value of $(C_{N_\alpha})_C$ from Ref. 13 can be used for low AOA calculations of most reasonable flares down to $M_\infty$ of about 1.2. Linear interpolation between SBT and Ref. 13 will be used for $0.8<M_\infty 1.2$.

In examining Eq. (2), it is seen that the $C_{N_\alpha}$ for a flare can get quite large if the flare is long or if the flare is short but has a large flare angle. This is why use of a flare is quite popular at higher Mach numbers, where the $C_{N_\alpha}$ for a fin decreases substantially with Mach number increase.

The SBT center of pressure for a cone is the same as that from exact theory. The center of pressure is at ⅔ of the cone length. However, for a conical frustrum, the center of pressure in general will vary between 0.5 $l_f$ and ⅔ $l_f$, depending on the flare angle. For flare angles approaching 0, the value of $(x_{CP})_f$ approaches 0.5 $l_f$ whereas for large flare angles, $(x_{CP})_f$ approaches ⅔ $l_f$. Referring to FIG. 1, the center of pressure of the flare using SBT can be shown to be[11]

$$(\bar{x}_{CP})_f = \frac{2}{3}\left(\frac{1}{1-r_r/r_B}\right)\left[\frac{1-(r_r/r_B)^3}{1-(r_r/r_B)^2}\right] - \frac{r_r/r_B}{1-r_r/r_B} \qquad (4)$$

Results of Eq. (4) are computed and plotted in FIG. 2 as a function solely of the parameter $r_r/r_B$. As seen in the FIG., when the body consists of a cone ($r_r=0$), then the center of pressure is at ⅔ of the cone or flare length (which are one and the same). On the other hand, when the flare angle goes to zero so that $r_r/r_B=1.0$, the center of pressure goes to $x_{CP}/l_f=0.5$. For most typical flare lengths and angles, $x_{CP}/l_f$ will vary from about 0.54 to 0.60.

Equation (4) results can be changed to body diameters by multiplying Eq. (4) by $l_f/d$ to obtain:

$$\left(\frac{x_{CP}}{l_f}\right)\left(\frac{l_f}{d}\right) = \frac{(x_{CP})_f}{d} \quad (5)$$

The combination of Eqs. (2)–(5) give the $C_{N_\alpha}$ and $x_{CP}$ for flares at all Mach numbers. $C_N$ is simply $$C_{N_f} = (C_{N_\alpha})_f \alpha \quad (6)$$

for small angles of attack. Since most flare configurations are designed to fly at small angles of attack, Eqs. (5) and (6) determine two of the desired static aerodynamic terms for a flare. The pitching moment coefficient of the flare about some reference location is then $$C_{M_f} = -\left(\frac{x_{CP} - x_{CG}}{d}\right) C_{N_f} \quad (7)$$

The body alone dynamic derivatives are all computed based on an empirical model developed by Whyte (Ref. 14) called "Spinner." The version that is incorporated into the AP98 is basically the same version as initially included in the APC series in 1977. The technology of Ref. 14 was based on curve fits of data using standard spin stabilized rounds. The curve fits have key parameters of length, boattail length, and Mach number for the dynamic derivative predictions. Magnus force and moments are also estimated at both 1 and 5 deg angles of attack to incorporate some nonlinearity due to AOA in the Magnus moment. The data bases upon which the empirical curve fits were based were primarily limited to about 5.5 calibers and Mach numbers less than 5.0 (newer versions of Spinner may now be available which remove these limits). However, length was considered in a linear sense for roll damping moment and one of the data bases had length as a parameter for pitch damping moments as well.

Since the late 1960's and early 1970's, the Army Research Laboratory (ARL) at Aberdeen, Md. has developed a very good CFD capability to compute both static and dynamic derivatives of projectiles, with and without flares. References 6, 7, 9, and 10 are some of the reports generated by ARL using CFD. As a result of these many CFD computations, and comparison to data, one can now fine tune the older "Spinner" Model[14] to be more representative of a broader class of configurations.

In comparing the AP98 (in essence the "Spinner" model) predictions of pitch damping moment to ballistic range data and CFD predictions of Refs. 6, 7, 9, and 10, a problem existed. The Spinner results appeared to be reasonable for $M_\infty \leq 1.2$ but overpredicted $C_{M_q}+C_{M_{\dot\alpha}}$ as Mach number increased. The higher the Mach number, the worse the predictions became. On the other hand, the errors followed a fairly smooth pattern, allowing a correction to be derived based on CFD results from Refs. 6, 7, 9, and 10.

The modified pitch damping moment coefficient for bodies without a flare present is therefore $$C_{M_q}+C_{M_{\dot\alpha}} = (C_{M_q}+C_{M_{\dot\alpha}})_S F_1 \quad (8)$$

where $(C_{M_q}+C_{M_{\dot\alpha}})_S$ is the value obtained from the AP98 (Ref. 1), which basically uses Ref. 14. $F_1$ is an empirical decay factor for Mach number derived using the AP98 and Refs. 6, 9, and 10. Here, $F_1$ is a function of Mach number and total length of the projectile and is defined by the following model.

a) $\quad l/d \leq 5.0 \quad (9)$
$F_1 = 1.0; \quad M_\infty \leq 1.2$
$F_1 = 0.0043\, M_\infty^2 - 0.151\, M_\infty + 1.175;$
$1.2 < M_\infty \leq 5.0$
$F_1 = 0.53; \quad M_\infty > 5.0$ b) $\quad l/d = 8 \quad (10)$
$F_1 = 1.0; \quad M_\infty \leq 2.0$
$F_1 = 0.0031\, M_\infty^2 - 0.0884\, M + 1.164;$
$2.0 < M_\infty \leq 5.0$
$F_1 = 0.8; \quad M_\infty > 5.0$ c) $\quad 5 < l/d < 8 \quad (11)$
$F_1 = F_1(l/d = 5) - \left(\frac{l/d - 5}{3}\right)$
$[F_1(l/d = 5) - F_1(l/d = 8)]$ d) $\quad l/d \geq 12 \quad (12)$
$F_1 = 1.0; \quad M_\infty \leq 2.0$
$F_1 = 0.0011\, M_\infty^2 - 0.111\, M_\infty + 1.178;$
$2 < M_\infty \leq 5.0$
$F_1 = 0.9; \quad M_\infty > 5.0$ e) $\quad 8 < l/d < 12 \quad (13)$
$F_1 = F_1(l/d = 8) - \left(\frac{l/d - 8}{4}\right)$
$[F_1(l/d = 8) - F_1(l/d = 12)]$ A typical body configuration with a flare present is shown in FIG. 1. As already mentioned, the AP98 code does not calculate a value of additional pitch damping due to the presence of a flare. The approximate method used here to represent the flare is basically to use the Ref. 15 approach where $$(C_{M_q} + C_{M_\alpha})_f = -2(C_{N_\alpha})_f \left(\frac{x_{CP} - x_{CG}}{d}\right)_f^2 \quad (14)$$

Equation (14) was used in Ref. 15 to approximate the pitch damping moment coefficient of a wing, but here the flare replaces the wing planform area. $(C_{N_\alpha})_f$ of Eq. (14) is defined by Eq. (2). $(x_{CP})_f/d$ of Eq. (14) is defined by Eqs. (4) and (5) and FIG. 2. Finally, since Eq. (2) already includes the approximate reference areas, Eq. (14) is appropriate as it stands. Equation (14) only includes that portion of the flare area external to the cylindrical part of the body (see Eq. (1)). This is because the body alone pitch damping moment discussed earlier already includes the cylindrical part of the afterbody.

In this part of the discussion of a first preferred embodiment according to the present invention, we will show the comparison of the approximate methods to predict aerodynamics of flared configurations to both CFD and experimental results. Static aerodynamic predictions of flared configurations will be considered first. Unfortunately, the inventors were only able to find data in the literature for Mach numbers of 2.0 and greater. Hence, the new inclusion into the APC of flare static aerodynamics for $M_\infty<1.2$ cannot be validated at present. However, existing static aerodynamic predictions for low supersonic to hypersonic Mach numbers can be assessed. It is suspected that the reason for the lack of static aerodynamic data at low Mach numbers for flare stabilized configurations is that the practical application of flare configurations is at high Mach number. This is because fins lose their effectiveness as stabilizing devices as Mach number increases, along with posing problems for leading edge heating and ablation. On the other hand, flares are just as effective at high Mach number as at low in providing stability, although they give high drag compared to fins, particularly at low Mach number. Four cases for static aerodynamics of flares are considered in Ref. 11. Only two of those cases will be presented here.

Figure 3C:
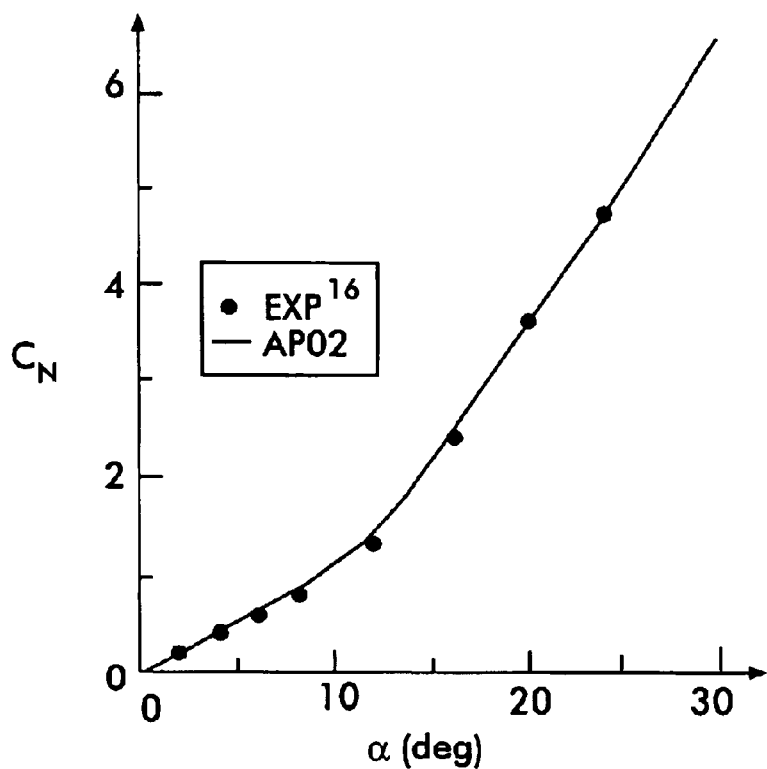
Figure 3D:
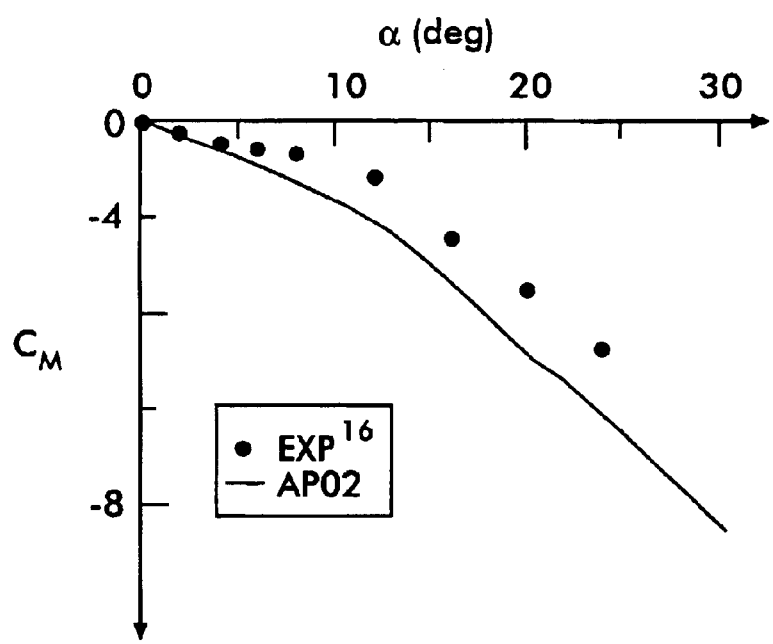
Figure 4A:
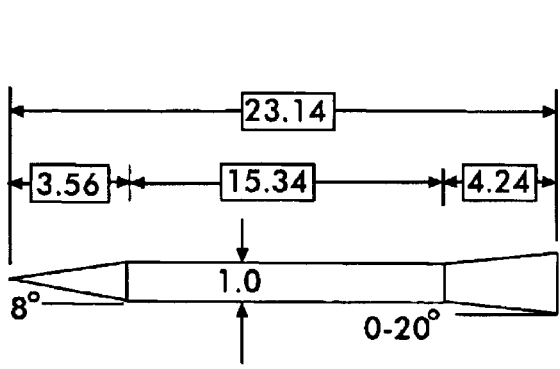
Figure 4B:
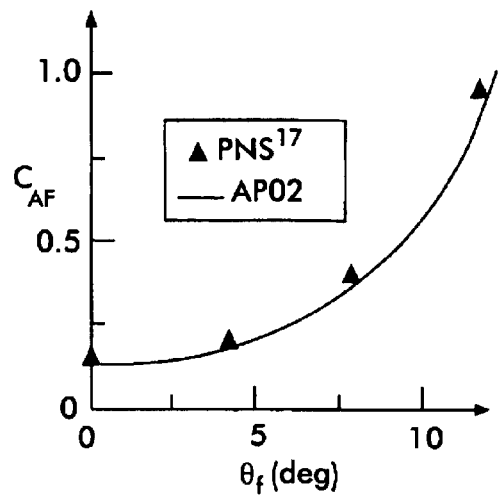
Figure 4C:
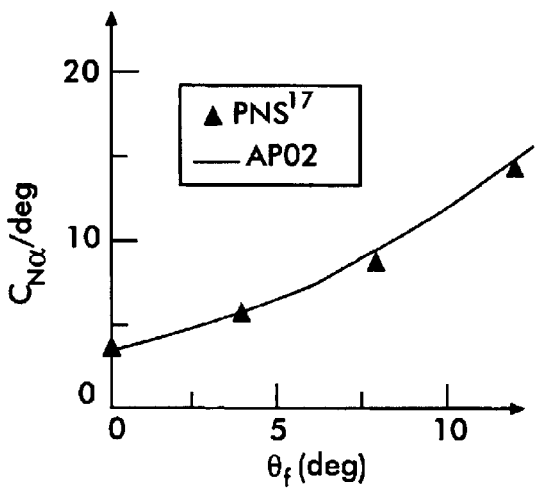
Figure 4D:
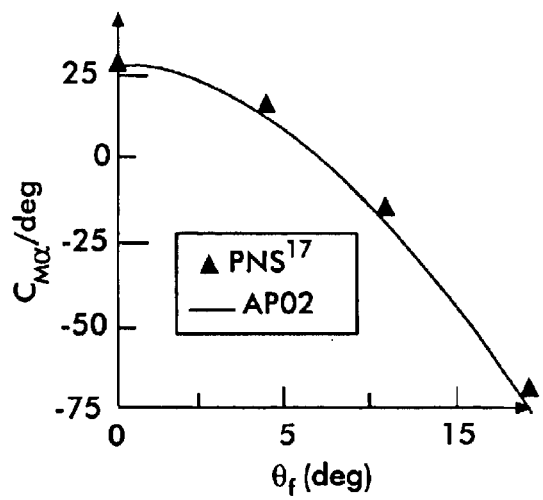
FIG. 4D is a graph illustrating both experimental and calculated pitching moment coefficient.
Figure 5A:
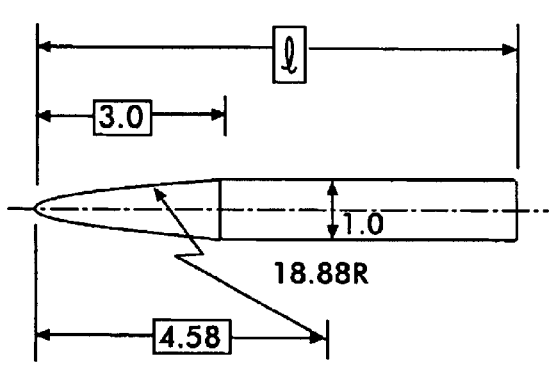
FIGS. 5A, 5B, 5C, and 5D collectively illustrate pitch damping moment coefficient predictions for a SOC configuration, where
Figure 5B:
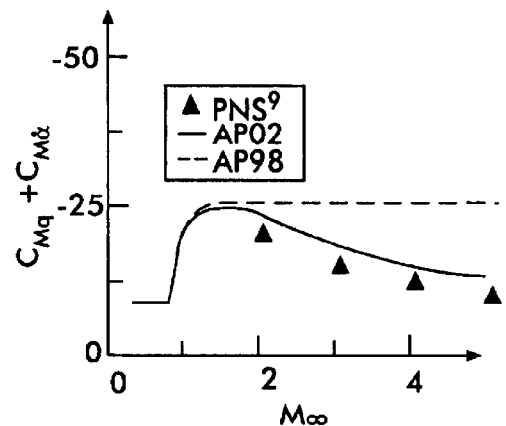
Figure 5C:
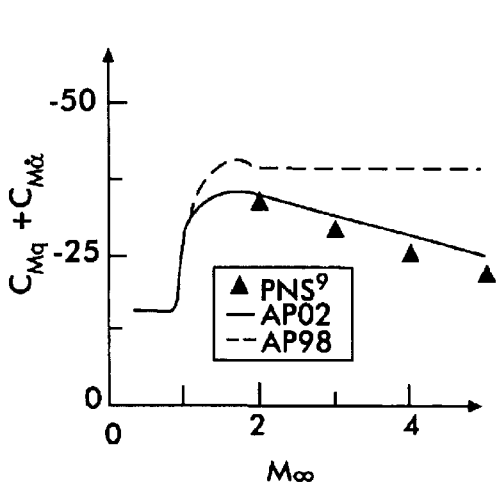
Figure 5D:
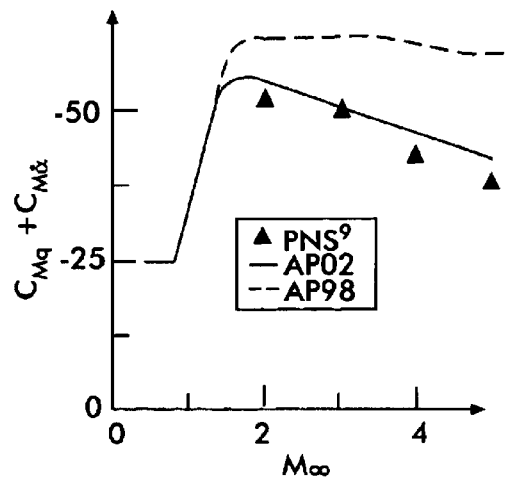

The first case shown for static aerodynamics validation is given in FIG. 3 and is taken from Ref. 16. This configuration is a blunted Von Karman ogive-cylinder-flare case with a 10 deg. 2 caliber flare. Wind tunnel data was taken at $M_\infty=2.0$ and $R_N$/ft of $2\times10^6$ without a boundary layer trip present. Comparison of the theory (here shown as AP02) to experiment for the forebody axial force, normal force, and pitching moment coefficients is given in the Fig. The axial force is not as accurate as desired. However, this could be due to the fact that the base pressure term was subtracted from the total axial force. This term was larger than the friction and wave drag terms combined. Hence, a small error in measuring the base pressure of 5 to 10 percent could account for most or all of the discrepancy between theoretical and experimental results for the axial force coefficient of FIG. 3B. Normal force predictions are excellent and pitching moments are quite acceptable. The average center of pressure error is less than 4 percent of the body length, which means the predictions are within the ±4 percent of body length error accuracy goal stated for the AP02. The average normal force error is under 2 percent. Since no total axial force measurements were given, an accuracy assessment on the axial force cannot be given.

The second flared configuration where static aerodynamics is shown is given in FIG. 4. It is a very long (23.14 calibers) configuration with a flare that is 4.24 calibers in length and flare angle that varies from 0 to 20 deg. Data were given in Ref. 17 at $M_\infty$32 4.4, 5.9, and 8.8. All three cases showed similar trends and the AP02 predictions were similar, so only the $M_\infty=5.9$ case is shown in FIG. 4. Aerodynamics shown include the forebody axial force coefficient and the normal force and pitching moment slopes near α=0 deg. No experimental data was given in Ref. 4, only Parabolized Navier-Stokes (PNS) calculations at sea level conditions where fully turbulent flow was assumed. The AP02 predictions agree quite well with the PNS calculations for all the aerodynamic coefficients at all flare angles.

The next aerodynamic term to be considered in the validation process is body alone pitch damping moment where no flare is present. The modifications to the AP98 predictions (which are basically taken from the old GE Spinner program (Ref. 14) were discussed in the analysis section above. A recent report from the Army Research Laboratory (Ref. 9) showed PNS calculations of pitch damping on a 5, 6, and 7 caliber configuration with (SOCBT) and without a boattail (SOC). Computations were available from $M_\infty=2$ to 5. These results were instrumental in the inventor concluding that the AP98 pitch damping computations for a body alone needed improvement for higher Mach numbers. FIG. 5 shows the comparison of the improvements in the AP02 compared to the AP98 predictions and PNS predictions for pitch damping moment for a body alone (no flare present). While the AP02 does not agree perfectly with the PNS computations, it shows drastic improvement over the AP98 for $M_\infty \geq 2.0$ at all the body lengths (5, 6, and 7 calibers) shown in FIG. 5. The center of gravity was held to a constant percent of the total body length of 60 percent in these calculations. A note of caution is given here to the reader. The Ref. 9 (and all Army results) use a nondimensionalization of $qd/V_\infty$ for the pitch damping whereas the Navy uses $qd/(2V_\infty)$. Hence, all Army results had to be multiplied by 2 to compare to Navy results. Results for the SOCBT case were even better than those for the SOC case. These results are shown in Ref. 11.

The last body alone case considered for validation of the improved pitch damping predictions is given in FIG. 6. This configuration is the Army-Navy-Spinner (ANSR) case which consists of a 2.0 caliber tangent ogive nose followed by a 3, 5, and 7 caliber cylindrical afterbody. Total body lengths are therefore 5, 7, and 9 calibers. Results were given in Refs. 9 and 10 consisting of PNS calculations and ballistic range data. Data were available for all configurations for $M_\infty$ between 1.3 and 2.5 and for the 7 caliber case, for $M_\infty$ between 0.8 and 2.5. Also several center of gravity locations were given in Refs. 9 and 10, but only the case where the center of gravity was at about the 60 percent location (which is typical of most ammunition) is shown here. A couple of points are of interest. First of all, for Mach numbers below about 1.5, the old AP98 predicts pitch damping quite adequately. Also for Mach numbers as high as 2.5, predictions are not that bad for the AP98, so only minor improvements are shown using the AP02 for this configuration due to the low Mach numbers considered. This makes sense because the Ref. 14 methodology was based on available data, which in the 1970's consisted mainly of shells with $0.8 \leq M_\infty \leq 2.5$ and lengths of 4 to 7 calibers. The second point to note from FIG. 6 is that for the longest configuration (l=9 calibers), there is a large scatter in the ballistic range data, but the predictions still appear to be reasonable, given the large scatter in data.

Figure 7A:
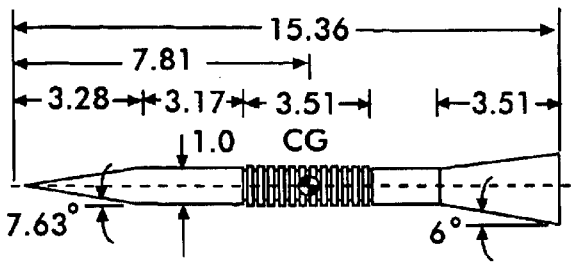

We are now ready to validate the AP02 predictions of pitch damping moment for flare configurations. Recall that this was the motivation regarding the present invention as well as the improvements to the AP98, since the AP98 did not give any additional pitch damping due to the presence of a flare. FIG. 7 gives the first case considered. It is termed the CS-V4-1 configuration in Ref. 7. This configuration consists of a blunt cone-cylinder-flare, where the flare angle is 6 deg and the flare length is 3.51 calibers. The overall configuration length is 15.36 calibers. The configuration of FIG. 7 shows rifling grooves, but a smooth body was assumed in the PNS and aeroprediction calculations. Pitch damping results are shown in FIG. 7 for Mach numbers 0.4 to 5.0 from the AP02 and AP98. PNS results are shown from M=3 to 4.5 and ballistic range results are shown at $M_\infty=4.0$. Note the AP02 methodology agrees much closer to the experimental data and PNS results than does the AP98. The AP98 results are basically those of a cone-cylinder that is 15.36 calibers long.

Figure 7B:
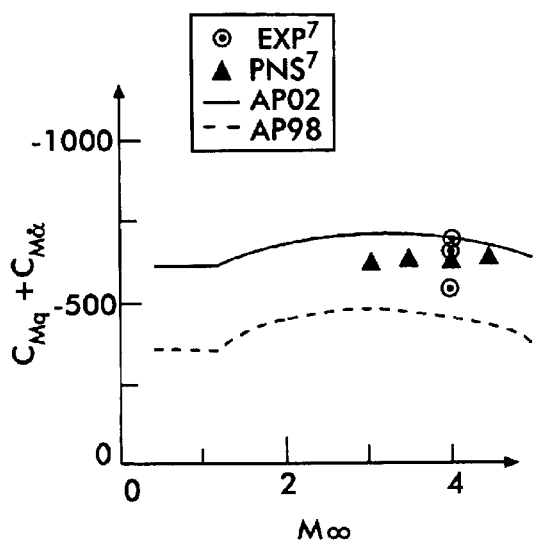
FIG. 7B depicts graphs comparing theoretical and experimental results for a pitch damping moment coefficient of the CS-V4-1 configuration.
Figure 8A:
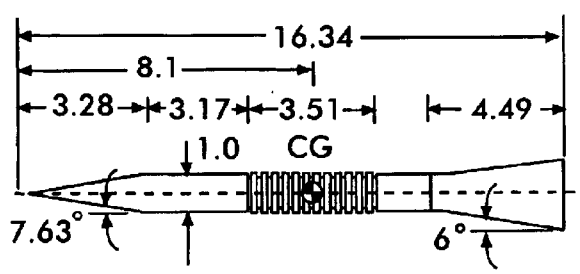
Figure 8B:
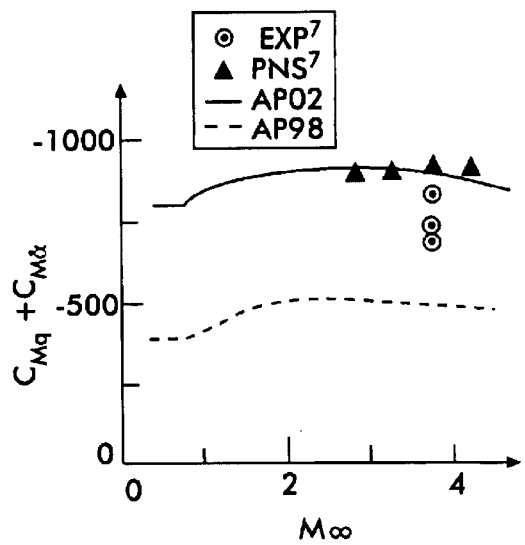
FIG. 8B depicts graphs comparing theoretical and experimental results for a pitch damping moment coefficient of the CS-V4-2 configuration.

FIG. 8 shows pitch damping results for a configuration similar to that of FIG. 7, except the flare is longer, 4.49 versus 3.51 calibers, and the overall FIG. 8 configuration length is longer (16.34 versus 15.36 calibers) than that of FIG. 7. Again, AP98 and AP02 results are shown for Mach number of 0.4 to 5 whereas PNS calculations were available for Mach number of 3 to 4.5 and ballistic range data was available for $M_\infty=4.0$ only. The AP02 results match the PNS calculations quite nicely with the AP98, being much lower than the PNS results due to not accounting for the flare. The ballistic range data are somewhat lower than the PNS data and AP02 for this configuration, possibly due to the impact of the grooves on the pitch damping.

Figure 9A:
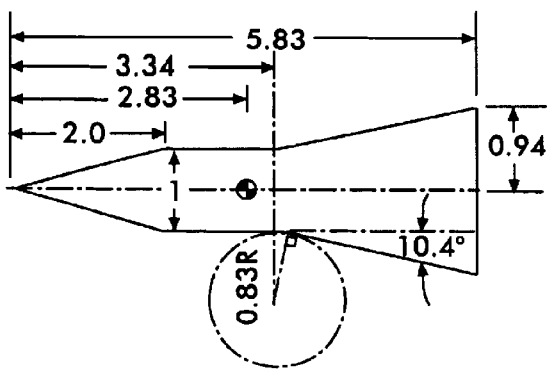
Figure 9B:
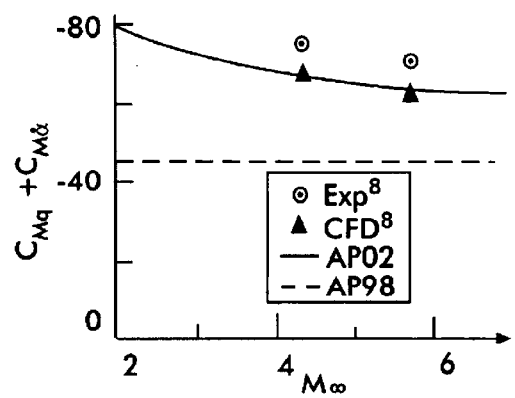
FIG. 9B depicts graphs comparing theoretical and experimental results for a pitch damping moment coefficient of the CAN4 projectile.

The third case considered for pitch damping is the CAN4[8] projectile. The pitch damping results are shown in FIG. 9 in terms of AP98 and AP02 for Mach numbers 2 to 6 and CFD and ballistic range results at $M_\infty$=4.4 and 5.72. The AP02 results agree very well with the CFD results and both are 10 to 15 percent lower than the experimental data. Errors of ±20 percent are quite reasonable and so these results are quite acceptable for dynamic derivative predictions. However, the older AP98 gives unacceptable results.

Figure 10A:
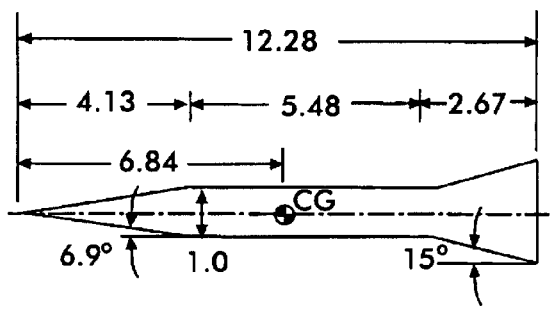
Figure 10B:
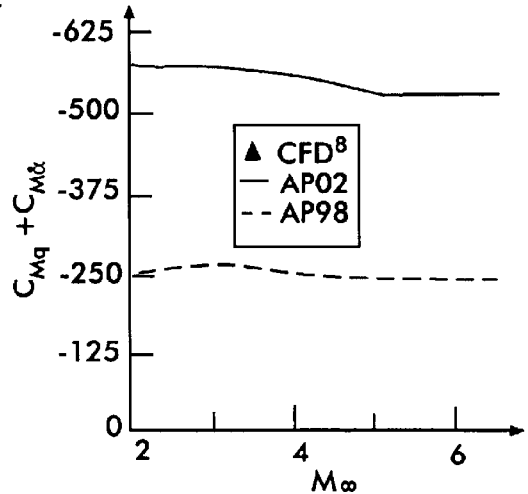
FIG. 10B depicts graphs comparing theoretical and experimental results for a pitch damping moment coefficient of the flared projectile configuration.

The fourth flared configuration where experimental pitch damping data or CFD computations was found in the literature is shown in FIG. 10. See Ref. 6. This configuration is also a cone-cylinder-flare of 12.28 calibers total length. It has a flare with a 15 deg flare angle that is 2.67 calibers in length. Only one CFD data point was given in Ref. 6 at $M_\infty$=4.4 in. However, AP02 and AP98 computations are shown for Mach numbers of 2 to 6.0. The AP02 results are about 12 percent lower than the data point at $M_\infty$=4.4 ($C_{M_q}+C_{M_{\dot\alpha}}$=−550 versus −625), which is considered to be acceptable prediction accuracy. However, the AP98 predictions are about 60 percent too low.

The final configuration where CFD or experimental pitch damping data was found was also taken from Ref. 6 and results are given in FIG. 11. It consists of a 13.16 caliber cone-cylinder-flare where the flare angle varies from 4 to 14 deg. Again, only $M_\infty$=4.4 data was given in Ref. 6. Notice the good agreement of the AP02 to the CFD computations. Here the worst error of the AP02 compared to the CFD is under 6 percent for the $\theta_f$=14 deg case. Again, the AP98 gives unacceptable agreement to the CFD, except for small $\theta_f$.

To summarize, new capability has been added to the NSWC aeroprediction code to allow static aerodynamics to be computed for flared configurations at all Mach numbers. Improvements have been added to pitch damping predictions for high Mach numbers for body alone configurations (no flare present). Finally, new capability has been added to allow pitch damping computations to be made for flare configurations for all Mach numbers where the aeroprediction code is operational (Mach numbers 0 to 20).

In comparing the new aeroprediction code (AP02) to experimental data and both Parabolized and Full Navier-Stokes predictions, the following conclusions were drawn:

1. Comparison of static aerodynamic predictions for configurations that have flares to experimental data and CFD computations appears to show the AP98 and AP02 give predictions within the standard accuracy goals for configurations with wings or tails. That is average accuracy of ±10 percent for axial and normal force and ±4 percent of the body length for center of pressure.
2. Comparison of AP02 pitch damping predictions for bodies without flares to the AP98, experimental data and CFD computations showed the AP02 predictions to be superior to the AP98 for $M_\infty$>2 for all cases considered. The average accuracy goal of ±20 percent was met for the AP02 but not with the AP98.
3. Comparison of the AP02 pitch damping predictions for bodies with flares to the AP98, experimental data and CFD computations showed the AP02 predictions to be within the desired average accuracy goal of 20 percent, whereas the AP98 could be off as much as 60 to 70 percent due to failure to account for the flare.
4. No data (either static or dynamic) was found for flared configurations for Mach numbers below 2.0. Hence, the new capability for both static aerodynamics for $M_\infty$<1.2 and pitch damping for flared configurations could not be adequately validated for low Mach numbers. While the inventor would like to have data for validation in this Mach number range, it may be impractical from a usage standpoint. This is due to the fact that fins are better at both stability and drag for moderate to lower supersonic Mach numbers than flares.
5. While the pitch damping methods for flared configurations have not been validated for Mach numbers below 2.0, the inventor believes they can still be used with confidence in preliminary design tradeoffs to compare flared configurations to those with wings. This is due to the accuracy of the methodology for Mach numbers above 2.0 and the consistency of the methodology for Mach numbers above and below 2.0.

Another preferred embodiment according to the present invention provides a method for predicting the effect of rocket engine burning on the base drag of a weapon. The conventional approach to predicting the effect of the rocket engine burning on the base drag of weapons was integrated into the aeroprediction code in the late 1970's and has not been upgraded since that time. The method utilized was basically an extension of the Brazzel technique, which are described in Refs. 19 and 20.

The Brazzel technique was for solid rockets, which had an exit Mach number of 1.0 or greater. It required knowledge of some of the details of the rocket such as chamber pressure, exit area to nozzle throat area, specific heat ratio of the exit gas, and location of the nozzle exit with respect to the base of the missile or projectile. This approach has been shown to give reasonable estimates of power-on base drag for a limited range of flight conditions when these parameters ($P_C/P_\infty$, $A_j/A_r$, $\gamma_j$, $x_j/d_r$) are known.

While the approach formulated by Brazzel has its strengths, it also has several weaknesses when approached from an aerodynamics viewpoint. First, it was limited to jet momentum flux ratios (RMF) of about 2.5 or less. Many of the world's rockets have values of this parameter much higher and, therefore, the method attributed to Brazzel needs extending to higher values of RMF. This was done and documented informally in Ref. 20 many years ago, but has never been documented formally. The preferred embodiment according to the present invention described below will serve as formal documentation of the extension of the Brazzel method to higher values of RMF.

Another problem associated with the Brazzel technique from an aerodynamicist's viewpoint is the required knowledge of the engine parameters. These parameters are required in order to perform conceptual design tradeoffs of various rockets for total drag when the engine is burning. As a result of this desire for conceptual tradeoff studies where some account of engine-on base drag is considered, other simplified procedures are needed for base drag prediction. The preferred embodiment according to the present invention discussed immediately below addresses two other options to calculate power-on base drag.

Another limitation of the Brazzel method is its limitation to supersonic flow at the nozzle exit. While the exit supersonic flow requirement is not a severe limitation for most rocket engines, it is a severe limitation for projectile configurations that use base bleed for base drag reduction. As a result of this shortcoming, a method developed by Danberg (See Ref. 21) for predicting base drag for small values of the bleed injection parameter (I) will be made more general in this preferred embodiment of the invention.

A final limitation of the Brazzel method is that it was derived based on freestream Mach number data of 1.5 and greater. It therefore needs to be extended to at least the transonic Mach number regime.

It is the purpose of this preferred embodiment according to the present invention to provide the methodology to overcome the shortcomings of both the Brazzel and Danberg methods for predicting power-on base pressure coefficient. These modifications to the Brazzel (Refs. 19 and 20) and Danberg (Ref 21) methods will be incorporated into the aeroprediction code for power-on base drag prediction and be a part of the next release to the public, which will be later in 2002 (AP02). The power-on base drag modifications will also be incorporated into the personal computer interface for the AP02 so as to allow the various power-on options to be considered in a very user friendly mode.

Figure 12A:
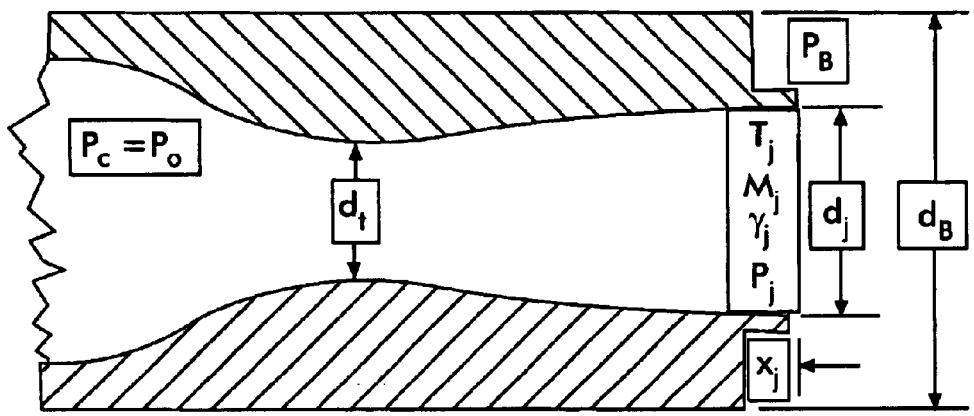
FIGS. 12A and 12B collectively illustrate the nomenclatures employed in describing power-on conditions for rockets and base bleed concepts, respectively.

Since the power-on base drag prediction method of the aeroprediction code is based on an extension of the method of Brazzel, et al. (Refs. 19 and 20), it is appropriate to briefly summarize Brazzels method. FIG. 12A shows the nomenclature that is used for the rocket engine parameters. The Brazzel and Henderson method defines the base pressure as $$\frac{P_B}{P_\infty} = 0.047(5 - M_\infty)[2(x_j/d_B) + (x_j/d_B)^2] + \left[\frac{T_j}{T_j^*}\right]\left[0.19 + 1.28\left(\frac{RMF}{1+RMF}\right)\right]\left[\frac{3.5}{1+2.5(d_B/d_r)^2}\right] \quad (101)$$

$$\text{where } RMF = \frac{\gamma_j P_j d_j^2 M_j^2}{\gamma_\infty P_\infty d_r^2 M_\infty^2} \quad (102)$$

$$\frac{T_j}{T_j^*} = \frac{\frac{\gamma_j+1}{2}}{1 + \frac{\gamma_j-1}{2}M_j^2} \quad (103)$$

$x_j/d_B$ is the distance the nozzle exit extends past the base in calibers and RMF is the jet momentum flux ratio.

Brazzel's method was built around two fundamental assumptions that he was able to develop based on analysis of experimental data for jet exit Mach numbers 1.0 to 3.8. The first assumption is that freestream Mach number and nozzle diameter are accounted for by the momentum flux term defined by Eq. (102). The second assumption was that jet exit Mach number could be described by the ratio of the jet static temperature for a given jet Mach number to that at a jet exit Mach number of 1.0. This relationship is defined by Eq. (103).

Figure 2:
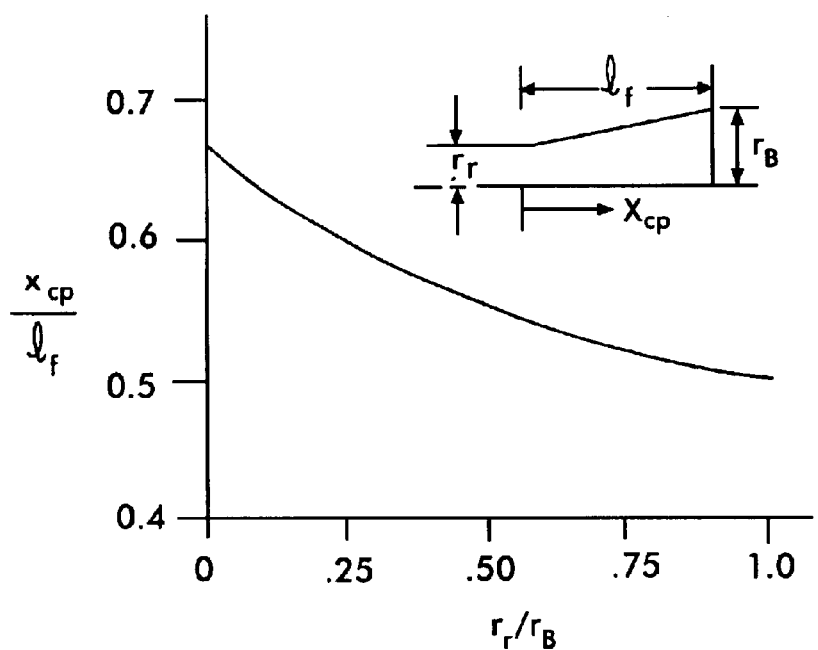
FIG. 2 is a graph illustrating the slender body theory center of pressure associated with a flare.
Figure 13:
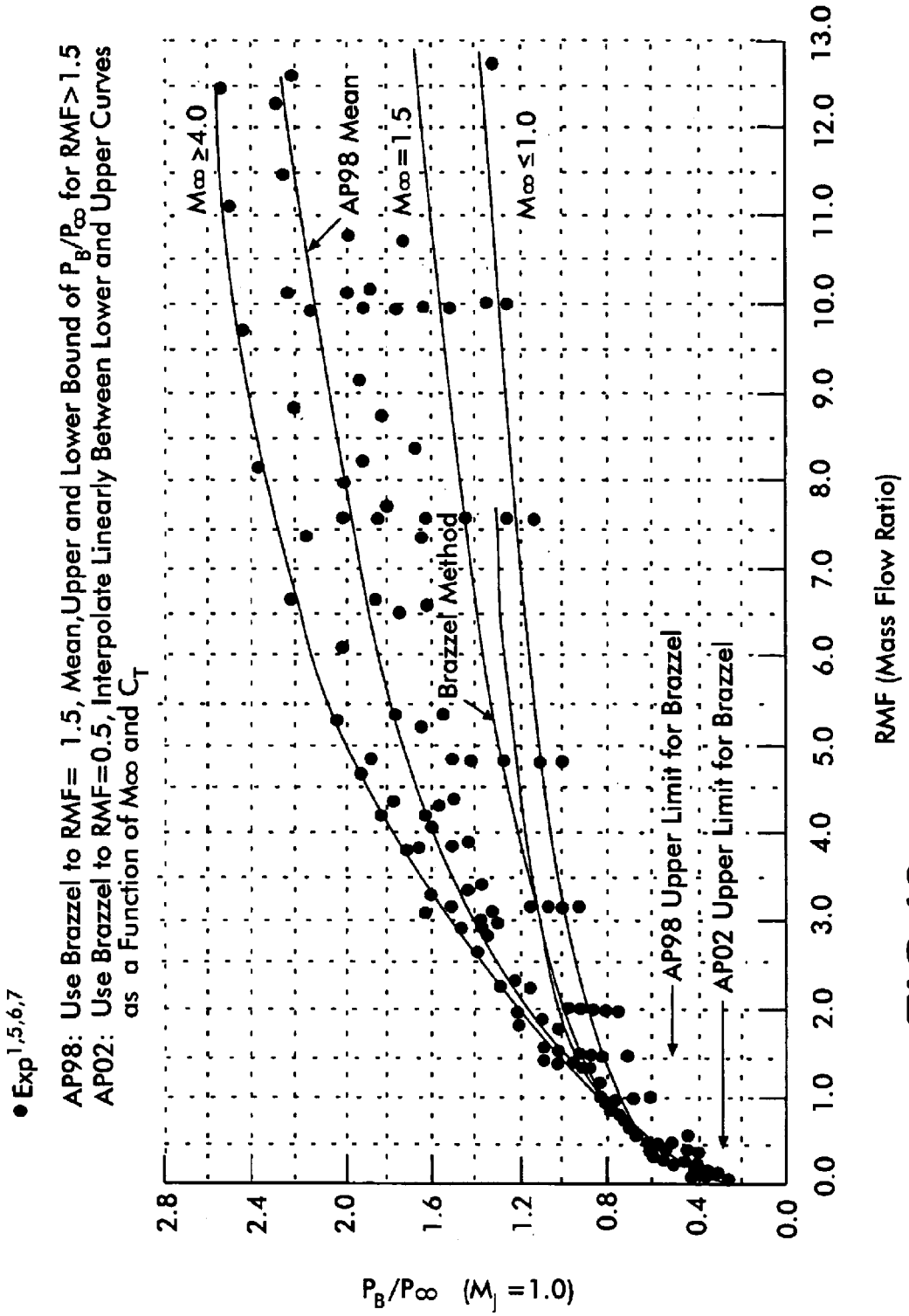
FIG. 13 is a graph illustrating the correlations of average base pressure under predetermined conditions.

In reality, the Brazzel method was geared primarily to accounting for base drag for sustainer rocket motors that typically have values of thrust coefficient of 0.2 to about 3.0 and fly supersonically. However, as the mass flow ratio or thrust coefficient get large or the freestream Mach number is transonic, the Brazzel method produces increasingly erroneous results for many cases. This behavior of Eq. (101) is illustrated in FIG. 13, which correlates base pressure predictions on a cylindrical afterbody for a jet exit Mach number of one ($T_j/T_j^*=1.0$). Note that the Brazzel correlation fits the data taken from Refs. 1, 5, 6, and 7 quite nicely for RMF values up to almost 0.5. Above values of 0.5 the data of FIG. 2 is more scattered, particularly for RMF values above about 1.5.

Brazzel indicated he had little data for high thrust ratios to use in the method development. The method of Refs. 20 and 22, and included in the AP98 (Ref. 1), uses the method of Brazzel for RMF values up to 1.5 and then the empirical curve fits that bracket most of the data of FIG. 13 in terms of upper and lower values along with a mean value. This mean value is shown in FIG. 13. However, in examining the data of FIG. 13 more closely, it was found that for higher values of $C_T$, $P_B/P_\infty$ was primarily dependent on freestream Mach number with little dependence on jet exit Mach number or jet exit diameter. Apparently, for high thrust levels such as would occur on a high impulse sustainer or a booster rocket motor, one of the main correlation parameters for $P_B/P_\infty$ is $M_\infty$. Thus, the AP02 will modify the current methodology for power on base drag prediction of Ref. 22 for RMF values greater than 0.5 so that $P_B/P_\infty$ will be correlated with freestream Mach number, as opposed to giving the user an upper, lower, and mean value of $P_B/P_\infty$ for all freestream Mach numbers. The discussion of power-on base drag prediction will thus be broken down by thrust or momentum flux ratio level.

We will first of all consider the lower values of RMF or $C_T$ which are more representative of a lower thrust sustainer engine. For these values of RMF, we will use the Brazzel method given by Eqs. (101) through (103). To utilize the Brazzel method, we therefore must obtain values of RMF either through direct input or through calculation based on known engine quantities. The parameters that are normally known in a rocket engine are the chamber pressure, $P_C$, the nozzle throat and exit area and the ratio of specific heats for the gas of interest. We can use this information to determine the quantities $M_j$ and RMF through the following process. We will first of all assume isentropic flow throughout the nozzle. This means there are no strong shock waves in the nozzle, only weak expansion or compression waves. This means that the chamber pressure, which is the total pressure, since velocity is zero in the chamber, is constant throughout the nozzle. Then, using this information, along with isentropic flow relations for flow through a nozzle, the jet exit Mach number and pressure relationships can be defined. The reader is referred to Ref. 26 for the details of this process. Reference 26 documents the methods discussed above in connection with an exemplary embodiment according to the present invention in more detail and also gives more exemplary cases as well.

Now knowing $P_j/P_\infty$, $A_j/A_{ref}$, $M_j/M_\infty$ and $\gamma_j/\gamma_\infty$, we can compute the jet momentum flux ratio from Eq. (102). Finally, knowing $x_j/x_B$ as a defined physical parameter and $T_j/T_j^*$ from Eq. (103), the base pressure ratio for power on can be computed from Eq. (101).

The base pressure coefficient is defined by $$C_{P_B} = \frac{2}{\gamma M_\infty^2}\left[\frac{P_B}{P_\infty} - 1\right] \quad (104)$$

where $P_B/P_\infty$ comes from Eq. (101). Finally, the base drag coefficient for power on conditions is $$C_{A_B} = -C_{P_B}\left[\left(\frac{d_B}{d_r}\right)^2 - \left(\frac{d_j}{d_r}\right)^2\right] \quad (105)$$

Also notice that Eq. (105) subtracts out that part of the base area attributed to the jet exit diameter, where the pressure is $P_j$, not $P_b$. $P_j$ is used in the calculation of jet thrust coefficient through the relationship $$C_T = 2\,RMF + \left(\frac{d_j}{d_r}\right)^2 \frac{2}{\gamma_\infty M_\infty^2}\left(\frac{P_j}{P_\infty} - 1\right) \quad (106)$$

RMF and $P_j/P_\infty$ of Eq. (106) come from Eq. (102) and the isentropic flow relationships discussed earlier and defined in more detail in Ref. 26. The total axial force coefficient is then $$C_A = C_{A_W} + C_{A_f} + C_{A_B} - C_T \tag{107}$$

As mentioned earlier, Eq. (101) is limited to low to moderate values of jet momentum flux ratio (RMF≤0.5). Many rockets. including some in the Navy, have values of RMF much higher than 0.5. As a result, the method of Brazzel, et al. (Ref. 19), was extended to higher values of RMF using data later taken by Craft and Brazzel (Ref. 23), Henderson (Ref. 24), and Deep, et al. (Ref. 25).

The method that will be a part of the AP02 will therefore have several changes from that in the AP98. First, the method of Brazzel will be used up to values of RMF of 0.5 versus 1.5 as currently done in the AP98. Next, for values of RMF>0.5, a more robust empirical relationship was derived for $P_b/P_\infty$ than Eq. (101). This empirical relationship was based on Eq. (101), but extended Eq. (101) to more appropriately fit the data of FIG. 13 and other experimental cases for high values of thrust. The method is defined by Eq. (108).

$$P_b/P_\infty = \left[\frac{T_j}{T_j^*}\right]^N \left[C_1(C_T, M_\infty) + C_2(M_\infty)\left(\frac{RMF}{1+RMF}\right)\right] f(d_B/d_r) + \tag{108a}$$

$$0.047(5 - M_\infty)[2(x_j/d_B) + (x_j/d_B)^2]$$

where
$$N = \frac{12 - C_T}{11.0}, \quad 1.0 \le C_T < 12$$
$$= 0, \quad C_T \ge 12$$
$$= 1, \quad C_T < 1.0$$

$C_1$ ($C_T$, $M_\infty$) and $C_2$ ($M_\infty$) of Eq. (108a) are found from Appendix C by linearly interpolating based on a given value of $C_T$ and $M_\infty$. Also, for Mach numbers below about 1.5, it was found that $T_j/T_j^*$ should have limiting lower values. This limiting lower value is defined by $$(T_j/T_j^*)_{min} = 0.7 - (M_\infty - 1.2)\frac{(0.7 - T_j/T_j^*)}{0.3} \text{ for } \tag{108b}$$

$$1.2 \le M_\infty < 1.5$$

$$(T_j/T_j^*)_{min} = 0.7 \text{ for } M_\infty < 1.2$$

For values of Mach number above 1.5, $T_j/T_j^*$ retains the value computed from Eq. (103). The boattail term $f(d_B/d_r)$ of Eq. (108a) was also found to be dependent on thrust coefficient. For low to moderate values of $C_T$ on a boattailed configuration, $f(d_B/d_r)$ follows the form of Eq. (101). That is $$f(d_B/d_r) = \frac{3.5}{1 + 2.5(d_B/d_r)^2}; \quad C_T \le 6.0 \tag{108c}$$

For higher values of $C_T$, Eq. (108c) is replaced by $$f(d_B/d_r) = 1 + \tag{108d}$$
$$\left(\frac{12 - C_T}{6}\right)\left[\frac{3.5}{1 + 2.5(d_B/d_r)^2} - 1\right] \text{ for }$$
$$6 \le C_T \le 12.0$$

-continued
$$f(d_B/d_r) = 1 \text{ for } C_T > 12.0$$

If the configuration has a flare, then $f(d_B/d_r)$ follows the form:

$$f(d_B/d_r) = \frac{3.5}{1 + 2.5(d_B/d_r)^2}; \quad C_T \le 25 \tag{108e}$$

$$= 1 + \frac{75 - C_T}{50}\left[\frac{3.5}{1 + 2.5(d_B/d_r)^2} - 1\right]; \quad 25 < C_T \le 75$$

$$= 1; \quad C_T > 75$$

Equations (108c) and (108d) indicate that for lower thrust levels, the base pressure is raised by a boattail, lowering base drag. However, for high values of $C_T$, the base pressure ratio is nearly independent of boattail and the base drag reduction comes purely from a base area reduction. Equation (108) reduces to the method of Brazzel at RMF≤0.5 but will give higher values than the Brazzel method for higher $M_\infty$. At transonic Mach numbers, it can give values of $P_b/P_\infty$ lower than the Brazzel method, due to the fact that Mach numbers as low as 0.9 have been included in FIG. 13 and Appendix C whereas the Brazzel method was originally derived for Mach numbers of 1.5 and greater. Also note that for $C_T$ values greater than 12, the exit Mach number dependence of Eq. (108) goes away. While Eq. (108) is believed to be an improvement over the AP98 methodology Ref. 1) and the Brazzel technique (Refs. 19 and 20), it still lacks complete robustness in terms of nozzle exit geometry.

Another problem associated with the method outlined by Eqs. 101–108 and FIG. 13 for computing power-on base drag is the fact that for many users of the aeroprediction code, information other than $P_C$ may be available for a given rocket. Users would like the option for computing power-on base drag, given a value of thrust and either $P_C/P_\infty$, $P_j/P_\infty$, or $M_j$. Hence, for cases where thrust and $P_C/P_\infty$ are known, the process to calculate $P_b/P_\infty$ is the same as Eqs. (101)–(107), except Eq. (108) is substituted for Eq. (101). If thrust and $P_j/P_\infty$ are given, then from Eq. (107), $$RMF = \frac{1}{2}\left[C_T - \left(\frac{d_j}{d_r}\right)^2 \frac{2}{\gamma_\infty M_\infty^2}\left(\frac{P_j}{P_\infty} - 1\right)\right] \tag{109a}$$

Then utilizing Eq. (102)

$$M_j = \sqrt{\frac{RMF \gamma_\infty P_\infty d_r^2 M_\infty^2}{\gamma_j P_j d_j^2}} \tag{109b}$$

Likewise, if thrust and $M_j$ are known, then utilizing Eqs. (102) and (107) we obtain $$\frac{P_j}{P_\infty} = \frac{C_T + \frac{2}{\gamma_\infty M_\infty^2}\left(\frac{d_j}{d_r}\right)^2}{\frac{2}{\gamma_\infty M_\infty^2}\left(\frac{d_j}{d_r}\right)^2 [1 + \gamma_j M_j^2]} \tag{110a}$$

RMF can then be computed from Eq. (102).

Finally, if thrust and $P_C/P_\infty$ are given then utilizing Eq. (110a) and isentropic flow relations, we obtain:

$$\frac{P_C}{P_\infty} = \frac{\left[C_T + \frac{2}{\gamma_\infty M_\infty^2}\left(\frac{d_j}{d_r}\right)^2\right]\left[1 + \frac{\gamma_j - 1}{2}M_j^2\right]^{\frac{\gamma_j}{\gamma_j-1}}}{\frac{2}{\gamma_\infty M_\infty^2}\left(\frac{d_j}{d_r}\right)^2 [\gamma_j M_j^2 + 1]} \quad (110b)$$

All terms in Eq. (110b) are known except $M_j$. $M_j$ can be found by a numerical iterative solution of Eq. (110a).

Of course, $C_T$ is defined by $$C_T = \frac{2T}{\gamma_\infty P_\infty M_\infty^2 A_{ref}} \quad (111)$$

$C_{P_B}$, $C_{A_B}$, and $C_A$ are then obtained through use of Eqs. (105), (106), and (107), respectively.

A third alternative for rocket engine effects on base drag and total weapon performance is where you know nothing about the rocket engine, except you know you want to parametrically trade off power-on base drag as a function of weapon performance. For this option, we define $$C_{A_B} = -K(C_{A_B})_{power\ off} \quad (112)$$

where K varies from −1.5 to 2.5.

While it is true this alternative of base drag that allows a variation in $C_{A_B}$ from 1.5 to $-2.5C_{A_B}$ is just an approximation based on no real rocket engine, the range of values are reasonable boundaries of what one should expect for power-on effects on base drag.

Figure 12B:
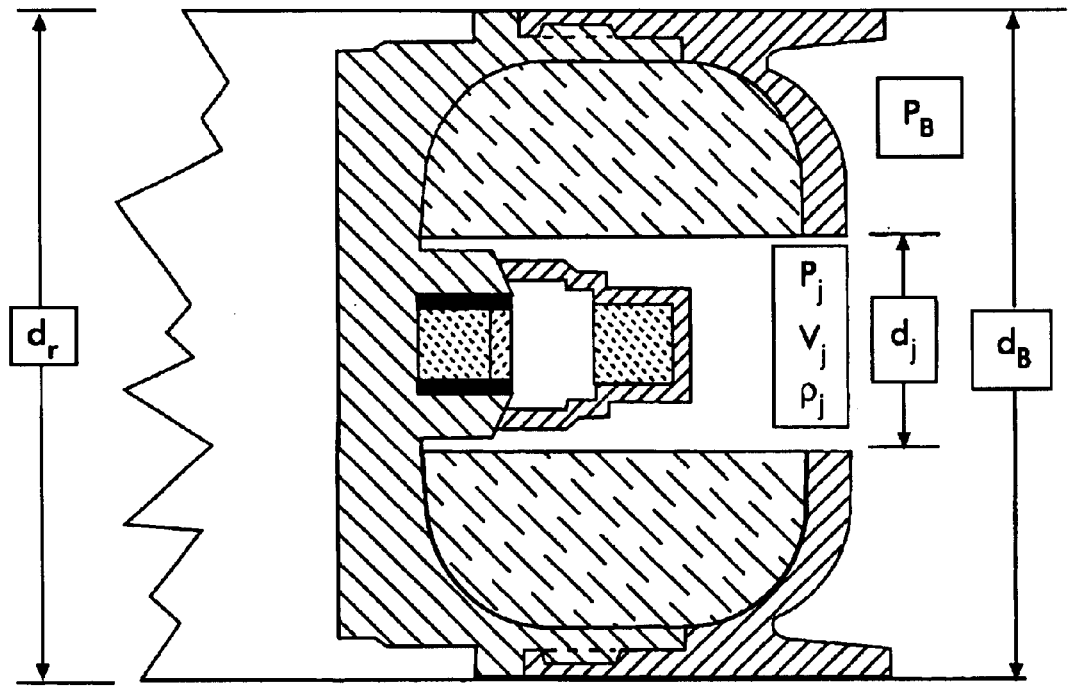

Base bleed is an alternative considered for use, primarily in unguided projectiles, to decrease base drag. The concept works on the basis of burning a small amount of propellant in the base of a projectile. This burning generates an exhaust gas, which is typically subsonic and incompressible and raises the temperature and pressure in the base area, thus lowering the base drag. FIG. 12B is an example of a base bleed configuration taken from Reference 21. There have been numerous references in the literature over the past 40 years or so that address the base bleed problem. Some of the more notable references are given by 10–20, in addition to Ref. 21. However, as noted by Danberg in Ref. 21, many of these references investigated the effects of base bleed or base pressure in wind tunnel tests where fairly high values of the non-dimensional injection parameter were used. This parameter is defined by $$I = \frac{\dot{m}_j}{\rho_\infty V_\infty A_{ref}} \quad (113)$$

and is the ratio of the mass flow out of the bleed exit to that in a stream tube of area equal to the cross sectional area of the body. Many of the Refs. 27–37 were for wind tunnel tests where values of I=0.01 to 0.04 were considered for cold air whereas the practical case for projectiles is I=0.001 to 0.005 with hot gas. These low values of I for projectiles are due to the fact that only so much propellant can be carried in the projectile cavity (see FIG. 12B), and if a high value of I is used, the time over which the base drag reduction occurs will be very short. A slower burn, lower velocity exhaust gas, and hence lower value of I is thus more practical, even though the optimum value of I is about 0.01 to 0.03 for minimum base drag based on the cold gas tests of Refs. 27 and 28.

Assuming values of I of 0.001 to 0.005 allows some simplifications in the base pressure estimation process. This is because for values of I≤0.005, the base pressure is approximately a linear variation with I. This linearity of base pressure for low values of I is shown by Refs. 28, 31, and 33.

Danberg used the conclusion of near linearity of $P_b/P_\infty$ as a function of I for I<0.005 to derive a semiempirical relationship to predict base pressure. Since the purpose of including base bleed in the aeroprediction code (APC) is to allow application primarily to unguided projectiles and since the range of practical interest of base bleed for projectiles is fairly low, a slightly modified method of Danberg will be adopted for use in the APC. Danberg's method defines the base pressure as $$\frac{P_B}{P_\infty} = \left(\frac{P_B}{P_\infty}\right)_{I=0} + \frac{\sigma I}{1 + \beta \sigma I} \quad (113a)$$

where $$\sigma = \frac{d(P_b/P_\infty)}{dI} = [-5.395 + 0.0172T_j]M_\infty + \quad (113b)$$
$$[4.610 - 0.0146T_j]M_\infty^2 +$$
$$[-0.566 + 0.00446T_j]M_\infty^3 \text{ and}$$

$$\beta = 15.1 - 46.3(M_\infty - 0.71) \quad (113c)$$

$T_j$ of Eq. (113b) must be in degrees Rankine. Also, if β is less than 2.6, it should be set to 2.6 according to Danberg. Also, an upper limit of $P_B/P_\infty$ of 1.0 will be included in the modified Danberg theory. Notice that Eq. (113b) has some nonlinearity brought into the method through the second term. Danberg used a combination of computational fluid dynamics calculations for forebody wave and skin friction drag, in conjunction with total axial force from ballistic range data, to back out the base axial force term. Knowing $C_{A_B}$, the base pressure for no base bleed can be calculated from $$\left(\frac{P_b}{P_\infty}\right)_{I=0} = \frac{\gamma_\infty M_\infty^2}{2} C_{P_B} + 1 \quad (114)$$

Equation (114) is then used as the first term of Eq. (113a). The present approach differs from Danberg's approach in that $(P_b/P_\infty)_{I=0}$ will be defined based on the present method in the APC. See Ref. 22. In this approach, a mean base pressure coefficient curve has been defined based on an extensive database taken over many years. This mean base pressure coefficient curve is shown in FIGS. 18A and 18B. Thus for a given freestream Mach number, one determines a value of $(P_b/P_\infty)_{I=0}$ from Eq. (114). Then for a given value of exit temperature, $T_j$, freestream Mach number and injection parameter I, the base pressure can be calculated directly from Eq. (113a). Base pressure coefficient is then calculated from Eq. (14).

For the base bleed methodology, Danberg assumed that $P_j = P_B$ in his analysis. Hence, for base bleed, we do not subtract the area of the exit from the axial force calculations as we did for rocket motors (see Eq. 105). The base axial force coefficient for base bleed conditions is thus $$C_{A_B} = -C_{P_B}\left(\frac{d_B}{d_r}\right)^2\left(\frac{d_B}{d_r}\right)^i \quad ; i = 0 \text{ for flare} \atop ; i = 1 \text{ for boattail} \qquad (115)$$

Figure 14:
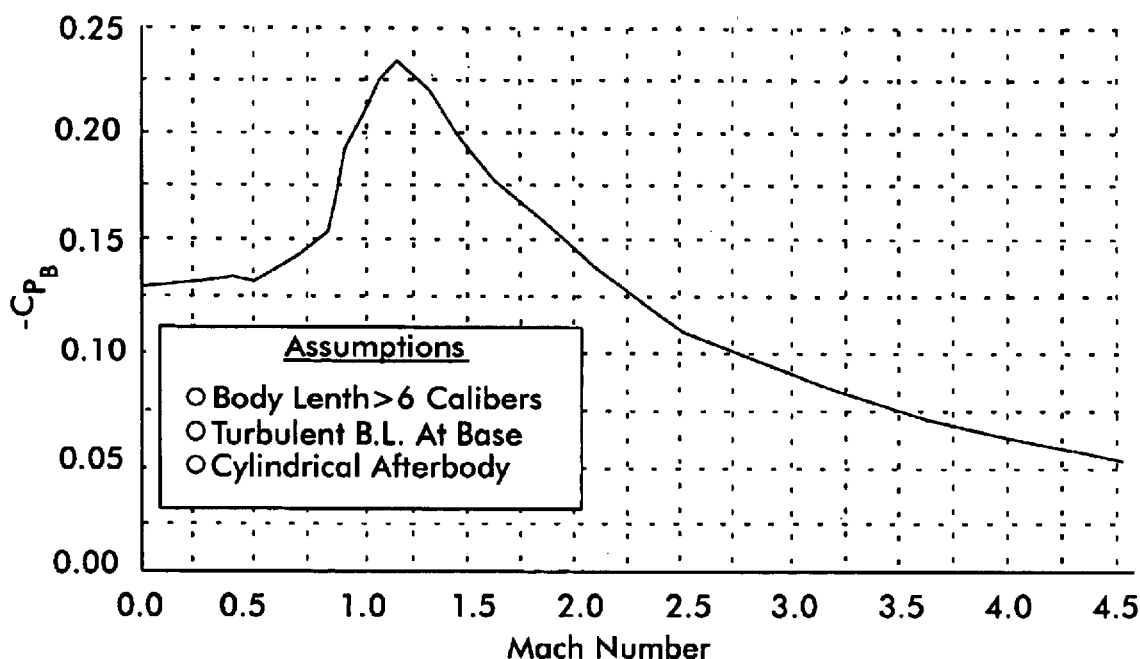
FIG. 14 is a graph illustrating the mean body-alone base pressure coefficient employed in AP98 (See Ref. 8)

To summarize the new methodology which will be incorporated into the 2002 version of the aeroprediction code, we will use a slightly modified method of Danberg where base pressure is defined by Eqs. (113), (114), and FIG. 14; and base axial force by Eq. (115). Equation (113a) requires an input value of freestream Mach number, exit temperature in degrees Rankine and a value of the Injection parameter I. For most accuracy, I should be less than 0.005, but values of I as high as 0.01 can be assumed, but with larger errors in the prediction process.

The base drag prediction model currently in use in the AP98 is described in Refs. 1 and 22. This model accounts approximately for the effects of Mach number, angle of attack, fin thickness, fin location, fin local angle of attack, power-on/off, and boattail or flare. The method described in connection with this preferred embodiment according to the present invention will only affect the value of the power-on base pressure coefficient of the body alone. It will be assumed that this new value of body alone base pressure coefficient will replace that value currently used in the AP98. Then the effects of fins and angle of attack will be unchanged from that in Ref. 1 and 22.

The comparison of the theoretical and experimental results will be separated into the base bleed and power-on base drag predictions. The base bleed results will be discussed first.

There have been several experiments conducted to measure the effect on base pressure of bleeding a small amount of both cold and hot air into the base region of an ogive-cylinder configuration. The reader is referred to Ref. 26 for other validation results. The modified theory of Danberg will be compared to several of these and other results for validation.

Figure 15:
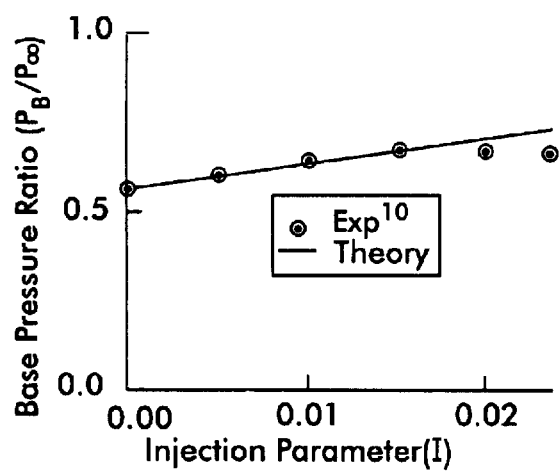
FIG. 15 is a graph comparing the theoretical and experimental results for the base pressure ratio under base bleed conditions ($M_\infty=1.58$, dj/dr=0.4; Tj=520° R)

The first set of results to be considered are those of Bowman, et al (Ref. 28) and Reid and Hastings (Ref. 27). They measured base pressure for various Mach numbers with cold air and an exit diameter ratio of $d_j/d_r=0.4$ (area ratio of 0.16). FIGS. 15–19 compare the theory to experiment. FIG. 15 is for $M_\infty=1.58$, FIG. 16 for $M_\infty=2.0$, FIG. 17 for $M_\infty=2.5$, FIGS. 18A and 18B for $M_\infty=3.0$ and FIG. 19 for $M_\infty=3.88$. FIGS. 15 and 16 show excellent agreement with both the data of Bowman, et al and Reid, et al at $M_\infty=1.58$ and 2.0, respectively for values of I as high as 0.02. At $M_\infty=2.5$, (see FIG. 17), two sets of data are available. The theory matches the Ref. 31 data quite nicely, again to values of I=0.02. On the other hand, the data of Bowman, et al appears to be low for both this Mach number and Mach number 3.0 as well. It is suspected that the Ref. 28 data is low because of strut interference effects on base pressure for the higher Mach number conditions. Bowman, et al (Ref. 28) pointed out that their strut was quite thick due to having the air pumped through the strut and into the base region.

The present inventor found that with 89 base pressure orifice measurements (Ref. 22), fins and struts do indeed affect the base pressure. This effect tends to lower $P_B/P_\infty$ below the value it should be without the interference effect present. We were able to isolate the interference effect to a small region directly behind the fins or strut. When this region was area averaged over the entire base, a lower value of base pressure coefficient was obtained, and a higher value of base drag. With a large number of base pressure taps, the interference effect of the strut would be eliminated. Reference 28 indicated the model diameter was only 1 inch, so it is suspected that not enough pressure taps were available to isolate the interference effect. This effect appears to be the highest at the higher Mach numbers.

Figure 19:
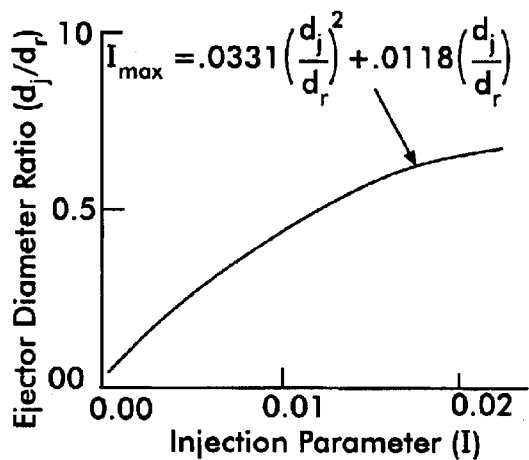
FIG. 19 is graph that provides a comparison of theoretical and experimental results for base pressure ratio at base bleed conditions ($M_\infty=3.88$; dj/dr=0.4; Tj=520° R)

Mach 3.0 results are given in FIG. 18A. Here, the theory is compared to the data of Ref. 28 as well as that of Ref. 33 for various size exit diameters of the injector. The theory matches the Ref. 33 data in an exceptional manner for large values of $d_j/d_r$ (0.67) up to values of I of 0.025. However, for the smaller values of $d_j/d_r$ of 0.22, theoretical computations are reasonable for I of 0.005 and less. However, for $d_j/d_r=0.45$, the theory can be used up to values of I of 0.01. An empirical constraint, which can be used as an application guideline for the modified theory of Danberg, is shown in FIG. 18B based on the results of FIG. 18A. The equation shown in FIG. 19 gives the maximum value of I for a given value of ejector diameter ratio where accurate values of $P_B/P_\infty$ can be expected from the theory. This equation is expected to be conservative for Mach numbers less than 3.0 and may be optimistic for Mach numbers greater than 3.0. This statement is based on the fact that as Mach number decreases, the value of I where accurate results of $P_B/P_\infty$ can be expected increases for a fixed value of $d_j/d_r=0.4$.

The last comparison of predicted base pressure with Mach number at room temperature conditions is shown on FIG. 19 for $M_\infty=3.88$. The experimental data is taken from Ref. 30. As seen in the Figure, acceptable accuracy can be obtained for values of I up to about 0.008.

Figure 20:
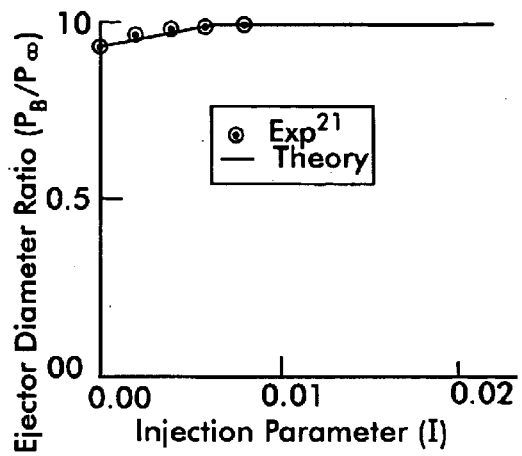
FIG. 20 is graph that provides a comparison of theoretical and experimental results for base pressure ratio at base bleed conditions ($M_\infty=0.71$; dj/dr=0.31; Tj=2150° R)
Figure 21:
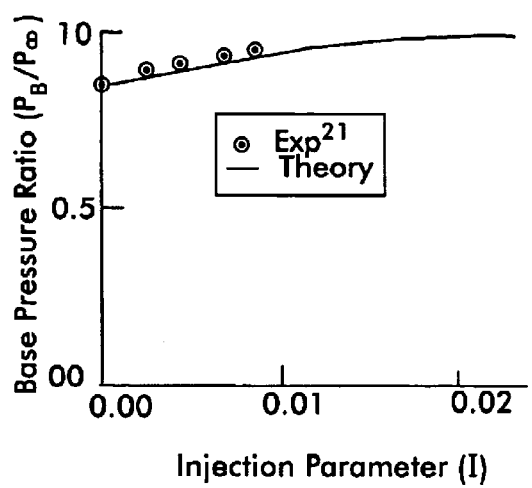
FIG. 21 is graph that provides a comparison of theoretical and experimental results for base pressure ratio at base bleed conditions ($M_\infty=0.98$; dj/dr=0.31; Tj=2150° R)

Several cases were found where hot gas was used as the injectant. The first of these cases is taken from Ref. 38 and comparisons of theoretical and experimental results at $M_\infty=0.71$ and 0.98 are shown in FIGS. 20 and 21, respectively. Temperature of the gas is 2150° R and the ejector diameter ratio is 0.31. Comparison of theory to experiment is excellent for both Mach numbers, although data was only available for values of $I \leq 0.008$.

Figure 22:
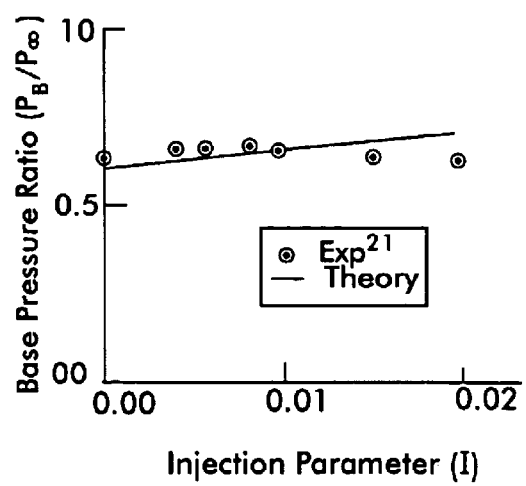
FIG. 22 is graph that provides a comparison of theoretical and experimental results for base pressure ratio at base bleed conditions ($M_\infty=2.0$; dj/dr=0.2; Tj=5400° R)
Figure 28A:
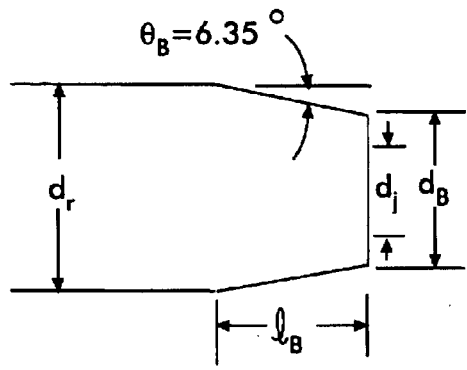
Figure 28B:
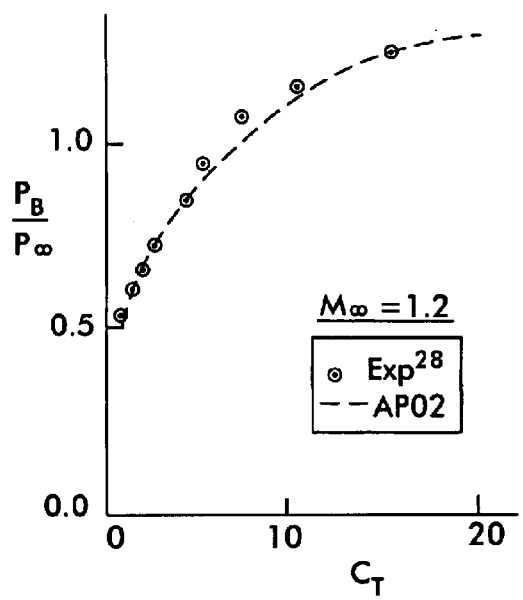
FIGS. 28B, 28C, and 28D are graphs that collectively provides a comparison of power-on-base pressure coefficient prediction with experiment for boattail afterbody (dj/dr= 0.45; θj=20 deg; θ$_B$=6.35 deg; l$_B$=0.82 cal; Mj=2.7)
Figure 28C:
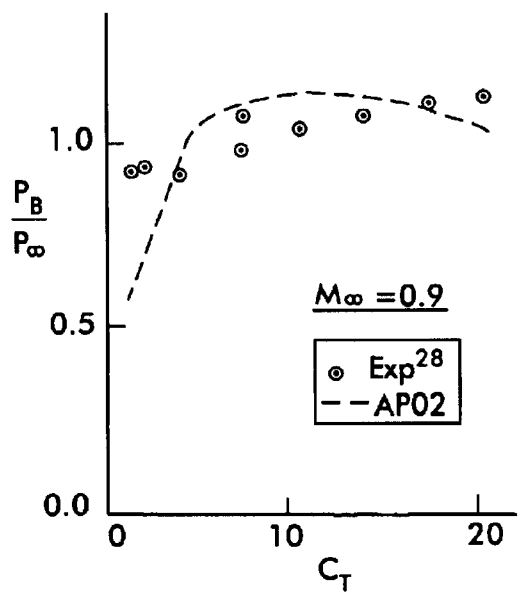
Figure 28D:
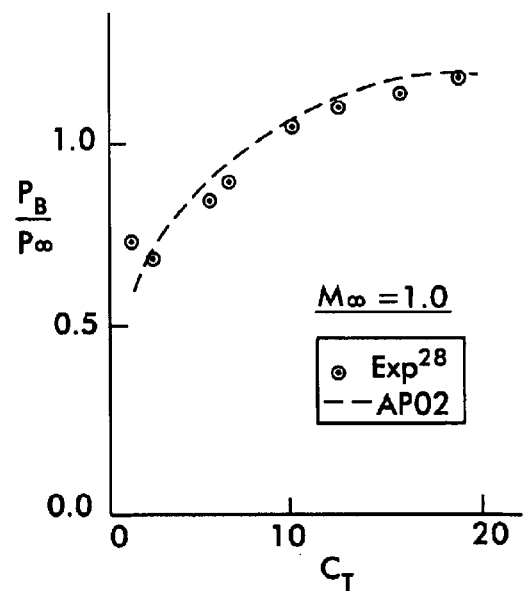

The next hot gas data is taken from Ref. 29. Clayden, et al (Ref. 29) used argon heated to a range that varied from room temperature (520° R) to 9126° R at $M_\infty=2.0$. The modified theory is compared to the Ref. 12 data for a $T_j$ value for 5400° R where $d_j/d_r=0.2$ in FIG. 22 Recall from FIG. 18 that for values of $d_j/d_r=0.2$, the maximum value of I where accurate results of the theory can be expected for a cold gas is approximately 0.0037. As seen in FIG. 22, for a hot gas, this value of 0.0037 is too high by about a third. In other words, for a hot gas, the limiting values computed for $I_{max}$ by Eq. (116) should be reduced somewhat. However, since the maximum value of base pressure ratio occurs at approximately 0.0008 to 0.0022 for this case, the theory is still reasonable for the practical case. That is because one would choose a value of I in the design process to give maximum values of $P_B/P_\infty$. Also, for a hot gas, Eq. (116) should be modified according to $$(I_{max})_{hot} \cong \frac{2}{3}[I_{max}]_{cold} \qquad (117)$$

The first case to compare the present predictions of power on base pressure are results taken from Ref. 27 and correlated by Brazzel as a function of the Jet Momentum Flux parameter RMF. These results, shown in FIG. 23, were for various jet to reference diameter ratios at $M_\infty=M_j=2.0$. Also shown in FIG. 23 are the predictions of the Brazzel method (indicated by the AP98) for the low values of RMF computed from Eq. (101) for various values of RMF assuming $\gamma_j=1.4$ and $x_j=0$. Since $M_j=2$, $T_j/T_j^*=0.67$ for FIG. 23. Also shown on FIG. 23 are the results for the improved method to be incorporated into the AP02 (see Eq. 108). As seen in FIG. 23, both the Brazzel technique and the AP02 method predict base pressure slightly high compared to the Ref. 27 data. This means base drag would be slightly low compared to the Ref. 27 experimental data.

The next case considered is taken from the data of Ref. 5. $M_\infty=1.5$ and 2.5 cases are shown for the $M_j=1.0$, and $d_j/d_r=0.45$ conditions in FIG. 25. The AP02 gives excellent comparison to experiment at $M_\infty=2.5$ and reasonable agreement at $M_\infty=1.5$. The power off base pressure coefficient is noted for both the $M_\infty=1.5$ case ($C_P=-0.19$) and $M_\infty=2.5$ case ($C_{P_B}=-0.115$). This Figure illustrates how power-on can actually increase base drag over no power-on at some conditions, while at other conditions, base drag can be changed to base thrust.

The next case considered is taken from Ref. 40 and is for $M_j=2.5$, $M_\infty=1.94$ and $d_j/d_r=0.75$. In addition to the experimental data of Ref. 40, the data of Ref. 24 is also shown in FIG. 26. The AP02 compares fairly well with the Ref. 24 data at lower values of $C_T$ and is in between the Ref. 24 and Ref. 40 data for higher values of $C_T$. Once again, the power-off base pressure coefficient is shown on the FIG. 26, illustrating that at very low values of thrust coefficient, power on increases base drag, whereas for higher values of $C_T$, base drag is decreased.

The next three examples are taken from the experimental database of Rubin (Ref. 41). Rubin measured power on base drag in the transonic speed regime for cylindrical, flare, and boattail afterbodies at transonic Mach numbers. FIG. 27 compares the semiempirical predictions to the data of Rubin for the cylindrical afterbody at $M_\infty=0.9$, 1.0, and 1.2. Experimental data was based on $M_j=2.7$ and $d_j/d_B=0.8$ and 0.45. A conical nozzle was used with $\theta_j=20$ deg. The agreement between the experiment and theory at all three Mach numbers is reasonable. However, for $M_\infty=0.9$ and $C_T<4$, the experimental data shows $P_b/P_\infty$ increasing. The present theory will not predict the minimum base pressure ratio. This increase in $P_B/P_\infty$ will continue as $C_T$ gets small until a maximum is reached at base bleed conditions, after which $P_B/P_\infty$ will decrease to its power-off value.

FIG. 28 presents the comparison of theoretical and experimental results for the boattailed afterbody case. Results for the same three freestream Mach numbers ($M_\infty=0.9$, 1.0, and 1.2) are shown on the Figure. The boattail angle is 6.35 deg and the boattail length is 0.82 caliber. Again, reasonable agreement with experiment is seen except for $M_\infty=0.9$ and 1.0 and for low values of $C_T$, where the minimum value of $P_B/P_\infty$ has been reached.

FIG. 29 presents the comparison of theoretical and experimental results for the flare afterbody case. The flare angle is 6.54 deg and its length is 1.34 caliber. Good agreement between theoretical and experimental results is seen, except for $M_\infty=0.9$ and $C_T<6$, where the base pressure is seen to start increasing after a minimum has been reached.

To summarize the comparison to experiment of the modified model of Danberg to predict base pressure at base bleed conditions, the following conclusions were drawn:

1. The modified theory gave good agreement to cold gas experimental data for all practical values of the injection parameter and ejector diameter ratio and at all Mach numbers where data was found. These values are typically $I \leq 0.005$ and $d_j/d_r \approx 0.4$. The theory was seen to be accurate for many conditions outside the practical range of applicability.
2. A relationship was derived for cold gas conditions where the maximum value of I as a function of the ejector diameter ratio could be used with accurate values of base pressure ratio expected. For hot gas conditions, this cold gas upper limit was reduced by about one third.
3. In general, the semiempirical theory applicability range increases with decreasing Mach numbers (larger values of I allowed).
4. For limited hot gas comparisons of theoretical and experimental results, it was seen that the theory gave acceptable agreement to the data. It was also seen that the optimum value of I is much lower than for cold gas conditions.

To summarize the power-on base drag prediction method for rockets, an improved semiempirical method has been developed. It is patterned after the method of Brazzel, et al (Ref. 19) but has been modified significantly to make it more robust in terms of values of thrust coefficient allowed, freestream Mach numbers allowed, and afterbody geometries allowed. In comparing the new method to experimental data, it was seen to give reasonable comparisons to most databases. However, it was found that not all experimental data were consistent, so part of the poor comparisons with some cases is believed to be experimental measurement problems. While the new method has been validated with various types of afterbodies (boattail, flare, or cylinder), it has not been validated at angle of attack or when fins were present. It is assumed that the change in base pressure due to the presence of fins and angle of attack at power-off conditions can be applied directly to the power-on base pressure predictions.

While the present improved semiempirical power-on base pressure prediction method is believed to be an improvement over existing empirical techniques, additional work is still needed in this area. For example, the present method does not account for nozzle exit angle. Additional validations (and possible modifications of the method) are needed for angle of attack and fin effects as well.

Referring now to yet another preferred embodiment according to the present invention, one idea that has been considered to meet lower cost, lower volume and lower maneuverability control requirements of guided projectiles is to deflect a part of a wing or tail surface as opposed to the entire surface. The portion of the tail surface considered for deflection is at the tail or wing trailing edge. FIGS. 30A–30C collectively illustrate a typical concept being considered wherein a part of the trailing edge portion of the tail fin is being considered for the control surface as opposed to the entire tail surface. As seen in FIG. 30A, this projectile concept is very low drag and, given a high initial velocity, can produce a fairly long range projectile, even without a rocket motor. For long ranges, winds and other ballistic errors can produce sizeable miss distances without some sort of corrective device. While the large tail fins of the FIG. 30A concept are needed for stability at a high velocity launch, deflecting the entire tail fin a significant amount to eliminate the ballistic errors is not needed. Only a fraction of the tail surface is required to provide adequate maneuverability if the deflection occurs over a sustained period of time. The small deflected surface area can also result in a much lower volume, weight and cost for the control system. As seen in FIGS. 30A–30C, the amount of area of the trailing edge can vary depending on the requirements. It will be appreciated that these Figures illustrate a variable semispan, root chord and hinge line for the trailing edge flap.

The most recent version of the NSWC aeroprediction code (AP98), as described in Ref. 1, as distributed to users, is not capable of computing aerodynamics on a concept such as that shown in FIGS. 30A–30C when the trailing edge flaps are deflected. The objective of this preferred embodiment according to the present invention is to develop the methodology to allow the 2002 version of the aeroprediction code (AP02) to compute aerodynamics on a configuration where some portion of the rear part of the aft lifting surface (either wing or tail) can be deflected to provide control. In developing this trailing edge flap aerodynamic predictive methodology, considerations of the cost to integrate the new methodology into the aeroprediction code (APC) was a prime driver in the method chosen. The work discussed in deriving this preferred embodiment of the present invention is described in more detail in Ref. 42 for those interested.

In reviewing the literature to determine approaches to use for calculating the aerodynamics of trailing edge flaps, the general approach that comes closest to that desired for use in the future AP02 is that adopted for the Missile Datcom. See Ref. 43. In that approach, an equivalent value of deflection for the entire wing or tail surface is determined to reflect a given flap deflection. In other words $$\delta_W = f(\delta_f) \tag{201}$$

The equivalent value of $\delta_W$ is determined offline using methods in the airplane DATCOM (See Ref. 44) at subsonic speeds and the method of Goin (See Ref. 45) at supersonic speeds. The advantage of an approach such as Eq. (201) for codes such as Missile Datcom (see Ref. 43) or AP98 (See Ref. 1) is that this is the least costly and most straightforward approach to incorporate the computation of aerodynamics of trailing edge flaps into an existing computer code.

The low cost is because codes such as AP98, as described in Ref. 1, or Missile Datcom, mentioned in Ref. 43, are generally already set up logic wise to compute the aerodynamics of a configuration where one set of fins are deflected. Hence, if one can define what that wing deflection is in terms of some flap deflection, the codes described in Refs. 1 and 43 advantageously can be exercised to provide a set of aerodynamics that simulate a configuration with a trailing edge flap deflected by a given amount.

While the approach used by the Missile Datcom [Eq. (201)] to compute aerodynamics of trailing edge flaps is the same general approach that will be adopted for use here, the methods that will be used for the AP02 will differ from those presented in Refs. 44 and 45 used in the Missile Datcom, which is described in Ref. 43. There are several reasons for this difference in methods. First of all, the method described by Goin in Ref. 45 has too many limitations. Some of these limitations include requirements for supersonic leading and trailing edges of the flap hinge line, viscous effects are not accounted for, and the method does not include nonlinearities due to large flap deflections or angles of attack (AOAs). Secondly, while the method of Ref. 44 takes into account some of the viscous and nonlinear effects that Ref. 45 does not account for, the method itself is inconsistent with that of Ref. 45.

The objective here is thus to derive an improved method to compute aerodynamics of trailing edge flaps that utilize the Eq. (201) approach. The method should be similar for both subsonic and supersonic freestream Mach numbers, should not be limited to supersonic leading and trailing edges, should account (at least empirically) for viscous effects, and should account for nonlinearities associated with large flap deflections or AOAs. From a practical standpoint, the weapons that will use the trailing edge flaps for control will typically fly at fairly small trim AOAs (less than 10 deg). However, flap deflections as large as ±30 deg are not unreasonable in order to achieve the appropriate trim AOA desired. Also, from a practical standpoint, most applications the inventor is aware of will be below $M_\infty = 2.0$. However, the method should be general enough to be applied over the Mach number range of applicability of the AP98 or AP02, which is 0 to 20. On the other hand, the method will not be validated over this large Mach number range due to limited experimental data and lack of funding to do extensive Navier Stokes computations.

To most efficiently implement the methodology for computing the aerodynamics of a weapon concept that is controlled by trailing edge flaps, it will be appreciated that one must seek the definition of the equivalent wing deflection that yields the same normal force, pitching moment and trim AOA as that obtained by deflecting the trailing edge flaps. In mathematical terms, $$N_{W(B)} + N_{B(W)} = N f_1 \tag{202}$$

$$M_{W(B)} + M_{B(W)} = N f_1 [(X_{CP})_f - X_{ref}] \tag{203}$$

$$(\alpha_{TR})_W = (\alpha_{TR})_f \tag{204}$$

In reality, if Eqs. (202) and (203) are satisfied, Eq. (204) will automatically be satisfied. It is thus necessary to simply define the relationships that allow Eqs. (202) and (203) to be satisfied.

Notice that in Eqs. (202) and (203), the wing-body normal force and pitching moments are equated to the normal force and pitching moment coefficients of the flap alone with no interference effects present, times an empirical constant. There are a couple of reasons for this. First, when the entire wing is deflected it will have carryover normal force onto the wing. This means the equivalent control deflection of the entire wing will be lower than if no carryover normal force were present. Secondly, while there will be some interference carryover normal force onto the flap from the wing or body, this extra normal force can be lumped into an empirical term, $f_1$, which will be defined later.

Equation (202) can be expanded as $$(C_{N_\alpha})_W [k_{W(B)} + k_{B(W)}] \delta_W = (C_{N_\alpha})_f f_1 \delta_f \tag{205}$$

Figure 31:
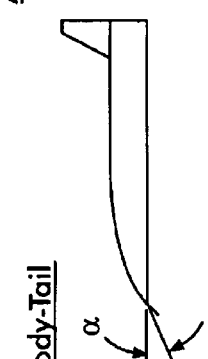
FIG. 31 presents simultaneous physical and mathematical representation of trailing edge flap deflection by full wing deflection.

The empirical factor, $f_1$, of Eq. (205) accounts for several physical phenomena. These include boundary layer buildup and separation of the flow ahead of the flap on the wing surface; flap thickness effects; effects of the slot created between the wing and flap when the flap is deflected; and interference effects of the flap onto the body or wing or the wing or body onto the flap. The factor $f_1$ will be determined empirically based on experimental data for wings, which have trailing edge flaps. FIG. 31 attempts to pictorially and mathematically show the representation of a trailing edge flap deflection by deflecting the full wing.

To determine $f_1$, we equate the right hand side of Eq. (205) to the change in normal force coefficient at some AOA due to a control deflection $\delta_f$. That is $$f_1 = \frac{(\Delta C_N)_f}{(C_{N_\alpha})_f \delta_f f_2} \tag{206}$$

$(\Delta C_N)_f$ of Eq. (206) is the additional normal force coefficient created by a flap deflection $\delta_f$. $(C_{N_\alpha})_f$ is the theoretical normal force coefficient slope for the flap of given aspect ratio and taper ratio at a given Mach number and AOA. This theoretical value is determined by the methods in the AP02 for a flap only (no wing ahead of it). The AP02 methods include linearized theories at low AOA or control deflection combined with empirical approaches at higher AOA. These methods in the AP98 or AP02 are fairly general and can calculate aerodynamics on supersonic or subsonic leading edge wings or flaps at low AOA. Also, aerodynamics can be computed for Mach numbers 0 to 20 and AOAs to 90 deg. Hence, the theoretical methodology for computing $(C_{N_\alpha})_f$ is fairly general. The value of $(C_{N_\alpha})_f$ is actually computed using a secant slope for a given AOA. This value of $(C_{N_\alpha})_f$ is then multiplied by the given flap deflection, $\delta_f$ as seen in Eq. (206). The numerator of Eq. (206) is based on experimental data, which accounts for various physical phenomena of a flap in conjunction with a wing, which a wing alone does not have. Hence, the empirical factor $f_1$ is generated by the ratio of experimental data for a flap on a wing to a theoretical wing alone solution.

The factor $f_2$ in the denominator of Eq. (206) is used to account for the fact that the theory in the AP02 which defines the lift curve slope of an entire wing deflected an amount $\delta$ at a given AOA may not accurately predict the increment in normal force generated by a flap. The factor $f_2$ is expected to be near one at supersonic speeds. However, at subsonic speeds, wind tunnel data suggests the theoretical predictions of additional normal force generated by a flap are higher than what the theory suggests. This inaccuracy of the theory arises from using the secant slope for $(C_{N_\alpha})_f$ versus using the local slope at a given value of $\alpha$. At supersonic speeds, use of the secant slope does not appear to be a problem. However, subsonically, the $C_N$ versus $\alpha$ curve levels out at around 25 to 30 deg AOA, so an additional increase in $\alpha$ brings increasingly less increase in $C_N$. Using a secant slope for $(C_{N_\alpha})_f$ versus the local tangent gives a value of $(C_{N_\alpha})_f$ too large and therefore a value of $f_1$ too low. The parameter $f_2$ therefore corrects for this weakness. One could change the overall AP02 code to use local versus secant slopes. However, this would be a very costly and time consuming process, and it was much more cost effective to define the factor $f_2$ to take care of this correction for the trailing edge flap technology.

In Eq. (206), it is assumed both the numerator and denominator are based on the same reference area $A_{ref}$. If $(C_{N_\alpha})_f$ is calculated based on a wing alone solution for the flap, then the Eq. (206) must be multiplied by $A_{ref}/A_f$ to have consistent reference areas.

To define the empirical factor $f_1$, the two data bases present in Refs. 46 and 47 will be used. Ref. 46 contains data for a canard-body-tail configuration (see FIG. 32) with trailing edge flaps. Data is available for Mach numbers 1.5 to 4.63, AOAs -2 to about 30 deg (except for $M_\infty=1.5$ where some data is available only to about 15 deg AOA), and control deflections 0 to -30 deg. Unfortunately, no positive values of $\delta_f$ were available in Ref. 46, probably since a negative value of $\delta_f$ is required for trim to occur when $\alpha$ is positive.

Reference 47 contains data for low Mach number ($M_\infty=$ 0.3 to 0.5) for several different configurations. These configurations included an elliptical and circular cylinder-shaped body with either a delta or sweptback rectangular wing. The wings could have either a leading or trailing edge flap. The configuration of most interest here is the delta wing with trailing edge flaps on a circular cylinder body (see FIG. 33). Data is available to 40 deg AOA for flap deflections of ±10 and ±30 deg. Hence, Ref. 47 will complement the supersonic data of Ref. 46.

For Mach numbers in between $M_\infty=0.4$ and $M_\infty=1.5$, the following procedure will apply for computing $f_1$. For Mach numbers below $M_\infty=0.8$, the value of $f_1$ computed at $M_\infty=0.4$ will be assumed to apply. For Mach numbers between $M_\infty=1.5$ and 0.8, linear interpolation will be used to compute $f_1$ based on the values of $f_1$ at $M_\infty=1.5$ and 0.8.

Figure 34:
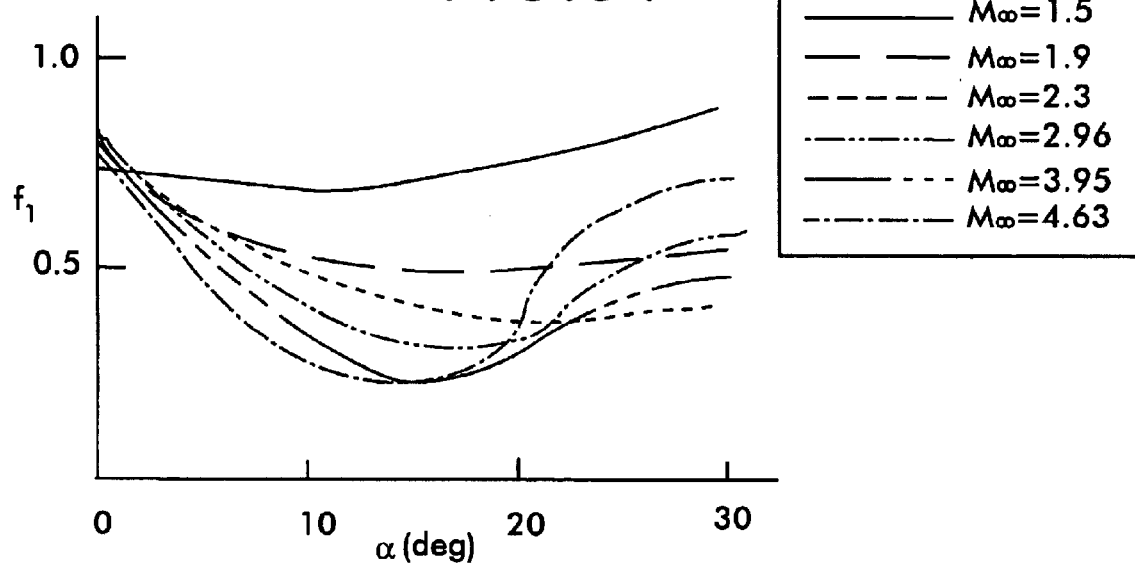
FIG. 34 is a graph presenting the values of the parameter f$_1$ at supersonic speeds based on Reference 46 data and AP98.
Figure 35:
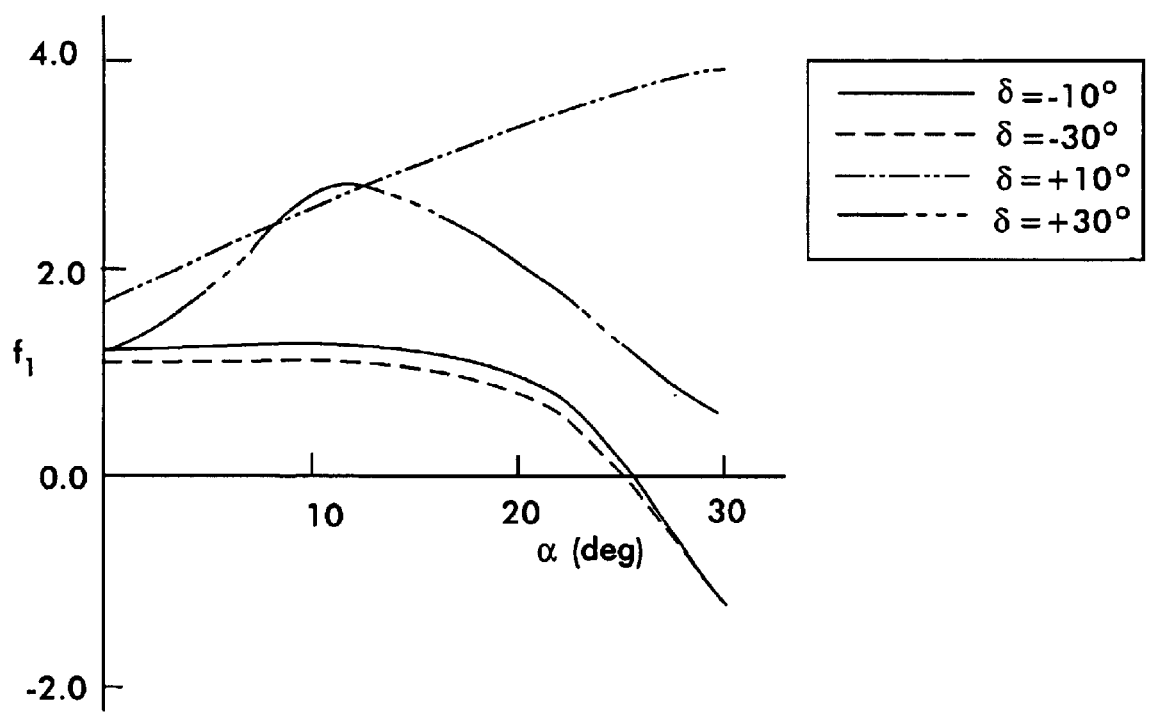
FIG. 35 is a graph presenting the values of the parameter f$_1$ at subsonic speeds based on Reference 47 data and AP98.

FIGS. 34 and 35 present the values of $f_1$ determined by using Refs. 46 and 47 to find values of $(\Delta C_N)_f$ and Ref. 1 to compute a value of $(C_{N_\alpha})_f$ at a given AOA. FIG. 34 represents the situation where $\alpha$ and $\delta$ are of opposite signs, which is the practical case for trim when the aft located control surface is deflected. FIG. 34 also applies for $M_\infty \geq 1.5$ and for values of $\alpha$ and $\delta$ of the same sign when $\alpha$ is numerically small. No data has been found to ascertain the validity of FIG. 34 when $\alpha$ and $\delta$ are the same sign and $\alpha$ is greater than a small value. For $M_\infty>4.63$, the value of $f_1$ at $M_\infty=4.63$ will be assumed. Also FIG. 34 holds for values of $\delta_f$ up to -30 deg, based on the Ref. 6 data.

Figure 36A:
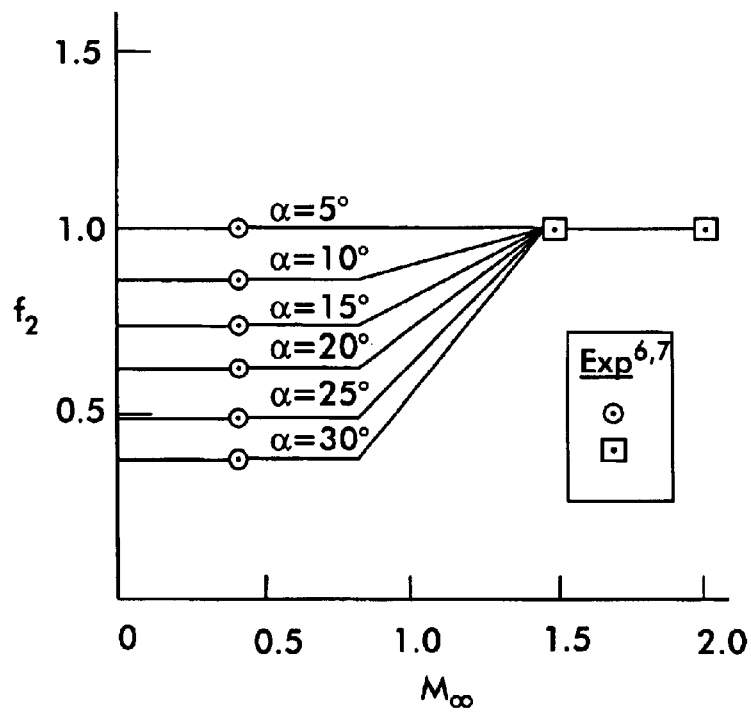
Figure 36B:
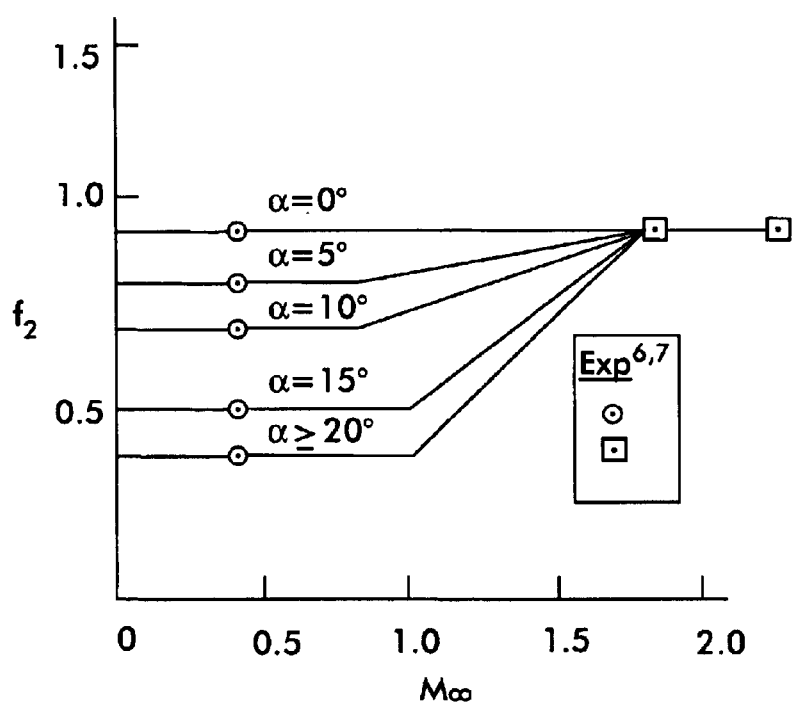
FIG. 36B is a graph of a factor which corrects for use of secant versus tangent in normal force curve slope (δ$_f$=10 deg)
Figure 38A:
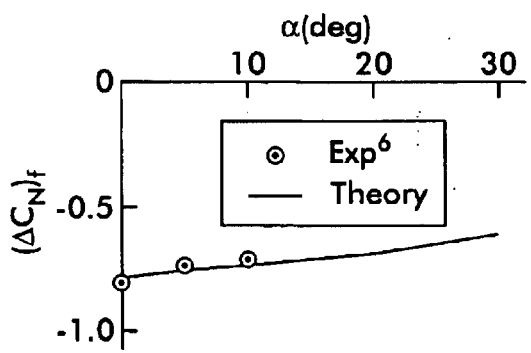
FIGS. 38A and 38B are graphs that provides a comparison of theoretical and experimental results for normal force and pitching moment coefficients of trailing edge flaps (M∞=1.5, δ$_f$=−20 deg)
Figure 38B:
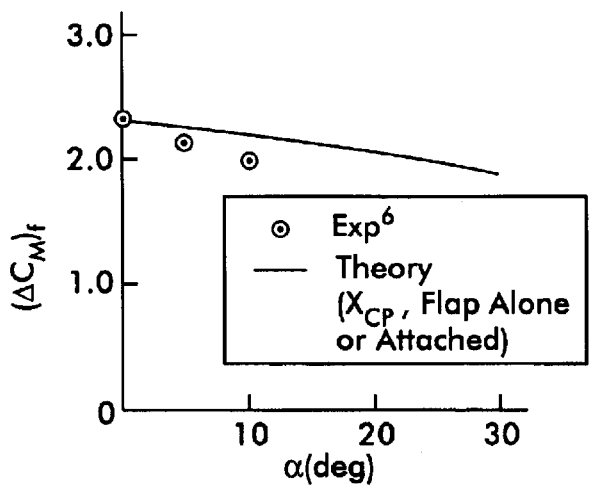
Figure 39A:
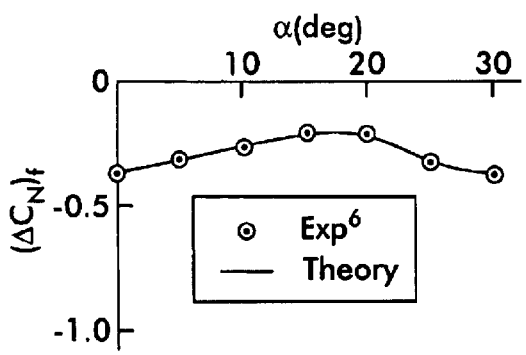
FIGS. 39A and 39B are graphs that provides a comparison of theoretical and experimental results for normal force and pitching moment coefficients of trailing edge flaps (M∞= 2.96, δ$_f$=−20 deg)
Figure 39B:
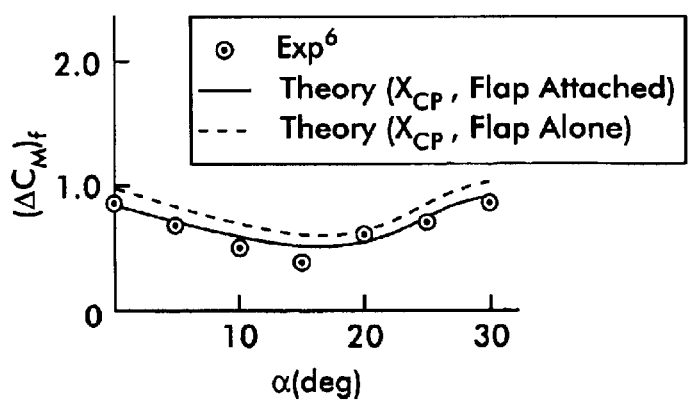
Figure 40A:
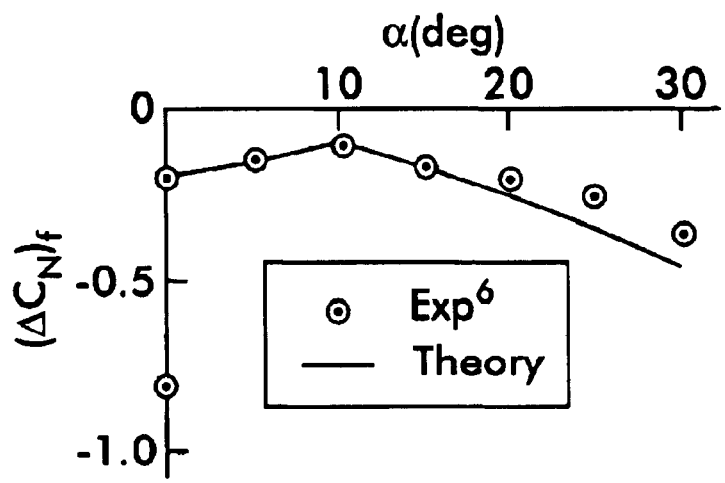
FIGS. 40A and 40B are graphs that provide a comparison of theoretical and experimental results for normal force and pitching moment coefficients of trailing edge flaps (M∞= 4.63, δ$_f$=−20 deg)
Figure 40B:
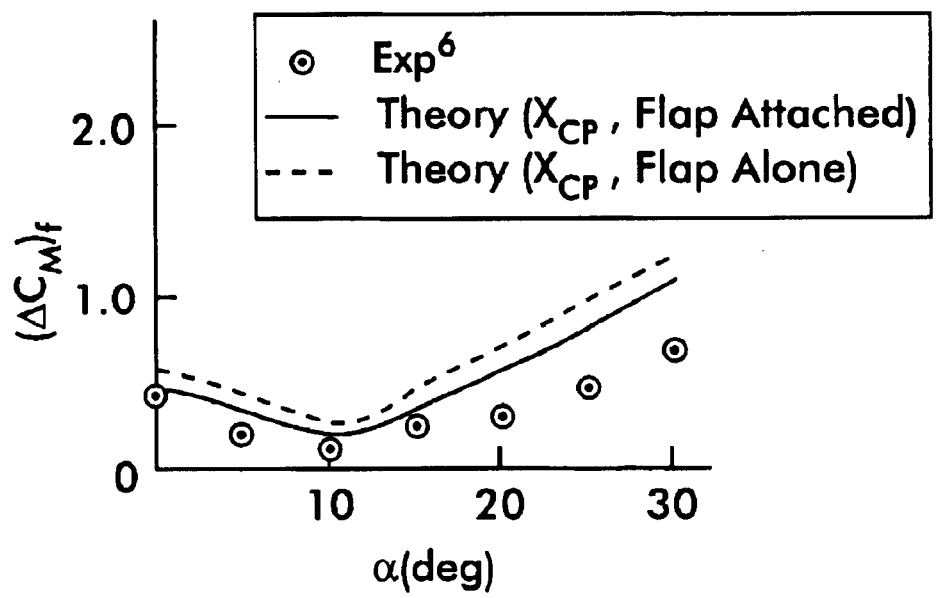
Figure 41A:
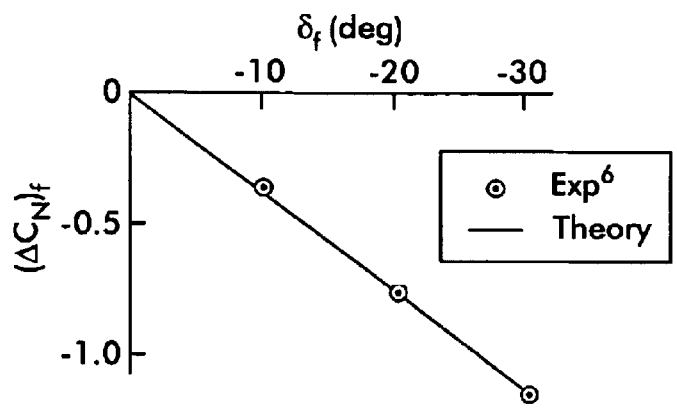
FIGS 41A and 41B are graphs that provide a comparison of theoretical and experimental results for normal force and pitching moment coefficients of trailing edge flaps (M∞=1.5, α=10 deg)
Figure 41B:
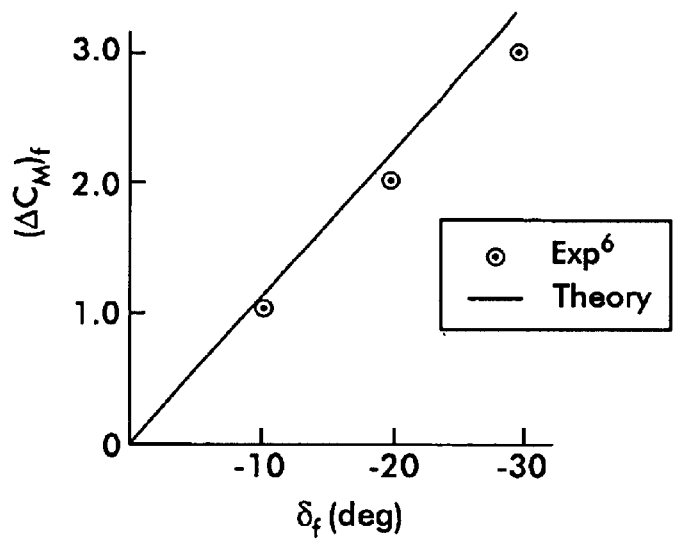
Figure 42A:
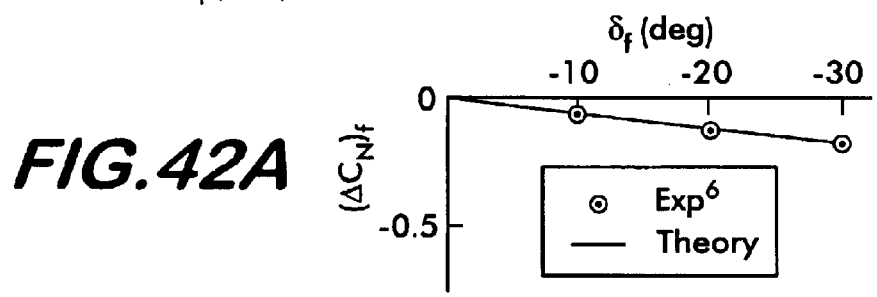
FIGS. 42A and 42B are graphs that provide a comparison of theoretical and experimental results for normal force and pitching moment coefficients of trailing edge flaps (M∞= 4.63, α=10 deg)
Figure 42B:
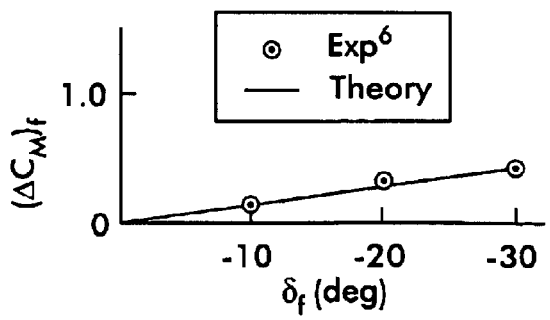

FIG. 35 gives values of $f_1$ for $M_\infty=0.4$ for values of $\alpha$ up to 30 deg and for values of $\delta_f$ of ±30 deg. FIG. 35 values of $f_1$ utilize the values of $f_2$ from FIGS. 36A–36C. FIG. 36A presents the most practical case for tail-located trailing edge flaps since $\alpha$ and $\delta_f$ must be of opposite signs for trim to occur. FIGS. 7B and 7C present results for $f_2$ when $\alpha$ and $\delta_f$ are of the same sign. FIG. 36B is for $\delta_f=10$ deg and FIG. 36C is for $\delta_f=30$ deg. Linear interpolation of the FIGS. 36B and 36C will occur for values of $\delta_f$ other than 10 or 30 deg.

Knowing $f_1$ from FIGS. 34 or 35, Equation (205) can be rewritten as $$\delta_W = \left[\frac{(C_{N_\alpha})_f f_1}{(C_{N_\alpha})_W (k_{W(B)} + k_{B(W)})}\right]\delta_f \qquad (207)$$

The way Eq. (207) is utilized within the AP02 is as follows:

1. For a given flap size, $(C_{N_\alpha})_f$ is computed from the wing alone solution in the AP02 at a given $M_\infty$, $\alpha$, AR and $\lambda$. This value of $(C_{N_\alpha})_f$ is then related to $A_{ref}$ versus $A_f$.
2. $f_1$ is then computed via table lookup for a given value of $\alpha$, $M_\infty$ and $\delta_f$ (if the flow is subsonic).
3. For a given wing size, compute $(C_{N_\alpha})_W$ from the wing alone solution in the AP02 at a given $M_\infty$, $\alpha$, AR and $\lambda$. This value of $(C_{N_\alpha})_W$ must again be referenced to $A_{ref}$.
4. Compute values of $k_{W(B)}$ and $k_{B(W)}$ at a given $\alpha$ using the nonlinear control methodology in the AP02. This methodology uses slender body theory as a basis for low AOA estimates and wind tunnel data at high AOA to modify these estimates.
5. For a given value of $\delta_f$, an effective value of $\delta_W$ can now be computed based on Eq. (207). This value of $\delta_W$ is the amount the entire wing is deflected to approximate the additional normal force of a wing due to a trailing edge flap deflection of an amount $\delta_f$.

Equation (207) defines the equivalent fin deflection to give the same normal force that deflecting the rear part of the fin an amount $\delta_f$ would give. The normal force coefficient of the flap or fin is computed from Eq. (206). That is $$(\Delta C_N)_f = f_1 (C_{N_\alpha})_f \delta_f \qquad (208)$$

The question that we must now address is the pitching moment for the flap. By deflecting the entire wing an amount $\delta_W$ defined by Eq. (207), the pitching moment for the wing will be based on the center of pressure of the entire wing, not that due to the flap. Thus to obtain the correct pitching moment for the flap, where the entire wing is deflected, a change in the center of pressure must be calculated.

Most trailing edge flaps under consideration have a fairly high aspect ratio with a fairly small root chord. The initial thought by the inventors of the present invention was to assume that the center of pressure of the normal force generated by the trailing edge flap would be similar to that on a high aspect ratio wing alone. That is, for subsonic flow, the center of pressure would be around the quarter chord location and then transition to the half chord location around $M_N=2.0$. However, in comparing this assumed location to the experimental data of Refs. 46 and 47, it was clear that this assumption on center of pressure location was not correct. It is believed the reason for the center of pressure assumption not being correct is that the flap cannot be treated as a wing in isolation at most Mach numbers. At a Mach number of 1.5, the assumption of ¼ chord transitioning to ½ chord supersonically was a good assumption (see FIG. 37). However, at other Mach numbers, assuming the center of pressure of the flap normal force could be treated similar to a high aspect ratio wing in isolation became increasingly erroneous as seen by the experimental data of FIG. 37. In giving the behavior of the experimental data in FIG. 37 some thought, the inventors now believe that the physics of the flow can explain the FIG. 37 experimental data. That is, as Mach number increases and the trailing edge flap is deflected, a shock is created ahead of the leading edge of the flap. This shock in turn creates a high pressure region on the wing where the flap is attached. This high pressure region is the reason for the experimental center of pressure of the flap normal force actually lying ahead of the leading edge of the flap as seen by FIG. 37. The dashed line in FIG. 37 is the new assumed center of pressure of the flap normal force as a function of Mach number. Notice that in FIG. 37, $[(X_{CP})_f/C_r]_{avg}$ represents the average center of pressure over the AOA range from 0 to 30 deg as a fraction of the root chord of the flap.

At a subsonic Mach number of 0.4, the center of pressure also lies ahead of the flap. If the flap deflection has the same sign as the AOA, this center of pressure location is about 0.7 flap chord lengths ahead of the flap leading edge. If the flap deflection is of opposite sign to the AOA, the center of pressure is about 0.4 flap chord lengths ahead of the flap leading edge. For Mach numbers 0 to 0.8, it is assumed these values of 0.4 and 0.7 chord lengths hold constant. For Mach numbers 0.8 to 1.5, it is assumed the location of the flap center of pressure varies linearly between the values at $M_\infty=0.8$ and 1.5.

The physics that cause the center of pressure to move ahead of the flap are believed to be different for the subsonic and supersonic cases. Supersonically, it is believed viscous effects as well as the shock structure are the dominant features. However, subsonically, it is believed the flap deflection rearranges the pressure distribution on the wing ahead of the flap as well as the viscous effects, which are present at all Mach numbers. The rearrangement of the pressure distribution on the wing ahead of the flap occurs because in subsonic flow, disturbances in the flow can feed forward, whereas supersonically they cannot, except through the boundary layer.

From a practical standpoint, the effect of the flap center of pressure shift diminishes its effectiveness somewhat in generating trim AOA. This is because the center of pressure of the normal force actually lies in front of the flap at most Mach numbers, decreasing the moment somewhat and hence the trim AOA. On the other hand, if the flap is located near the base of a fairly long body, a one to four inch shift in the center of pressure forward can be fairly small in terms of the overall moment arm. The amount of normal force created does not seem to be affected by the forward shift in center of pressure for trailing edge flaps.

The center of pressure of the trailing edge flap is therefore $$\frac{(X_{CP})_f}{l_{ref}} = \frac{(X_{LE})_W + C_{r_W} - C_{r_f} f_3 - X_{ref}}{l_{ref}} \quad (209)$$

The term $f_3$ of Eq. (209) is based on the empirically defined dotted lines of FIG. 8. That is $$f_3 = +1.5 \text{ for } M_\infty \leq 0.8 \text{ and } (\alpha, \delta) \text{ opposite signs} \quad (210)$$
$$= +1.8 \text{ for } M_\infty \leq 0.8 \text{ and } (\alpha, \delta) \text{ same signs}$$

$$f_3 = 2.53 - 1.29 \, M_\infty \text{ for } 0.8 < M_\infty \leq 1.5 \text{ and}$$
$$(\alpha, \delta) \text{ opposite signs}$$
$$= 3.17 - 1.71 \, M_\infty \text{ for } 0.8 < M_\infty \leq 1.5 \text{ and}$$
$$(\alpha, \delta) \text{ same signs}$$
$$f_3 = -0.84 + 0.96 \, M_\infty \text{ for } 1.5 < M_\infty \leq 2.7$$
$$= 1.75 \text{ for } M_\infty > 2.7$$

Using Eqs. (209) and (210), the change in pitching moment created by the fact the wing is deflected to simulate the trailing edge flap deflection is then $$(\Delta C_M)_f = -\frac{(\Delta C_N)_f}{l_{ref}}\{[(X_{CP})_f - (X_{CP})_W] + [(X_{CP})_W - X_{CG}]\} \quad (211)$$

Equation (211) represents the pitching moment coefficient of any configuration where the trailing edge flap deflection is approximated by deflecting the full wing. The first term of Eq. (211) represents the difference in the center of pressure between the flap and wing whereas the second term represents the center of pressure of the wing normal force term relative to a reference location which is here taken to be the center of gravity of the vehicle. Of course, the center of pressure of the wing is computed in the AP02 using linear theory methods at low AOA and transitions to the centroid of the wing planform area at high AOA.

The major focus in the analysis for estimating the aerodynamics of trailing edge flaps has been to determine an equivalent tail deflection which will give normal force and pitching moments equal to those when the flap is deflected. No mention of axial force has been made to this point in time. The axial force coefficient will be different for an equivalent wing deflection based on a flap deflection $\delta_f$. The flap deflection will generate an additional axial force term due to the fact $\delta_f$ will be generally much larger than $\delta_W$. An approximate relation, which can be used to calculate the increment in axial force coefficient that results from estimating the aerodynamics based on a wing deflection of $\delta_W$ versus a flap deflection of $\delta_f$ is $$(\Delta C_A)_f = (\Delta C_N)_f[\sin|\delta_f| - \sin|\delta_W|] \quad (212)$$

$(\Delta C_N)_f$ of Eq. (212) is the additional normal force contribution due to the flap. $\sin|\delta_f|$ takes the component of this normal force term in the axial direction. $\sin|\delta_W|$ subtracts off the component of axial force of the wing since this is automatically included in the AP02 calculations; to leave this term in the calculations would mean we would double account for the wing deflection axial force contribution.

Equations (208) and (211) define the theoretical change in normal force and pitching moment coefficients due to a flap deflection. The value of $(\Delta C_N)_f$ computed by the theory is that value defined by $$(\Delta C_N)_f = (C_N)_{\delta_W \neq 0} - (C_N)_{\delta_W = 0} \quad (213a)$$

The value of $\delta_W$ in Eq. (213a) is obtained from Eq. (207) using the process defined earlier in the analysis section of this report. Using the values of $\delta_W$ from Eq. (207) in the AP98, values of $(C_N)_{\delta_{W=0}}$ and $(C_N)_{\delta_{W\ne 0}}$ of Eq. (213a) can be computed and then $(\Delta C_N)_f$ defined theoretically. This value of $(\Delta C_N)_f$ can then be compared to experimental data where $(\Delta C_N)_f$ is obtained using experimental data for $(C_N)_{\delta_{f=0}}$ and $(C_N)_{\delta_{f\ne 0}}$. That is $$(\Delta C_N)_f = (C_N)_{\delta_{f\ne 0}} - (C_N)_{\delta_{f=0}} \qquad (213b)$$

Likewise, experimentally measured values of $(\Delta C_M)_f$ can be defined as $$(\Delta C_M)_f = (C_M)_{\delta_{f\ne 0}} - (C_M)_{67\ f=0} \qquad (214)$$

and compared to theoretical values computed from Eq. (211). $(\Delta C_N)_f$ of Eq. (211) comes from the theoretical values defined by Eq. (213a). Thus comparison of $(\Delta C_N)_f$ values obtained by Eq. (213a) to (212) and $(\Delta C_M)_f$ values obtained from Eq. (211) to Eq. (214) will allow the user to determine the validity and accuracy of the new theory.

Figure 32:
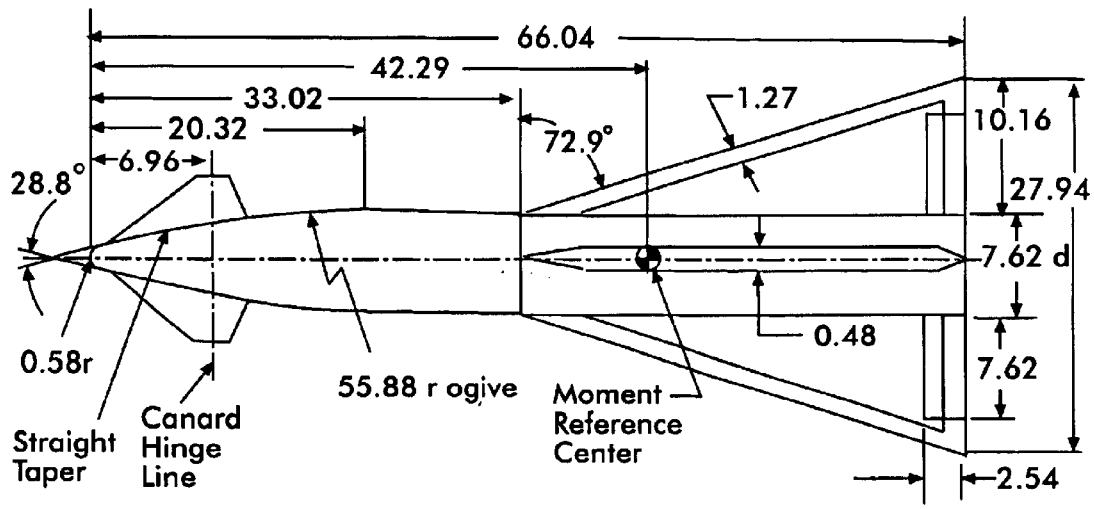
FIG. 32 is a representational drawing of a model employed in conjunction with supersonic tests (all linear dimensions in centimeters.)

The first set of data we will consider is from Ref. 46. The configuration tested in the wind tunnel is shown in FIG. 32. FIGS. 38A–38B, 39A–39B, and 40A–40B compare theoretical and experimental results for $(\Delta C_N)_f$ and $(\Delta C_M)_f$ at $\delta_f=-20$ deg and Mach numbers 1.5, 2.96, and 4.63. Similar results for other Mach number cases can be found in Ref. 42. Results are plotted as a function of AOA up to 30 deg. For Mach number 1.5, experimental data was not available up to 30 deg AOA, so data was shown where available. As seen in the FIGS. 38A–38B, 39A–39B, and 40A–40B, the theory does a reasonable job in matching the data for both $(\Delta C_N)_f$ and $(\Delta C_M)_f$, except at $M_\infty=4.63$ and $\alpha\geq 20$ deg. At these conditions, the theory overpredicts the normal force and pitching moment increments somewhat. However, since this region is beyond the anticipated practical range of usage ($M_\infty<2.0$, $\alpha<20$, $|\delta_f|<30$ deg), no effort will be made to try to improve upon the theory at this condition.

Also shown on the $(\Delta C_M)_f$ portion of FIGS. 38A–38B, 39A–39B, and 40A–40B are the results of assuming the center of pressure of the flap is based on the flap in freestream flow and with the flap attached to the trailing edge. The flap attached to the trailing edge computations takes into account the center of pressure shift shown in FIG. 37. Note that at $M_\infty=1.5$, no shift is shown so the FIGS. 38A–38B pitching moment results show no change between the flap alone and the flap attached. However, FIGS. 39A–39B and 40A–40B show a change in pitching moment between flap alone and the flap attached. As seen in FIGS. 39A–39B and 40A–40B, using the FIG. 37 results tend to show an improvement in pitching moment calculations over assuming the flap alone.

It is also worthwhile to reemphasize the fact that all the theoretical calculations shown in FIGS. 38A–38B, 39A–39B, and 40A–40B (as well as the Figures that follow) were computed by using the AP02 in conjunction with Eq. (207) as described in connection with this preferred embodiment according to the present invention, which was discussed immediately above.

FIGS. 41A and 41B and 42A and 42B compare theoretical and experimental results for $(\Delta C_N)_f$ and $(\Delta C_M)_f$ as a function of flap deflection at AOA 10 deg and for two of the Mach numbers found in the data base presented in Ref. 46. Again, similar results for other Mach number cases can be found in Ref. 42. FIGS. 41A–41B and 42A–42B are believed to be a more realistic representation of the practical case where trim is expected to occur for $\alpha\leq 10$ deg with the flap deflected as high as −30 deg. As seen in FIGS. 41A–41B and 42A–42B, the theoretical and experimental results are in fairly good agreement. All pitching moment data in FIGS. 41A–41B and 42A–42B assume the FIG. 37 center of pressure shift. Note also that the theory shows a linear variation of $(\Delta C_N)_f$ and $(\Delta C_M)_f$ for $M_\infty\geq 1.5$ and $\delta_f$ to −30 deg for the small AOA of 10 deg.

Figure 33:
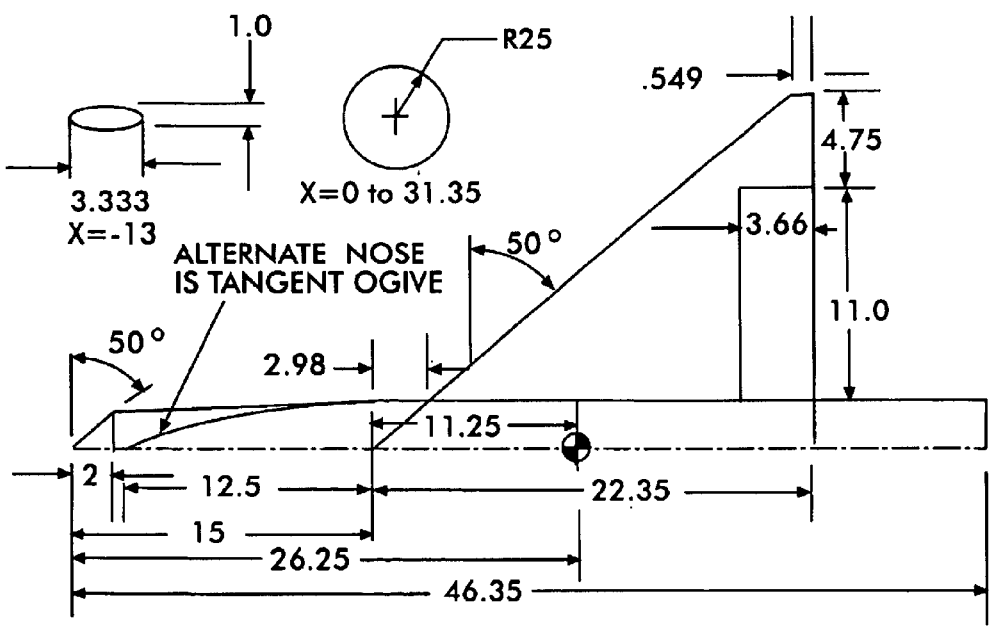
FIG. 33 is schematic drawing of a Delta wing planform used in conjunction with subsonic tests (all dimensions in inches)

It should be mentioned that Ref. 47 represents the only subsonic data base the inventor found in the literature. The configuration tested is shown in FIG. 33. The ogive of the FIG. 33 configuration can be elliptical or a circular cylinder tangent ogive. The case upon which the change in pitching moments and normal force coefficients were determined was based on an elliptical nose. However, since the data used was $(\Delta C_N)_f$ and $(\Delta C_M)_f$, it is expected that the body shape will have little impact, since the same body shape is used for the $\delta_f=0$ case as well as the $\delta_f\ne 0$ case. It should also be mentioned that Ref. 47 presents both positive and negative values of $\delta_f$. Unfortunately, $M_\infty=0.4$ was the highest freestream Mach number considered, and AOA to 30 deg were also included in the test series.

Figure 43A:
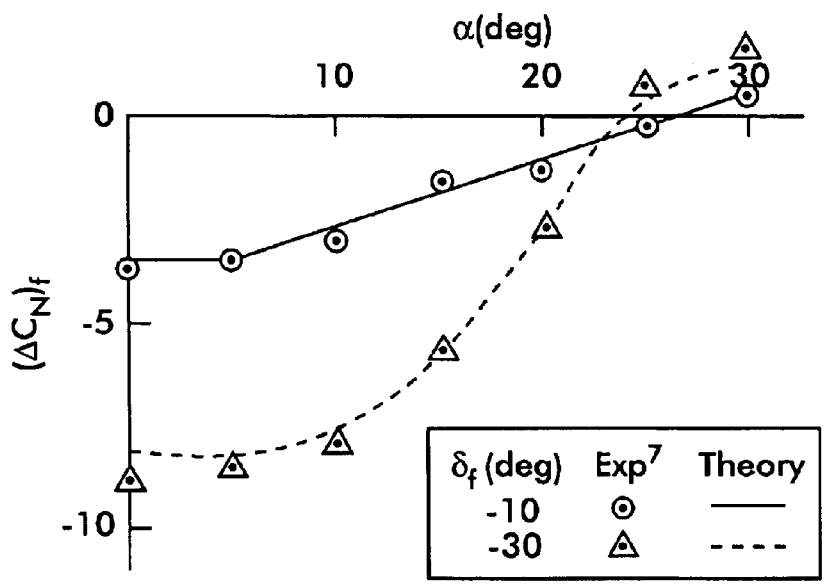
FIGS. 43A and 43B are graphs that provide a comparison of theoretical and experimental results for normal force and pitching moment coefficients of trailing edge flaps (M∞=0.4, δ$_f$ negative)
Figure 43B:
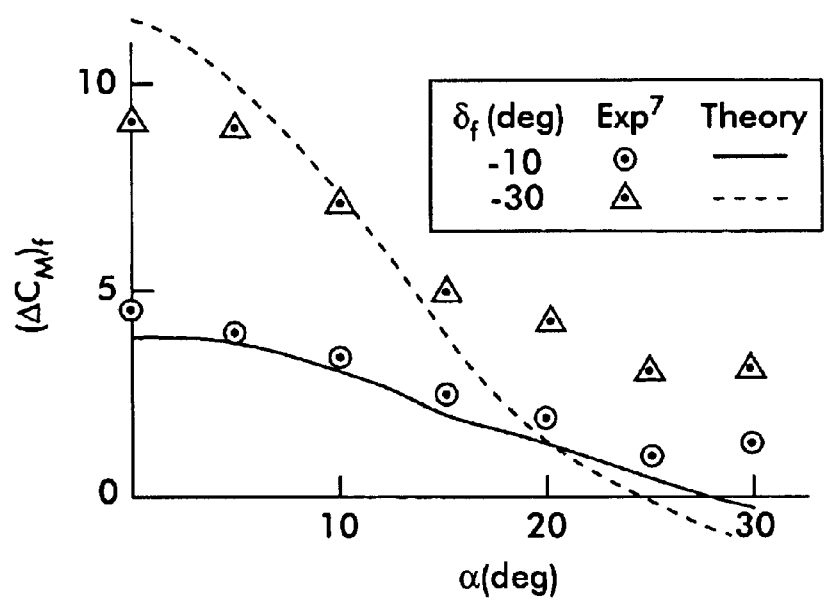

FIGS. 43a and 43B compare the theoretical and experimental results for $(\Delta C_N)_f$ and $(\Delta C_M)_f$ where $\delta_f$ is negative for $\alpha$ to 30 deg. Note excellent agreement for $(\Delta C_N)_f$ is obtained between theoretical and experimental results for both $\delta_f=-10$ deg and −30 deg cases. Good agreement between theoretical and experimental results is obtained for $(\Delta C_M)_f$ for the $\delta_f=-10$ deg case up to $\alpha$ of about 20 to 25 deg, where the theoretical and experimental results start to deviate. For $\delta_f=-30$ deg, comparison of theoretical and experimental results for $(\Delta C_M)_f$ is quite acceptable for $\alpha$ up to 20 deg. The trim AOA occurs at about 6 deg for $\delta_f=-10$ deg and at about 14.8 deg for $\delta_f=-30$ deg. In other words, good accuracy in both $(\Delta C_N)_f$ and $(\Delta C_M)_f$ can be obtained up to and slightly beyond the trim AOA, which is most critical. For $\alpha$ above the trim value, accuracy of $(\Delta C_N)_f$ and $(\Delta C_M)_f$ is not as important, and thus no attempt was made to try to improve the theory for these conditions.

Figure 44A:
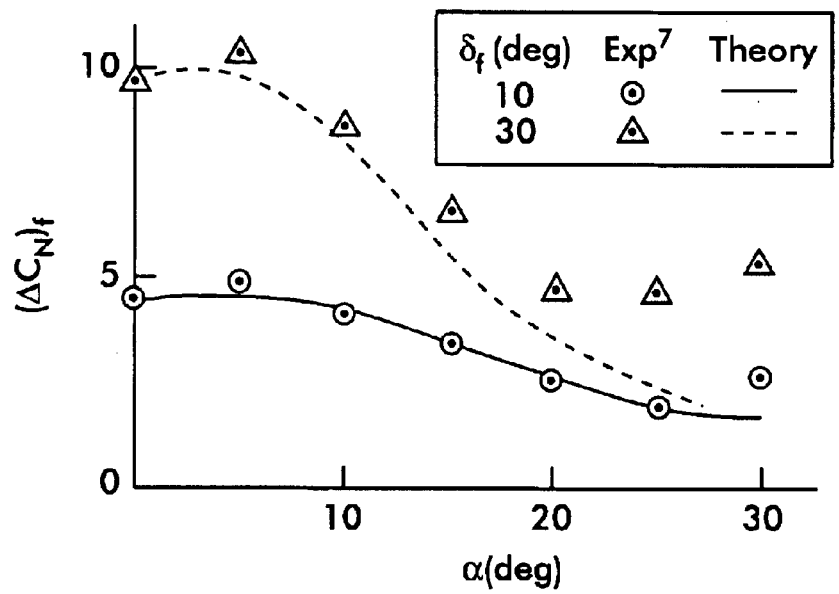
FIGS. 44A and 44B are graphs that provide a comparison of theoretical and experimental results for normal force and pitching moment coefficients of trailing edge flaps (M∞=0.4, δ$_f$ positive)
Figure 44B:
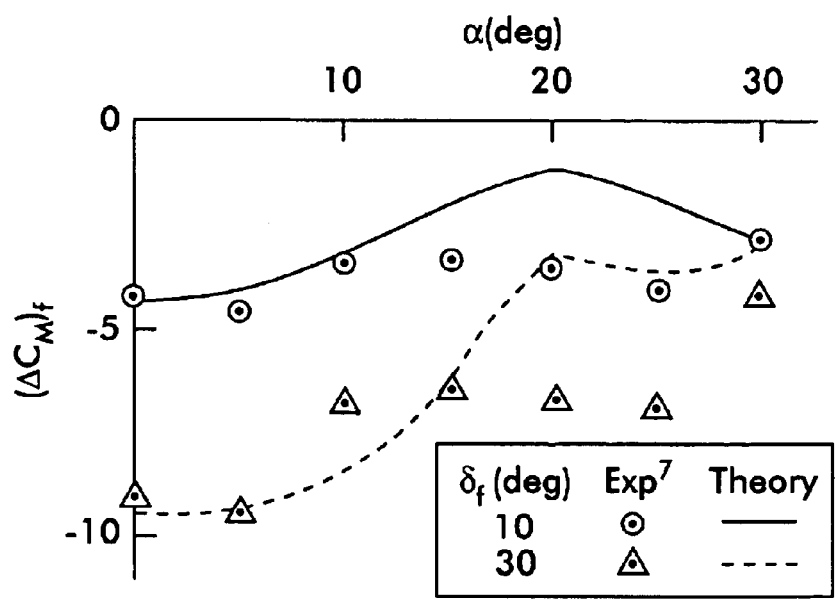

FIGS. 44A and 44B gives the complimentary results to the FIGS. 43A and 43B case except here $\delta_f$ is positive. While trim cannot occur due to the fact $\alpha$ and $\delta_f$ are of the same sign and the configuration is tail controlled, it is still of interest to see how well the theoretical results compare to experimental data for conditions where trim is not possible. As seen in FIGS. 44A and 44B, agreement between theoretical and experimental results for both $(\Delta C_N)_f$ and $(\Delta C_M)_f$ is quite good up to an $\alpha$ of about 15 deg. Above $\alpha$ of 15 deg, both $(\Delta C_M)_f$ and $(\Delta C_N)_f$ deviate from experiment data for most conditions. Again, since this is not a practical set of conditions for trim, no effect has been made to improve $(\Delta C_N)_f$ and $(\Delta C_M)_f$ for $\alpha$ above 15 deg when $\delta_f$ is positive.

Figure 45A:
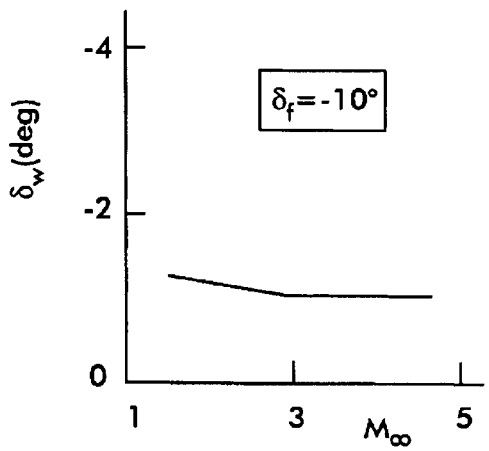
FIGS. 45A, 45B, 45C, and 45D are graphs that collectively provide a comparison of theoretical and experimental results for axial force coefficient at various values of flap deflection and as represented by an equivalent deflection of entire wing at α=0 deg (R$_N$/ft=2.5×10$^6$).
Figure 45B:
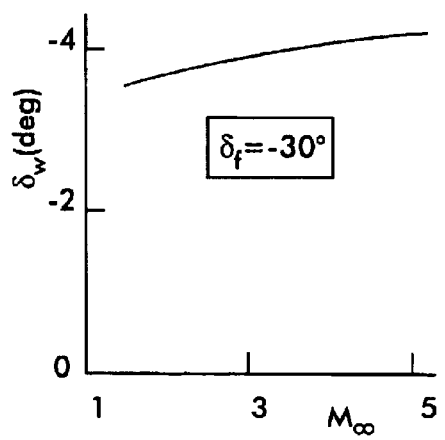
Figure 45C:
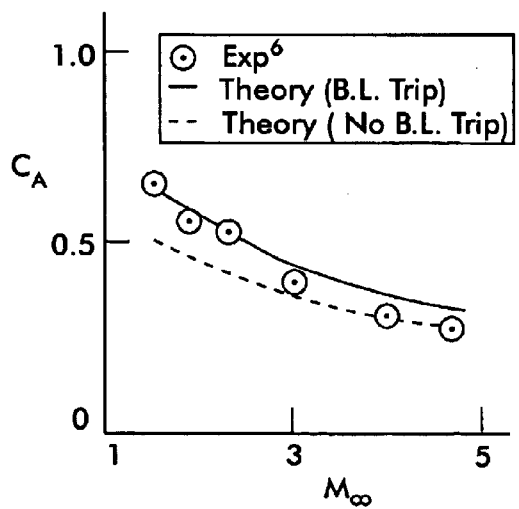
Figure 45D:
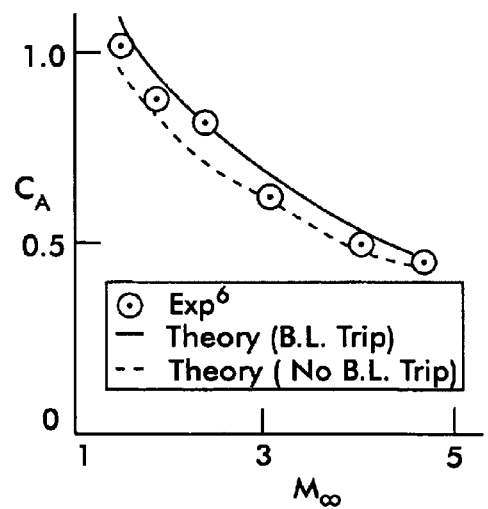

FIGS. 45A–45D compare the theoretical and experimental results for axial force coefficient where the trailing edge flap has been deflected −10 deg and −30 deg respectively. The equivalent value of $\delta_W$ corresponding to $\delta_f=-10$ deg and −30 deg respectively is shown presented in FIGS. 45A and 45B, respectively, as a function of freestream Mach number. Note that $\delta_W$ is only a small fraction of $\delta_f$. The wing area is 8.67 times that of the trailing edge flap. FIGS. 45C and 45D depict the axial force coefficient based on the AP02 calculations plus the value defined by Eq. (12). Two cases are shown for the theory: where the wind tunnel model has a boundary layer trip; and where no boundary layer trip is present. The Reynolds number for these tests was $2.5\times 10^6$.

According to Ref. 46, a boundary layer trip was present. Based on comparison of theoretical and experimental results, it appears the boundary layer trip was effective in producing a turbulent boundary layer over the surface at the lower supersonic Mach numbers. However, at the higher supersonic Mach numbers, it appears that the flow partially transitions back to laminar over much of the body and large wing for the δ=−10 deg case. This relaminarization of the flow is speculated to be the reason the theory with no boundary layer trip option agrees closer to the wind tunnel data at high supersonic Mach number than does the theory which assumes turbulent flow over the entire surface of the model at all Mach numbers. If the above hypothesis of relaminarization of the flow is correct, the theory predicts the experimental data quite nicely. If this hypothesis is not correct, then the theoretical data is high for Mach numbers 3.0 and greater.

The data base presented in Ref. 47 also contained axial force data. Unfortunately, the base drag term was subtracted out, only one fin was deflected, and the numbers for no fin deflection were small and irregular. As a result, it was believed an accurate value of experimental data for the axial force would be difficult to obtain and, therefore, no comparisons of axial force coefficient are shown at subsonic Mach numbers.

In summary, an improved semiempirical method has been developed to estimate the static aerodynamics generated by a trailing edge flap. The method is based on deflecting the full wing or tail surface an amount that allows the normal force coefficient to be equal to that generated by the flap deflected. A transfer in pitching moments is derived to account for the difference in pitching moment when a full wing versus a trailing edge flap is deflected. In addition, an approximate relationship is given which accounts for the additional axial force coefficient not accounted for based on a full wing deflected a small amount versus a trailing edge flap deflected by a larger amount.

In comparing the new semiempirical method to experimental data, the following observations were made.

1. Normal force coefficient predictions at supersonic speeds were very good except at the highest Mach numbers ($M_\infty$=4.63) and AOA ($\alpha$>25 deg) where the predictions were only fair.
2. Pitching moment coefficient predictions at supersonic speeds were fair to good at all conditions considered (1.5≦$M_\infty$≦4.63, 0≦$\alpha$≦30, −30≦$\delta_f$≦0). The worst case agreement was again for $M_\infty$=4.63 and $\alpha$>20 deg.
3. Axial force coefficient predictions for supersonic conditions were found to be reasonable. However, the accuracy was seen to be dependent on whether the boundary layer on the wind tunnel model remained turbulent at $M_\infty$≧2.3 versus returning to laminar flow over the model.
4. At subsonic flow, the only data available to the inventor was at $M_\infty$=0.4. For this Mach number, it was found the predictions for both normal force and pitching moment coefficients were acceptable up to and slightly past the trim AOA. For larger flap deflections, the accuracy of the predictions was acceptable at AOAs that exceeded trim conditions by about 5 deg. However, since trim and slightly past trim are of the most practical interest, this problem was not seen as a major limitation.

It should be noted that a linear interpolation of the empirical factors employed in the derivation process was assumed between Mach numbers of 0.8 and 1.5. Also, values of these factors were assumed to be constant below $M_\infty$=0.4 and above $M_\infty$=4.63, where no data was available.

Additional wind tunnel data advantageously can be used to refine and validate the new semiempirical model. Specifically, data regarding times when the AOA and flap deflection are of the same sign at supersonic speeds would be particularly useful. In addition, data regard performance at Mach numbers between 0.4 and 1.5 would also be useful. It will be appreciated that until additional data becomes available, the model derived here and discussed above employs sound engineering judgment to fill in these gaps, thus allowing the model to be operational over the practical AOA, Mach number, and control deflection ranges for which the use of trailing edge flaps are particularly contemplated.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

APPENDIX A

Nomenclature

| | |
|---|---|
| $A_{REF}$ or $A_{ref}$ | Reference area (maximum cross-sectional area of body, if a body is present, or planform area of wing, if wing alone)(ft$^2$) |
| $A_B$ | Base area = $\pi d_B^2/4$ |
| AR | Aspect Ratio = $b^2/A_W$ |
| $A_t$ | Area of rocket motor nozzle throat cross-section |
| $A_W$ | Planform area of wing in crossflow plane (ft$^2$) |
| B | Wing span (not including body)(ft) |
| $C_A$ | Axial force coefficient |
| $C_{A_B}$, $C_{A_f}$, $C_{A_W}$ | Base, skin-friction, and wave components, respectively, of axial force coefficient |
| $C_{A_F}$ | Forebody axial force coefficient ($C_{A_F} = C_{A_f} + C_{A_W}$) |
| $(\Delta C_A)_f$, $(\Delta C_N)_f$, $(\Delta C_M)_f$ | Change in axial, normal and pitching moment coefficients, respectively, due to a flap deflection $\delta_f$ |
| $C_D$ | Drag coefficient |
| $C_L$ | Lift coefficient |
| $C_M$ | Pitching moment coefficient (based on reference area and body diameter, if body present, or mean aerodynamic chord, if wing alone) |
| $C_{M_\alpha}$ | Pitching moment coefficient derivative (per radian) |
| $C_{M_q} + C_{M_{\dot\alpha}}$ | Pitching damping moment coefficient $[C_M(q)/(qd/2V_\infty) + C_M(\dot\alpha)/(\dot\alpha d/2V_\infty)]$ |
| $C_M(q)$ | Pitching moment coefficient due to a constant pitching rate of q |
| $C_M(\dot\alpha)$ | Pitching moment coefficient due to a constant vertical acceleration of $\dot\alpha$ |
| $C_N$ | Normal force coefficient |
| $C_{N_\alpha}$ | Normal-force coefficient derivative (per radian) |
| $C_{N_{B(W)}}$, $C_{N_{B(T)}}$ | Normal-force coefficient on body in presence of wing or tail |
| $(C_{N_\alpha})_W$, $(C_{N_\alpha})_T$ | Normal-force coefficient slope of wing and tail respectively |
| $C_{N_W}$ | Normal-force coefficient of wing alone |
| $C_{N_{W(B)}}$, $C_{N_{T(B)}}$ | Normal-force coefficient of wing or tail in presence of body |
| $C_{P_B}$ | Base Pressure Coefficient |
| $C_T$ | Thrust Coefficient |
| $c_r$ | Root chord (ft) |
| $c_{r_w}$, $c_{r_f}$ | Root chord of wing and flap respectively (ft) |
| $c_t$ | Tip chord (ft) |
| Cal | Caliber(s) (one body diameter) |
| D | Diameter |
| $d_B$ | Body diameter (ft) at base |
| $d_r$ or $d_{ref}$ | Reference body diameter (ft) |
| Deg | Degree(s) |
| $f_1$, $f_2$, $f_3$ | Empirical factors used in defining the semiempirical model for flap aerodynamics |
| I | Nondimensional base bleed injection parameter |
| $k_{B(W)}$, $k_{B(T)}$ | Ratio of additional body normal-force coefficient due to presence of wing or tail at a control deflection to that of wing or tail alone at $\alpha$ = 0 deg |
| $k_{W(B)}$, $k_{T(B)}$ | Ratio of wing or tail normal-force coefficient in presence of body due to a control deflection to that of wing or tail alone at $\alpha$ = 0 deg |

APPENDIX A-continued

| | |
|---|---|
| $l, l_n, l_a, l_f$ | Body length, nose length, afterbody length, and flare length, respectively |
| $l_1$ | Distance from cone apex to flare-cylinder juncture |
| $l_{ref}$ | Reference length (ft) |
| m | Mass rate of flow ($\rho AV$) |
| M | Mach number |
| $M_\infty$ | Freestream Mach number |
| $M_{W(B)}, M_{B(W)}$ | Moment of wing in presence of body and body in presence of wing respectively (ft - lb) |
| N | Normal force (lbs) |
| $N_{W(B)}, N_{B(W)}$ | Normal force of wing in presence of body and body in presence of wing respectively (lb) |
| $N_f$ | Normal force of trailing edge flap (lb) |
| P | Static pressure (lb/ft$^2$) |
| $P_0$ | Total pressure (lb/ft$^2$) |
| R | Local body radius (ft) |
| $r_{LE}, r_{TE}$ | Radius of leading and trailing edges of fin respectively (ft) |
| RMF | Jet momentum flux ratio |
| $r_n$ | Nose radius (ft) |
| $R_N$ | Reynolds number |
| T | Fin thickness (ft) |
| T | Temperature (° R) or thrust (lbs) |
| V | Velocity (ft/sec) |
| $V_\infty$ | Freestream velocity (ft/sec) |
| $X_{LE}, X_{CG}$ | Distance from nose tip to wing leading edge or center of gravity of body respectively (ft) |
| $x_{CP}, \bar{x}_{CP}$ | Center of pressure (in feet or calibers respectively, from some reference point that can be specified) in x direction |
| $x_j$ | Distance of jet exit from body base (positive behind base) |
| $X_{ref}$ | Reference location along x axis for moments (ft) |
| x, y, z | Axis system fixed with x along centerline of body |
| α or AOA | Angle of attack (deg) (positive nose up) |
| $\alpha_{TR}$ | Trim angle of attack (deg) |
| Φ | Roll position of missile fins (Φ = 0 deg corresponds to fins in the plus (+) orientation; Φ = 45 deg corresponds to fins rolled to the cross (x) orientation) |
| θ | Jet exit angle, boattail or flare angle |
| $\theta_f$ | Flare angle (deg) |
| γ | Ratio of specific heats |
| ρ | Density (slugs/ft$^3$) |
| $\Lambda_{LE}$ | Leading edge sweepback angle of fin (deg) |
| $\delta_f$ | Control deflection (deg) of trailing edge flap, positive leading edge up |
| $\delta_W, \delta_T$ | Deflection of wing or tail surfaces (deg), positive leading edge up |
| λ | Taper ratio of a lifting surface = $c_t/c_r$ |
| Subscripts | |
| B | Conditions at body base |
| C | Conditions in rocket motor chamber or Cone |
| CG | Center of gravity |
| f | Flare |
| j | Conditions at nozzle exit |
| r, ref | Reference conditions |
| ∞ | Freestream conditions |
| Superscript | |
| * | Indicates conditions where M = 1.0 |

APPENDIX B

1. Moore, F. G., McInville, R. M., and Hymer, T., "The 1998 Version of the NSWC Aeroprediction Code: Part I - Summary of New Theoretical Methodology," NSWCDD/TR-98/1, April 1998.
2. Moore, F. G., McInville, R. M., and Robinson, D. I., "A Simplified Method for Predicting Aerodynamics of Multi-Fin Weapons," NSWCDD/TR-99/19, March 1999.
3. Moore, F. G. and McInville, R. M., "Refinements in the Aeroprediction Code Based on Recent Wind Tunnel Data," NSWCDD/TR-99/116, December 1999.
4. Allen, J. M., Hemsch, M. J., Burns, K. A., and Oeters, K. J., "Parametric Fin-Body and Fin-Alone Database on a Series of 12 Missile Fins," NASA LRC TM in publication, May 1996.
5. Hymer, T. C., Downs, C., and Moore, F. G., "Users Guide for an Interactive Personal Computer Interface for the 1998 Aeroprediction Code (AP98)," NSWCDD/TR-98/7, June 1998.
6. Sturek, W. B., Nietubicz, C. J., Sahu, J.; and Weinacht, P., "Recent Applications of CFD to the Aerodynamics of Army Projectiles," ARL-TR-22, U.S. Army Research Laboratory, Aberdeen Proving Ground, MD, December 1992.
7. Weinacht, P., "Navier-Stokes Predictions of Pitch-Damping for a Family of Flared Projectiles," ARL-TR-591, U.S. Army Research Laboratory, Aberdeen Proving Ground, MD, October 1994.
8. Qin, N., Ludlow, D. K., Shaw, S. T., Edwards, J. A., and Dupuis, A., "Calculation of Pitch Damping Coefficients for Projectiles," AIAA paper no. 97-0405, 35th Aerospace Sciences Meeting, January 1997.
9. Weinacht, P., Sturek, W. B., and Schiff L. B., Navier-Stokes Predictions of Pitch-Damping for Axisymmetric Shell Using Steady Coming Motion," ARL-TR-575, U.S. Army Research Laboratory, Aberdeen Proving Ground, MD, September 1994.
10. Weinacht, P., "Prediction of Pitch-Damping of Projectiles at Low Supersonic and Transonic Velocities," AIAA paper no. 98-0395, 36th Aerospace Sciences Meeting, Reno, NV, January 1998.
11. Moore, F. G. and Hymer, T. C., "Improvements in Pitch Damping for the Aeroprediction Code with Particular Emphasis on Flare Configurations," NSWCDD/TR-00/009, April 2000.
12. Wu, J. M. and Aoyoma, K., "Transonic Flow-Field Calculation Around Ogive Cylinders by Nonlinear - Linear Stretching Method," U.S. Army Missile Command Technical Report No. RD-TR-70-12, April 1970. Also AIAA 8$^{th}$ Aerospace Sciences Meeting, AIAA paper 70-189, January 1970.
13. Ames Research Staff, "Equations, Tables, and Charts for Compressible Flow," NACA Report 1135, 1953.
14. Whyte, R. H., "Spinner - A Computer Program for Predicting the Aerodynamic Coefficients of Spin Stabilized Projectiles," General Electric Class 2 Reports, 1969.
15. Chin, S. S., "Missile Configuration Design," McGraw Hill Book Company, Inc., New York, NY, 1961, pp. 134–138
16. Robinson, R., "Wind Tunnel Investigation at a Mach Number of 2.01 of the Aerodynamic Characteristics in Combined Angles of Attack and Sideslip of Several Hypersonic Missile Configurations with Various Canard Controls," NACA RM L58A21, March 1958.
17. Guidos, B. J., "Static Aerodynamics CFD Analysis for 120-mm Hypersonic KE Projectile Design," ARL-MR-184, U.S. Army Research Laboratory, Aberdeen Proving Ground, MD, September 1994.
18. Dupuis, A. and Edwards, J. A., "Analysis of Free-Flight Data for the CAN4 Hypersonic Research Projectile," AIAA paper no. 98-0581, 36th Aerospace Sciences Meeting, Reno, NV, January 1998.
19. Brazzel, Charles E. and Henderson, J. H., "An Empirical Technique for Estimating Power-On Base Drag of Bodies-of-Revolution With a Single Jet Exhaust," Proceedings of a Specialists' Meeting Sponsored by the AGARD Fluid Dynamics Panel, held in Melhouse, France, 5–8 Sep. 1966.

APPENDIX B-continued

20. Johnson, L. H., Subj: Approximate Engine-On Base Pressure Computations for Aerodynamic Computer Codes, NSWCDD Internal Memorandum K21 No. 82-11, 1 Feb. 1983.
21. Danberg, J. E., "Analysis of the Flight Performance of the 155 mm M864 Base Burn Projectile," BRL-TR-3083, April 1990.
22. Moore, F. G.; Hymer, T. C.; and Wilcox, F. J., Jr; "Improved Empirical Model for Base Drag Prediction on Missle Configurations Based on New Wind Tunnel Data," NSWCDD/TR-92/509, October 1992.
23. Craft, J. C. and Brazzel, C. E., "An Experimental Investigation of Base Pressures on a Body of Revolution at High Thrust Levels and Freestream Mach Numbers of 1.5 to 2.87," U.S. Army Missile Command, Redstone Arsenal, AL, Report No. RD-TM-70-6, July 1970.
24. Henderson, J. H., "An Investigation for Modeling Jet Plume Effects on Missile Aerodynamics," TR RD-CR-82-25, U.S. Army Missile Command, Redstone Arsenal, AL 35809, July 1982.
25. Deep, R. A.; Henderson, J. H.; and Brazzel, C. E.; "Thrust Effects on Missile Aerodynamics," RD-TR-71-9, U.S. Army Missile Command, Huntsville, AL 35809, May 1971.
26. Moore, F. G. and Hymer, T. C., "Improved Power-on, Base Drag Methodology for the Aeroprediction Code," NSWCDD/TR-00/67, October 2000.
27. Reid, J. and Hastings, R. C.; "The Effect of a Central Jet on the Base Pressure of a Cylindrical Afterbody in a Supersonic Stream," Royal Aircraft Establishment Report No. Aero 2621, December 1959 (Farnborough, England).
28. Bowman, J. E. and Clayden, W. A., "Cylindrical Afterbodies in Supersonic Flow with Gas Injection," AIAA Journal, Vol. 5, No. 8, pp.1524–1525, August 1967.
29. Bowman, J. E. and Clayden, W. A., "Cylindrical Afterbodies at $M_\infty = 2$ with Hot Gas Ejection," AIAA Journal, Vol. 6, No. 12, pp. 2429–2431, December 1968.
30. Valentine, D. T. and Przirembel, C. E. G., "Turbulent Axisymmetric Near-Wake at Mach Four With Base Injection," AIAA Journal, Vol. 8, No. 12, pp. 2279–2280, December 1970.
31. Mathur, T. and Dutton, J. C., "Base Bleed Experiments with a Cylindrical Afterbody in Supersonic Flow," AIAA 95-0062, 33$^{RD}$ Aerospace Science Meeting, Reno, NV, 9–12 Jan. 1995.
32. Sykes, D. M., "Cylindrical and Boattailed Afterbodies in Transonic Flow with Gas Ejection," AIAA Journal, Vol. 8, No. 3, pp. 588–589, March 1970.
33. Kayser L. D., "Effects of Base Bleed and Supersonic Nozzle Injection on Base Pressure," Memorandum Report No. 2456, USA Ballistic Research Laboratories, Aberdeen Proving Ground, MD, March 1975. (AD B 003442L)
34. Cortright, E. M. Jr. and Schroeder, A. H., "Preliminary Investigation of Effectiveness of Base Bleed in Reducing Drag of Blunt Based Bodies in Supersonic Stream," NACA RM E51A26 (1951).
35. Murthy, S. N. B. and Osborn, J. R., "Base Flow Phenomena With and Without Injection: Experimental Results, Theories and Bibliography," AIAA progress in Astronautics and Aeronautics, Vol. 40, 1976; also Aerodynamics of Base Combustion (same issue).
36. Kayser, L. D.; Kuzan, J. D., Vazquez, D. N., "Ground Testing for Base-Burn Projectile Systems," BRL-MR-3708, U.S.A. Ballistic Research Laboratory, Aberdeen Proving Ground, MD. November 1988.
37. Badrinarayaman, M. A., "An Experimental Investigation of Base Flows at Supersonic Speeds," Journal of the Royal Aeronautical Society, Vol. 65, pp. 475–482, 1961.
38. Ding, Z.; Liu, Y.; and Chen, S., "A Study of Drag Reduction by Base Bleed at Subsonic Speeds," First International Symposium on Special Topics in Chemical Propulsion: Base Bleed, Athens, Greece, 23–25 Nov. 1988.
39. Bromm, A. F. and O'Donnell, R. M., "Investigation at Supersonic Speeds of the Effect of Jet Mach and Divergence Angle of the Nozzle Upon the Pressure of the Base Annulus of a Body of Revolution," NACA RM E57E06, August 1957.
40. Martin, T. A. and Brazzel, C. E., "Investigation of the Effect of Low Thrust Levels on the Base Pressure of a Cylindrical Body at Supersonic Speeds," USAMC, Redstone Arsenal, USA, RD-TR-70-11, May 1970.
41. Rubin, D. V.; "A Transonic Investigation of Jet Plume Effects on Base and Afterbody Pressures of Boattail and Flare Bodies of Revolution," U.S. Army Missile Command Report RD-TR-70-10, Redstone Arsenal, AL, October 1970.
42. Moore, F. G. and Hymer, T. C., "A Semiempirical Method for Predicting Aerodynamics of Trailing Edge Flaps," NSWCDD/TR-01/30, June 2001.
43. Blake, W. B. and Burns, K. A., "Missile Datcom: Recent Enhancements Including Trailing Edge Flap Effects," AIAA paper 94-0027, 32$^{nd}$ Aerospace Sciences Meeting, Reno, NV, January 1994.
44. Hoak, D. E., et al., "USAF Stability and Control DATCOM," AFWAL TR 83-3048, October 1960, revised 1978.
45. Goin, K. L., "Equations and Charts for the Rapid Estimation of Hinge-Moment and Effectiveness Parameters for Trailing-Edge Controls Having Leading and Trailing Edges Swept Ahead of the Mach Lines," NACA TR 1041, 1951.
46. Triscott, C. D., Jr., "Longitudinal Aerodynamic Characteristics at Mach 1.50 to 4.63 of a Missile Model Employing Various Canards and a Trailing-Edge Flap Control," NASA TM X-2367,October 1971.
47. Baldwin, A. W. and Adamczak, D. W., "Experimental Evaluation of Aerodynamic Control Devices for Control of Tailless Fighter Aircraft," WL-TM-92-318, Flight Dynamics Directorate, Wright Laboratory, Wright Patterson AFB, OH 45433-6553, April 1992.

APPENDIX C $$P_B/P_\infty = \left(\frac{T_j}{T_j^*}\right)^N \left[C_1(C_T, M_\infty) + C_2(M_\infty)\left(\frac{RMF}{1+RMF}\right)\left(\frac{RMF}{1+RMF}\right)\right] f(d_B/d_r) + f(x_j/d)$$

where $N = \dfrac{12 - C_T}{11}$, $1.0 \leq C_T < 12$ and $f(x_j/d) = .047(5 - M_\infty)\left[2(x_j/d_B) + (x_j/d_B)^2\right]$ $= 0, C_T \geq 12.0$ $= 1, C_T < 1.0$ $$(T_j/T_j^*)_{min} = 0.7 - (M_\infty - 1.2)\left(\frac{0.7 - T_j/T_j^*}{0.3}\right); 1.2 \le M_\infty \le 1.5$$

$$= 0.7; M_\infty < 1.2$$

$$(T_j/T_j^*)_{min} = \frac{\frac{y_j + 1}{2}}{1 + \frac{y_j - 1}{2}M_j^2}; M_\infty > 1.5$$

If $d_B/d_r < 1.0$ $$f(d_B/d_r) = \frac{3.5}{1 + 2.5(d_B/d_r)^2}; C_T \le 6.0$$

$$= 1 + \frac{12 - C_T}{6}\left[\frac{3.5}{1 + 2.5(d_B/d_r)^2} - 1\right]; 6 \le C_T \le 12$$

$$= 1; C_T > 12.0$$

If $d_B/d_r > 1.0$ $$f(d_B/d_r) = \frac{3.5}{1 + 2.5(d_B/d_r)^2}; C_T \le 25.0$$

$$= 1 + \frac{75 - C_T}{50}\left[\frac{3.5}{1 + 2.5(d_B/d_r)^2} - 1\right]; 25 \le C_T \le 75$$

$$= 1; C_T > 75$$

| | $C_1 (C_T, M_\infty) C_T$ | | | | | $C_2 (M_\infty, C_T) C_T$ | |
|---|---|---|---|---|---|---|---|
| $M_\infty$ | ≤1.0 | 2.0 | 20 | 40 | ≥70 | ≤1.0 | ≥2.0 |
| ≤0.9 | 0.19 | 0.16 | −0.06 | 0.02 | 0.0 | 1.24 | 1.24 |
| 1.0 | 0.19 | −0.085 | −0.06 | 0.02 | 0.0 | 1.28 | 1.37 |
| 1.25 | 0.19 | −0.085 | −0.01 | 0.02 | 0.0 | 1.28 | 1.47 |
| 1.65 | 0.19 | −0.175 | −0.06 | 0.04 | 0.0 | 1.28 | 1.70 |
| 2.0 | 0.19 | −0.30 | −0.20 | 0.02 | 0.0 | 1.28 | 1.90 |
| 2.5 | 0.19 | −0.45 | −0.23 | 0.01 | 0.0 | 1.28 | 2.30 |
| 3.0 | 0.19 | −0.55 | −0.22 | −0.03 | 0.0 | 1.28 | 2.50 |
| ≥4.0 | 0.19 | −0.65 | −0.10 | −0.04 | 0.0 | 1.28 | 2.7 |

What is claimed is:

1. A method of predicting the aerodynamic performance of a flared body, comprising:

generating a look table including calculated values of $(C_{N_\alpha})_f$ for freestream Mach numbers greater than or equal to 1.2 and estimated values of $(C_{N_\alpha})_f$ for freestream Mach numbers less than 1.2 indexed to geometry and Mach number;

solving $C_{N_f} = (C_{N_\alpha})_f \alpha$;

solving $C_{M_f} = -\left(\frac{x_{CP} - x_{CG}}{d}\right)C_{N_f}$, to thereby determine the normal force coefficient and the pitching moment coefficient, respectively, where:
$C_{N_f}$ is the normal force coefficient of the flared body,
$C_{M_f}$ is the pitching moment coefficient for the flared body,
$(C_{N_\alpha})_f$ is the pitching moment coefficient derivative (in radians) for the flared body,
$\alpha$ is the angle of attack,
d is the diameter of the flared body,
$X_{CP}$ is the center of pressure, and
$X_{CG}$ is the distance from the center of gravity; and
using the normal force coefficient and the pitching moment coefficient to predict the aerodynamic performance of the flared body.

2. A method for predicting the aerodynamic performance associated with power-on base drag performance, comprising:

determining the jet momentum flux ratio (RMF) by solving the equation:

$$RMF = \frac{\gamma_j P_j d_j^2 M_j^2}{\gamma_\infty P_\infty d_r^2 M_\infty^2};$$

calculating $T_j/T_j^*$ by solving the expression:

$$\frac{T_j}{T_j^*} = \frac{\frac{\gamma_j + 1}{2}}{1 + \frac{\gamma_j - 1}{2}M_j^2};$$

calculating the base pressure ratio for power on by solving the expression:

$$\frac{P_B}{P_\infty} = 0.047(5 - M_\infty)[2(x_j/d_B) + (x_j/d_B)^2] + \left[\frac{T_j}{T_j^*}\right]\left[0.19 + 1.28\left(\frac{RMF}{1 + RMF}\right)\right]\left[\frac{3.5}{1 + 2.5(d_B/d_r)^2}\right];$$ and and using the base pressure ratio in predicting the aerodynamic performance associated with power-on base drag performance, where:

$\gamma_j$ is the ratio of specific heats at the nozzle exit,
$P_j$ is the pressure at the nozzle exit,
$d_j$ is the diameter at the nozzle exit,
$M_j$ is Mach number at the nozzle exit,
$\gamma_\infty$ is the ratio of specific heats at freestream conditions,
$P_\infty$ is the pressure at freestream conditions,
$d_r$ is the reference diameter,
$M_\infty$ is Mach number at freestream conditions,
$T_j$ is the temperature at the nozzle exit,
$T_j^*$ is the temperature at the nozzle exit for Mach 1,
$P_B$ is the static pressure at the body base,
$X_j$ is the distance of jet exit from the body base, and
$d_B$ is the diameter at the body base.

3. A method for predicting the aerodynamic performance of bodies having fins with trailing edge flaps; comprising:
correlating large angular movements of one of the trailing edge flap to a small angular movement of the entire fin surface; and
estimating the normal force and pitching force of one of the trailing edge flaps based on the normal and pitching moments of the entire fin surface.

* * * * *